US011669496B2

(12) United States Patent
Borzov et al.

(10) Patent No.: US 11,669,496 B2
(45) Date of Patent: Jun. 6, 2023

(54) METHOD AND APPARATUS FOR REPLICATING A TARGET FILE BETWEEN DEVICES

(71) Applicant: HUAWEI TECHNOLOGIES CO., LTD., Shenzhen (CN)

(72) Inventors: Dmitry Borzov, Waterloo (CA); Mikhail Ignatovich, Waterloo (CA); David Ramón Prados, Waterloo (CA)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 107 days.

(21) Appl. No.: 17/381,656

(22) Filed: Jul. 21, 2021

(65) Prior Publication Data

US 2023/0087778 A1 Mar. 23, 2023

(51) Int. Cl.
*G06F 16/174* (2019.01)
*G06F 16/178* (2019.01)
*G06F 16/182* (2019.01)
*G06F 16/14* (2019.01)

(52) U.S. Cl.
CPC ........ *G06F 16/1752* (2019.01); *G06F 16/152* (2019.01); *G06F 16/178* (2019.01); *G06F 16/1844* (2019.01)

(58) Field of Classification Search
CPC .. G06F 16/152; G06F 16/178; G06F 16/1752; G06F 16/1844
See application file for complete search history.

(56) References Cited

U.S. PATENT DOCUMENTS

| 6,374,250 B2* | 4/2002 | Ajtai | H03M 7/30 |
| | | | 708/203 |
| 2006/0184652 A1* | 8/2006 | Teodosiu | H03M 7/3084 |
| | | | 709/221 |
| 2010/0318759 A1* | 12/2010 | Hamilton | G06F 11/1464 |
| | | | 711/171 |

OTHER PUBLICATIONS

Sayood, Khalid, Chapter 2—Mathematical Preliminaries for Lossless Compression, Introduction to Data Compression (Fifth Edition), Morgan Kaufmann, 2018, p. 11-39.
Suel, Torsten et al., Chapter 13—Algorithms for Delta Compression and Remote File Synchronization, Lossless Compression Handbook, Khalid Sayood, editor, Academic Press, 2003, p. 269-289.
Xia, Wen et al., A Comprehensive Study of the Past, Present, and Future of Data Deduplication, Proceedings of the IEEE, 104(9):1681-1710, 2016.
Aronovich, Lior et al., The Design of a Similarity Based Deduplication System, Proceedings of SYSTOR 2009: The Israeli Experimental Systems Conference, SYSTOR '09, New York, NY, USA, 2009, Association for Computing Machinery.

(Continued)

*Primary Examiner* — Angelica Ruiz

(57) ABSTRACT

There is provided a method and apparatus for remote differential compression (RDC) and data deduplication. According to embodiments, when a sending device acquires a new target file, the following steps are performed. Initially, Jaccard segmentation is performed, followed by performing identity-based segment deduplication and similarity-based segment deduplication. The transmission of the target file in the deduplicated form to the recipient device is subsequently performed. The recipient device can then rebuild the original target file from the deduplicated form thus replicating the target file at the recipient device with the target file originally present at the sending device.

21 Claims, 29 Drawing Sheets

(56) References Cited

OTHER PUBLICATIONS

Flajolet, Philippe et al., Probabilistic counting algorithms for data base applications, Journal of Computer and System Sciences, 31(2):182-209, 1985.
Xia, Wen et al., "FastCDC: a Fast and Efficient Content-Defined Chunking Approach for Data Deduplication," Proceedings of the 2016 USENIX Annual Technical Conference (USENIC ATC '16), Jun. 22-24, 2016, Denver, CO, USA, p. 101-114.

* cited by examiner

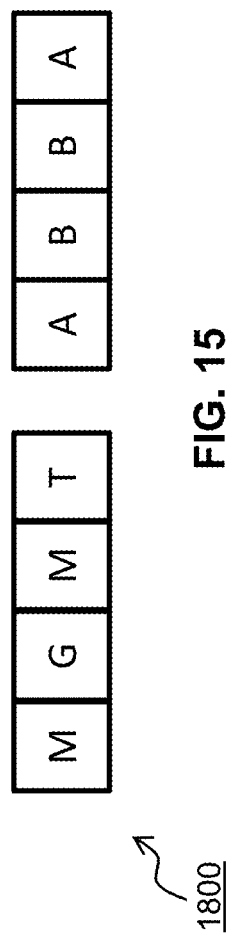

Forward table for the first half

| | 0 | 1 | 2 | 3 | 4 | 5 | 6 | 7 | 8 | 9 | ... | 31 |
|---|---|---|---|---|---|---|---|---|---|---|---|---|
| Hash1 | 0 | 3 | - | - | - | - | - | - | - | - | ... | - |
| Hash2 | 0 | - | - | 1 | - | - | - | - | - | - | ... | - |
| Hash3 | 1 | 0 | - | - | - | - | - | - | - | - | ... | - | m order

Backward table

| | 0 | 1 | 2 | 3 | 4 | 5 | 6 | 7 | 8 | 9 | ... | 31 |
|---|---|---|---|---|---|---|---|---|---|---|---|---|
| Hash1 | 2 | 3 | - | - | - | - | - | - | - | - | ... | - |
| Hash2 | 3 | - | - | 1 | - | - | - | - | - | - | ... | - |
| Hash3 | 3 | 2 | - | - | - | - | - | - | - | - | ... | - | m order

FIG. 17A

Forward table for the second half

| | 0 | 1 | 2 | 3 | 4 | 5 | 6 | 7 | 8 | 9 | ... | 31 |
|---|---|---|---|---|---|---|---|---|---|---|---|---|
| Hash1 | 0 | 1 | - | - | - | - | - | - | - | - | ... | - |
| Hash2 | 0 | 1 | - | - | - | - | - | - | - | - | ... | - |
| Hash3 | - | 0 | - | - | - | - | - | - | - | - | ... | - | m order

Backward table

| | 0 | 1 | 2 | 3 | 4 | 5 | 6 | 7 | 8 | 9 | ... | 31 |
|---|---|---|---|---|---|---|---|---|---|---|---|---|
| Hash1 | 7 | 6 | - | - | - | - | - | - | - | - | ... | - |
| Hash2 | 7 | 6 | - | 1 | - | - | - | - | - | - | ... | - |
| Hash3 | 3 | 7 | - | - | - | - | - | - | - | - | ... | - | m order

FIG. 17B

| | 0 | 1 | 2 | 3 | 4 | 5 | 6 | 7 | 8 | ... | 31 |
|---|---|---|---|---|---|---|---|---|---|---|---|
| Hash1 | 0 | 3 | - | - | - | - | - | - | - | ... | - |
| Hash2 | 0 | - | - | 1 | - | - | - | - | - | ... | - |
| Hash3 | 1 | 0 | - | - | - | - | - | - | - | ... | - | m order — Forward table for the first half

| | 0 | 1 | 2 | 3 | 4 | 5 | 6 | 7 | 8 | ... | 31 |
|---|---|---|---|---|---|---|---|---|---|---|---|
| Hash1 | 0 | 1 | - | - | - | - | - | - | - | ... | - |
| Hash2 | 0 | 1 | - | - | - | - | - | - | - | ... | - |
| Hash3 | - | 0 | - | - | - | - | - | - | - | ... | - | m order — Forward table for the second half

| | 0 | 1 | 2 | 3 | 4 | 5 | 6 | 7 | 8 | 9 | ... | 31 |
|---|---|---|---|---|---|---|---|---|---|---|---|---|
| Hash1 | 7 | 6 | - | - | - | - | - | - | - | - | ... | - |
| Hash2 | 7 | 6 | - | 1 | - | - | - | - | - | - | ... | - |
| Hash3 | 3 | 7 | - | - | - | - | - | - | - | - | ... | - | m order — Backward table

Forward table for the first half

| MG | | MT | | | AB | | | BA | |
|---|---|---|---|---|---|---|---|---|---|
| 0 | 2 | | 4 | | 6 | | | 8 | | m order

| | 0 | 1 | 2 | 3 | 4 | 5 | 6 | 7 | 8 |
|---|---|---|---|---|---|---|---|---|---|
| Hash1 | 0 | 3 | - | - | - | - | - | 8 | 31 |
| Hash2 | 0 | - | - | 1 | - | - | - | - | ... |
| Hash3 | 1 | 0 | - | - | - | - | - | - | ... |

Filtering results for evaluating similarity (first quarter)

First Quarter Cardinality:
$int(1.2928 * 2^{(1+1+2)/3}) = 3$

FIG. 20B

Backward table

| MG | | MT | | AB | | BA | | |
|---|---|---|---|---|---|---|---|---|
| 0 | 2 | | 4 | | 6 | | 8 | | m order

| | 0 | 1 | 2 | 3 | 4 | 5 | 6 | 7 | 8 |
|---|---|---|---|---|---|---|---|---|---|
| Hash1 | 7 | 6 | - | - | - | - | - | - | 31 |
| Hash2 | 7 | 6 | - | 1 | - | - | - | - | - |
| Hash3 | 3 | 7 | - | - | - | - | - | - | - |

Filtering results for evaluating similarity (last quarter)

Last Quarter Cardinality:
$int(1.2928 * 2^{(2+2+0)/3}) = 3$

Forward table for the first half (filtered)

| | 0 | 1 | 2 | 3 | 4 | 5 | 6 | 7 | 8 | ... | 31 |
|---|---|---|---|---|---|---|---|---|---|---|---|
| | | | | | m order | | | | | | |
| Hash1 | 0 | - | - | - | - | - | - | - | - | ... | - |
| Hash2 | 0 | - | - | 1 | - | - | - | - | - | ... | - |
| Hash3 | 1 | 0 | - | - | - | - | - | - | - | ... | - |

Backward table (filtered)

| | 0 | 1 | 2 | 3 | 4 | 5 | 6 | 7 | 8 | ... | 31 |
|---|---|---|---|---|---|---|---|---|---|---|---|
| | | | | | m order | | | | | | |
| Hash1 | 7 | 6 | - | - | - | - | - | - | - | ... | - |
| Hash2 | 7 | 6 | - | - | - | - | - | - | - | ... | - |
| Hash3 | - | 7 | - | - | - | - | - | - | - | ... | - |

Union table
Union Cardinality:
$int\left(1.2928 * 2^{(2+2+2)/3)}\right) = 5$

| | 0 | 1 | 2 | 3 | 4 | 5 | 6 | 7 | 8 | 9 | ... | 31 |
|---|---|---|---|---|---|---|---|---|---|---|---|---|
| | | | | | | m order | | | | | | |
| Hash1 | 1 | 1 | - | - | - | - | - | - | - | - | ... | - |
| Hash2 | 1 | 1 | - | 1 | - | - | - | - | - | - | ... | - |
| Hash3 | 1 | 1 | - | - | - | - | - | - | - | - | ... | - |

Filtering forward and backward Table for Candidates

METHOD AND APPARATUS FOR REPLICATING A TARGET FILE BETWEEN DEVICES

CROSS-REFERENCE TO RELATED APPLICATIONS

This is the first application filed for the present invention.

FIELD OF THE INVENTION

The present invention pertains to the field of telecommunications and in particular to a method and apparatus for replicating a target file between devices.

BACKGROUND

In wireless communication, a data object is replicated when a sender (e.g. user equipment (UE), base station (BS), server, etc.) transfers the data object one or more recipients (e.g. UE, BS, server, etc.) over the network. In such cases, a considerable fraction of data constituting the data object is redundantly replicated even when some or all of the recipients already possess the same or similar data object. A significant reduction in costs for data transfer and computation can therefore be achieved if redundant parts of a data file is identified in advance and only non-redundant parts of the data is transferred over the network.

There have been attempts made to identify and transfer only the differences between the new and the old versions of the data object, in what is called remote differential compression (RDC). In RDC, network nodes heuristically negotiate a set of differences between the old version of the data (e.g. the data that the recipient already possesses) and the new version of the data (e.g. the data that needs to be replicated) in order to improve efficiency of the file replication (or file transfer). This process may be commonly referred to as data deduplication in large-scale storage systems.

RDC can be widely applied to various engineering applications with practical significance. RDC can be applied in a number of cases, for example, for distributed cloud databases and storage systems (e.g. large scale distributed data systems), for digital content delivery, for data collection and telemetry, and for systems for privately shared data such as personal cloud computing. Such applications of RDC may be for the purpose of reducing cost arisen from limitations on the network connection bandwidth.

Moreover, RDC can also be applied for massive data storages in order to solve the problem of efficiently storing massive amounts of data and reducing the storage space required. In this case, the recipient and the sender of the data object are the same agent (e.g. same device) separated by the time period between the two key steps of data storage, i.e. i) when the data is loaded and saved for storage, and ii) when the data is requested and retrieved back.

However, it has been observed that RDC and data deduplication methods that work well on high entropy data are different from those that work well for low entropy data. In other words, RDC and data deduplication that work effectively for one data group or type may not work effectively for another group or type.

In light of the above, there is a need for a new approach to RDC and data deduplication, and therefore there is a need for a new method and apparatus for synchronizing files in a wireless network, that is not subject to one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present invention is to provide a method and apparatus for replicating a target file between devices. In accordance with embodiments of the present invention, there is provided a method for replicating a target file between a sending device and a recipient device. The method includes performing, by a sending device, Jaccard segmentation of the target file thereby partitioning the target file into a plurality of segments, upon performing Jaccard segmentation each segment is characterized by one or more of: a segment border position indicating a segment border between the segment and an adjacent segment, an estimated R-metric value indicative of a uniqueness of the segment, a secure fingerprint identifying the segment and one or more sketches indicative of one or more hash functions associated with the segment. The method further includes deduplicating, by the sending device, each of the segments of the target file based on a comparison with a corresponding segment of a seed file associated with the target file. The method further includes transmitting, by the sending device to the recipient device, the deduplicated segments of the target file, each deduplicated segment encoded based on a respective segmentation type determined during deduplication of the segments of the target file. The method additionally includes rebuilding, by the recipient device, a replicated target file using the deduplicated segments of the target file and the seed file associated with the target file.

In some embodiments, deduplicating each of the segments includes determining whether one or more of the segments of the target file is identical to the corresponding segment of the seed file.

In some embodiments, deduplicating each of the segments includes determining whether one or more of the segments of the target file is based on a similarity to the corresponding segment of the seed file. In some embodiments, the similarity between a segment of the target file and a corresponding segment of the seed file is determined based at least in part on the estimated R-metric value.

In some embodiments, Jaccard segmentation of the target file is an iterative process based on a cascading window having a size, wherein the cascading window is shifted by half of the size of the cascading window for each iteration, the cascading window defining a fixed size buffer associated with the target file during the iterative process. In some embodiments, the iterative process includes determining one or more Jaccard tables, each Jaccard table being a data structure containing information indicative of a composition of the target file or transitions between segments of the target file and determining the segment border position using the one or more Jaccard tables. In some embodiments, determining the one or more Jaccard tables includes determining a Jaccard triplet of the cascading window, the Jaccard triplet including a backward-directed Jaccard table for the cascading window, a forward-directed Jaccard table for a first half of the cascading window and a forward-directed Jaccard table for a second half of the cascading window.

In some embodiments, determining the segment border position includes splitting the cascading window into four equal sized quarters and determining a forward subinterval Jaccard table for the first quarter of the cascading window. Determining the segment border position further includes determining a backward subinterval Jaccard table for the last quarter of the cascading window and evaluating a similarity between the first quarter of the cascading window and the last quarter of the cascading window based on the forward subinterval Jaccard table and the backward subinterval Jaccard table. Determining the segment border position further includes determining whether the segment border is within the second quarter of the cascading window or the third quarter of the cascading window, the determining based on the similarity between the first quarter of the cascading window and the last quarter of the cascading window.

In some embodiments, determining the segment border position includes selecting an optimal border from plural segment border candidates, wherein determining the segment border position is based on probability weights. In some embodiments, the optimal border is located between two segments with minimal cross-segment similarity (MCSS) in the cascading window.

In accordance with embodiments of the present invention, there is provided a sending device supporting target file replication with a recipient device. The sending device includes a network interface for receiving data from and transmitting data to devices connected to a network, a processor, and a machine readable memory storing machine executable instructions. The machine executable instructions, which when executed by the processor configure the sending device to perform Jaccard segmentation of the target file thereby partitioning the target file into a plurality of segments, upon performing Jaccard segmentation each segment is characterized by one or more of: a segment border position indicating a segment border between the segment and an adjacent segment, an estimated R-metric value indicative of a uniqueness of the segment, a secure fingerprint identifying the segment and one or more sketches indicative of one or more hash functions associated with the segment. The machine executable instructions, which when executed by the processor configure the sending device to deduplicate each of the segments of the target file based on a comparison with a corresponding segment of a seed file associated with the target file and transmit to the recipient device, the deduplicated segments of the target file, each deduplicated segment encoded based on a respective segmentation type determined during deduplication of the segments of the target file.

In accordance with embodiments of the present invention, there is provided a recipient device supporting target file replication with a sending device. The recipient device includes a network interface for receiving data from and transmitting data to devices connected to a network, a processor and a machine readable memory storing machine executable instructions. The machine executable instructions, which when executed by the processor configure the recipient device to receive, from the sending device, a plurality of deduplicated segments of a target file, each deduplicated segment encoded based on a respective segmentation type identified during deduplication of the segments of the target file, each segment characterized by one or more of: a segment border position indicating a segment border between the segment and an adjacent segment, an estimated R-metric value indicative of a uniqueness of the segment, a secure fingerprint identifying the segment, and one or more sketches indicative of one or more hash functions associated with the segment. The machine executable instructions, when executed by the processor further configure the recipient device to rebuild a replicated target file using the deduplicated segments of the target file and the seed file associated with the target file.

Embodiments have been described above in conjunctions with aspects of the present invention upon which they can be implemented. Those skilled in the art will appreciate that embodiments may be implemented in conjunction with the aspect with which they are described, but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

BRIEF DESCRIPTION OF THE FIGURES

Further features and advantages of the present invention will become apparent from the following detailed description, taken in combination with the appended drawings, in which:

FIG. 15 illustrates an example of an extracted cascading window, in accordance with embodiments of the present disclosure.

FIG. 17A illustrates the values in each Jaccard table after analyzing the first half of the cascading window, in accordance with embodiments of the present disclosure.

FIG. 17B illustrates the values in each Jaccard table after analyzing the second half of the cascading window, in accordance with embodiments of the present disclosure.

FIG. 18 illustrates the final values in a full forward-directed Jaccard table after analyzing the full cascading window, in accordance with embodiments of the present disclosure.

FIG. 20A illustrates the calculation of the first quarter cardinality for the forward-directed table for the first half of the cascading window, in accordance with embodiments of the present disclosure.

FIG. 20B illustrates the calculation of the last quarter cardinality for the backward-directed table for the cascading window, in accordance with embodiments of the present disclosure.

FIG. 21 illustrates an example of calculation of the union cardinality, in accordance with embodiments of the present disclosure.

FIG. 22 illustrates a filtering procedure for the forward and backward tables, in accordance with embodiments of the present disclosure.

It will be noted that throughout the appended drawings, like features are identified by like reference numerals.

DETAILED DESCRIPTION

Definitions

Figure 1:
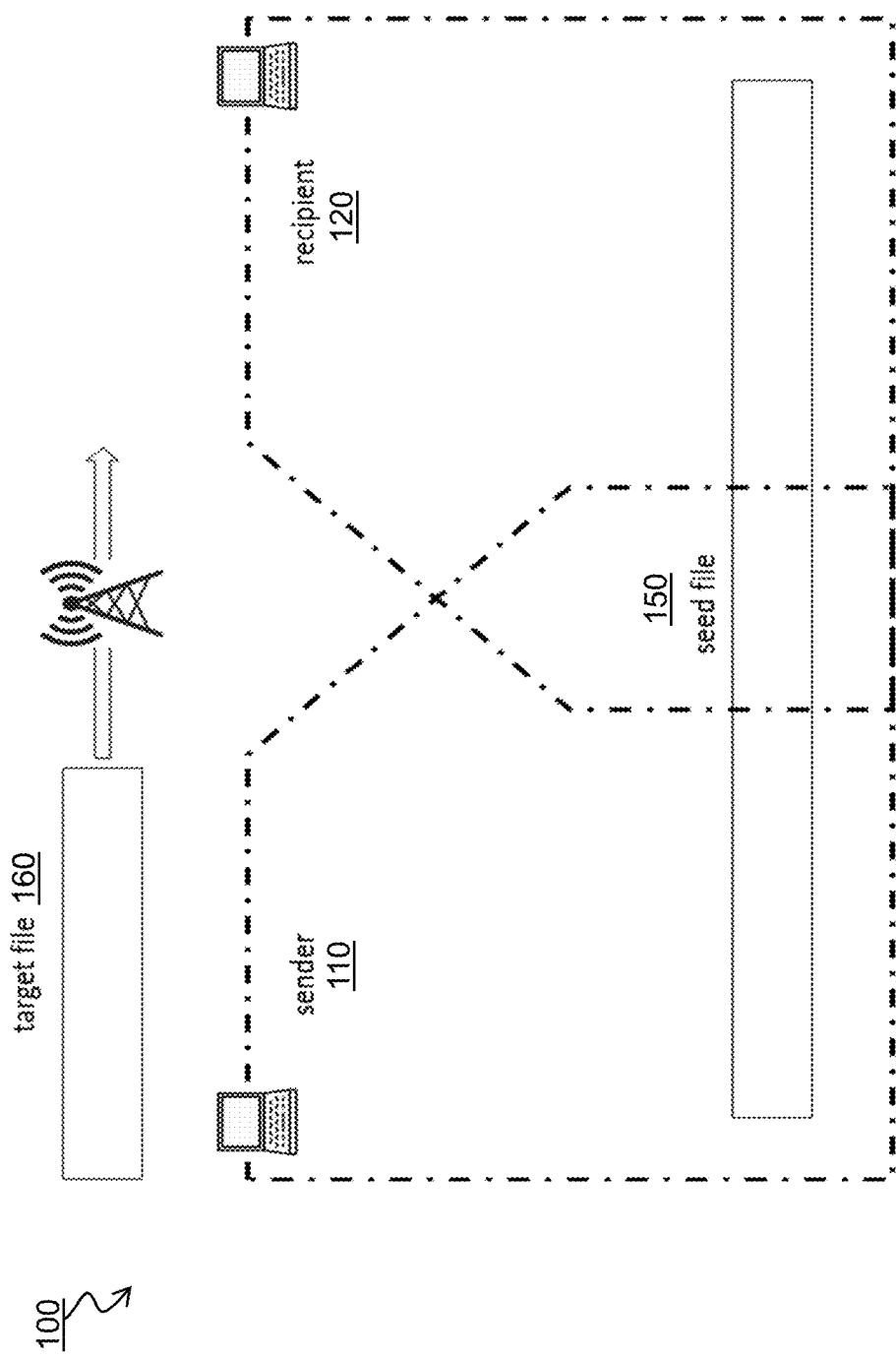
FIG. 1 depicts remote differential compression (RDC) terminology.

In the present disclosure, the term 'content-defined chunking' (CDC) refers to a chunking technique that divides a data object into variable length chunks based on the content of the data object, for example dividing based on one or more characteristics of the data object.

In the present disclosure, the term 'delta encoding' and 'delta compression' are interchangeably used to refers to a way of compressing a data object by keeping only the differences (deltas) between the data object and another data object that is already known.

In the present disclosure, the term 'fingerprint' refers to a function that maps an arbitrarily large data object into a fixed-length and small sequence of bytes where a 1-to-1 relationship can be practically assumed for the mapping. A fingerprint can be also be referred to as a hash function or a checksum. For example, 'SHA-256' is an example of a fingerprint.

In the present disclosure, the term 'identity-based deduplication' refers to a deduplication technique based on the identity of file or data object. The identity-based deduplication technique relies on, for example, a fingerprint function (for example, secure hash algorithm (SHA)-256) and a fingerprint-indexed storage (for example, a content-addressable storage).

In the present disclosure, the term 'locally-sensitive hashing' refers to a technique that hashes similar input items into the same buckets with high probability.

In the present disclosure, the term 'remote differential compression' (RDC) refers to an algorithm or a technique that is used to transfer data or data objects over a network in compressed format. For example, a sender may only send the differences between the content of the data (or data object) possessed by the sender relative to the content of the data (or data object) possessed by the recipient.

In the present disclosure, the term 'seed file' refers to data or a data object that is possessed by both of the sender and the recipient within the RDC context.

In the present disclosure, the term 'similarity-based deduplication' refers to a deduplication technique based on data similarity. For example, the similarity-based deduplication technique may use delta encoding to reduce redundancy between segments having high degree of similarity.

In the present disclosure, the term 'target file' refers to the data that a sender is trying to send to a recipient. In the present disclosure, the term 'target file' may be used within the RDC context.

In the present disclosure, the term 'hash' refers to a hash function. In the present disclosure, the term hash may be used in a strict manner as a universal hash function.

Unless defined otherwise, all technical and scientific terms used herein have the same meaning as commonly understood by one of ordinary skill in the art to which this invention belongs.

The present disclosure provides an approach to remote differential compression (RDC) and data deduplication, which is called herein Jaccard RDC. Specifically, there is provided a probabilistic method to obtain a characterization of the targeted data's information theory properties, and efficiently separate data segments based on their distinct properties, thereby rendering the data deduplication tailored to the target data.

FIG. 1 illustrates a remote differential compression technology. As illustrated in FIG. 1, in RDC, a sender 110 obtains a copy of a target file 160 that needs to be replicated to the recipient 120. Both of the sender 110 and the recipient 120 has a copy of a seed file 150 which may have been preprocessed and indexed in advance in some way. In the present disclosure, cases are taken into consideration where the seed file 150 is considerably greater in size than the target file 160 and data transfer or data transmission occurs over a communication channel with limited capacity. Within the RDC context, it is beneficial to design a protocol for communication between the sender 110 and the recipient 120 so that data commonalities between the target file 160 and the seed file 150 can be identified and leveraged thereby reducing the costs for data transport and computation relating to replicating the target file 160 at the recipient 120.

According to embodiments, there is provided a method of remote differential compression (RDC) and data deduplication. According to embodiments, when a sender acquires a new target file, the following steps are performed. Initially, Jaccard segmentation is performed on the target file, followed by performing identity-based segment deduplication and similarity-based segment deduplication. The transmission of the target file in the deduplicated form to the recipient is subsequently performed. The recipient can then rebuild the original target file from the deduplicated form thus replicating the file at the recipient with the target file originally present at the sender.

According to embodiments, when a sender receives a new target file (i.e. input), the sender performs Jaccard segmentation of the target file. The Jaccard segmentation of the target file includes partitioning the target file into the segments, and each segment can be characterized by the metrics including i) the position where the segment border starts within the target file, ii) the estimation of the segment's R-metric, iii) the secure fingerprint of the segment (e.g. SHA-256) and iv) the sketches of the segments.

According to embodiments, Jaccard segmentation is performed to generate a segmentation that is a probabilistic approximation of the MCSS segmentation. This can be achieved without generating high computational overhead thereby rendering the input file segmentation step practical even when applied to a massive dataset.

According to embodiments, upon acquisition of the target file's segmentation (output of the input file segmentation step), the sender performs identity-based segmentation deduplication. In this step, the sender searches the secure fingerprints of the new segments (for example in a fingerprint-indexed storage) that contain the segments of the seed file. The segments of the seed file are the segments that are previously added. The sender outputs the identified and marked segments of the target file through the identity-based segmentation deduplication. To generate the identified and marked segments, the sender takes inputs of the target file's segmentation (e.g. Jaccard segmentation of the target file obtained from the input file segmentation step) and the fingerprint index of the seed file. In some instances, the identified and marked segments of the target file can be identical to the segments of the seed file. In some embodiments, existing deduplication method(s) based on a secure fingerprint, for example the identity-based deduplication, can then be used.

According to embodiments, the sender performs the similarity-based segmentation deduplication. In this step, the sender identifies the target file segments that are similar (but not identical) to the seed file segments. Then, the sender encodes such segments as a delta update over a similar segment, and only changes between the two segments will be stored.

In the similarity-based segmentation deduplication, the sender takes inputs of the target file's segmentation (e.g. Jaccard segmentation of the target file obtained from the input file segmentation step) and the recipient's sketch index. When performing the similarity-based deduplication, the sender will output the delta-encoding segments of the target file.

In some embodiments, the similarity-based segmentation can be enhanced using a data character-informed deduplication. Using the estimate of the R-metric value for each of the new data segments, the character of that data segment can be obtained. The obtained data character can enable searching of the segments containing the data types that are known to work well. This method can allow for minimizing the overhead (e.g. computational and memory overhead) of the similarity-based segment deduplication method, as only the sketches of the most beneficial segments can be tracked.

According to embodiments, when the identity-based segmentation deduplication and the similarity-based segmentation deduplication are performed, the sender prepares the target file in the deduplicated form and transports it to the recipient. The target file in the deduplicated form is a list of the segments each of which is encoded in the way based on its type as illustrated above. To prepare the target file in the deduplicated form (i.e. output), the sender takes inputs of the target file's segmentation, the segments marked in the identity-based deduplication and the delta encoded segments from the similarity-based deduplication.

According to embodiments, there are provided multiple segmentation types, wherein each segmentation type has an associated "encoding" configuration. According to embodiments, the segmentation types can be classified into the categories defined as identical, similar and different. The first segmentation type occurs when segments of the target file are identical to the associated seed file segments, which are identified in the identity-based deduplication step. For this segmentation type, sending the recipient the fingerprints of such segments can be required. The second segmentation type occurs when segments of the target file are similar to the associated segments of the seed file. For this segmentation type, the segments can be delta-encoded segments with the reference to the associated seed file segment. These segments are acquired from the similarity-based deduplication step. For this segmentation type the fingerprint of the seed segment and the segment's delta would be transmitted to the recipient so that the recipient can restore this segment. The last segmentation type is related to the remaining segments identified during the deduplication process. For this segmentation type the target segment and the associated segment of the seed file are different and as such, the segment of the target file can be transmitted to the recipient without any delta compression associated with the segment. For example, this type of segment can be transmitted in full or literal mode or in a compressed format, for example using a compression technique known in the art which can include deflate or JPEG.

According to embodiments, upon receipt of the target file in the deduplicated form, the recipient restores the original target file. The recipient can recover the original target file from its deduplicated form (i.e. the 'target file in the deduplicated form' is the input and the 'original target file' is the output). Therefore, the target file is replicated to the recipient using a remote differential compression scheme.

In some embodiments, in the case of devices configured for continuous file synchronization, there is provided a decentralized distributed network for peer devices that interchangeably play the roles of the RDC sender and receiver, depending on the circumstances. For example, when there are 10 devices configured for continuous file synchronization, a new file can be uploaded to one of these devices, resulting in that device becoming a sender and the other 9 devices becoming recipients. For example, the device to which the target file is initially replicated would subsequently turn into the RDC sender that facilitates the data replication with respect to the rest of the devices.

According to some embodiments, the nature of the target file and the seed file can depend on the specific application. It should be also noted that the meaning of the term "file" within the target file and seed file is not restricted to an ordinary file in a regular filesystem but can be envisioned as a data object or other data configuration as would be readily understood. For example, a data object may be a string byte, the interpretation of which can depend on the specific application. It may be considered that the seed file for the devices for continuous file synchronization is the dataset of all the versions of filesystem files that the devices (e.g. nodes) previously replicated with each other.

According to embodiments, it is understood that there is no notion of files within a content delivery network (CDN) of a communication service provider, as the target file is a database transaction and the seed file is an internal representation of the state of the database.

In some embodiments, the sender does not have a copy of the seed file, either partially or entirely.

RDC and Data Compression

RDC can be considered to be related to data compression. In particular, data compression engineering deals with the same issues as recognized in RDC, for example identifying and leveraging redundancies and common patterns in the target data and as such the two target data domains are clearly linked. An example of delta compression tool families is the gzip format, which is based on the data compression format DEFLATE based on a data compression algorithm LZ78 (i.e. Lempel-Ziv algorithm). However, the LZ algorithm typically can only detect and use the similarities no greater than 32 Kb apart in the stream of data.

According to embodiments, features of the method and apparatus focus on detecting and leveraging commonalities between the two distinct types of data, namely the data that has already been copied and the new data that remains to be copied. This is contrary to existing data compression technologies which utilize a single target data.

According to some embodiments, the seed file is preprocess and indexed in advance in order to facilitate the next steps of the method.

RDC and Delta Encoding

The domain of RDC is related to that of delta encoding which is also known as delta compression. A domain of delta encoding naturally arises in, for example, distribution of software updates where the old version and the new version of the software are substantially similar to each other. As such, delta encoding includes analysis of the two very similar files in order to generate a representation of the differences between the files (i.e. delta) thereby enabling the recipient having one of the two files and the generated delta to reproduce the other file. Therefore, generating and transmitting data indicative of a delta to the recipient allows implementation of an RDC protocol.

General-purpose delta compression tools, such as vdelta, vcdiff, zdelta, are based on the Lempel-Ziv approach, the core concept of which is schematically illustrated below:

old version: Mary had a little lamb, little lamb, little lamb
new version: Mary had a little pony, little pony, little pony With LZ-based delta compression, the matching substrings (e.g. "Mary had a little", "little") would be encoded in the old version as references. The references are a pair of two numbers where the first number is indicative of the index of where in the old version the matching substring starts, and the second number is indicative of the length of the matching string. The encoded old version with references is illustrated as follows:

old version: [0,18]lamb[22,9]lamb[22,9]lamb
new version: Mary had a little pony, little pony, little pony Quantifying Performance Further it will be illustrated with respect to how RDC schemes can be compared to each other and the key metrics that should be mainly considered. One of the challenges of replicating the data from the sender to the recipient is to minimize the two different types of major costs, namely data transport cost and computational cost. The data transport cost is indicative of how many bytes are to be transmitted over the network (e.g. wired and/or wireless network) between the sender and the recipient. The computational cost is indicative of how many operations (e.g. computer operations) are required to be performed for preprocessing the data to be replicated.

In general, there is a trade-off between these two major costs. For instance, detecting and eliminating more redundancies, which can be helpful to reduce data transport costs, can require more thorough processing and analysis of the data. Such thorough data processing and analysis can result in higher computational costs. In other words, simpler the data processing and analysis would result in lower computational costs. For example, at one extreme some or all of the deduplication attempts may be omitted and there is only a simple scheme of transmitting the target file, as it is, in the raw form. This example would render the minimum computational cost and such an extreme approach may be beneficial for applications where the cost of data transport is not a considering factor, for example, when data transmissions occur within one device, such as loading data from random access memory (RAM) into video memory.

Figure 2:
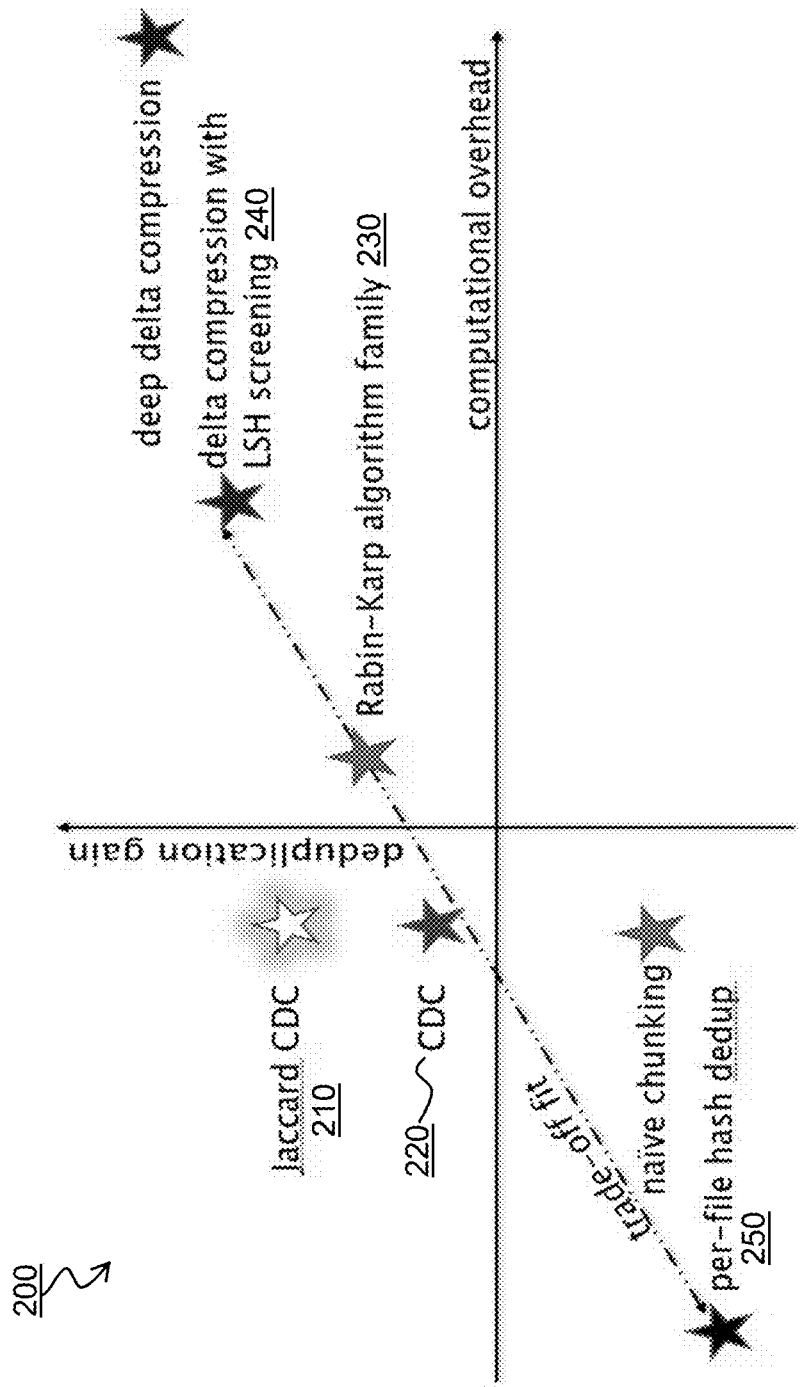
FIG. 2 illustrates computational overhead and deduplication gain of various families of RDC techniques.

FIG. 2 illustrates computational overhead and deduplication gain of various families of RDC techniques. Specifically, various families of techniques used to approach RDC are qualitatively compared in FIG. 2. Referring to FIG. 2, the computational cost of Jaccard deduplication (Jaccard CDC 210) is substantially similar to that of a commonly used content-defined chunking (CDC) 220, whereas the data transport improvement (e.g. deduplication gain) of the Jaccard CDC 210 is superior to that of the CDC 220. In fact, the data transport improvement (e.g. deduplication gain) of the Jaccard CDC 210 is comparable to computationally more expensive classic delta compression techniques, such as the Rabin-Karp algorithm family 230 and delta compression with locally sensitive hash (LSH) screening 240.

While the computational costs can be more thoroughly understood, for the above comparison a distinction of the cost with more details is not considered, as the various detailed computational costs are lumped together as a (generic) computational cost. A person skilled in the art would readily understand the distinct computational costs, for example the distinct costs on each side of the sender and the recipient, the distinction between the in-memory size and number of operations, and the distinctions between the kinds of operations (e.g. the ones confined to an L1 cache and the ones which require random memory access). A person skilled in the art would also readily understand that the computational cost can include the memory overhead of all indices and meta-information of the seed file.

R-Metric: Quantifying the Character of Data

An n-gram is a contiguous sequence of n-bytes in a data object. For a given data object A of size $L(A)$ bytes, the number of n-grams is $L(A)-n+1$. For example, provided that the data object is 'BANANA':

1-gram sequences are [B, A, N, A, N, A] and the unique 1-gram sequences are {B, A, N};
2-gram sequences are [BA, AN, NA, AN, NA] and the unique 2-gram sequences are {BA, AN, NA};
3-gram sequences are [BAN, ANA, NAN, ANA] and the unique 3-gram sequences are {BAN, ANA, NAN};
4-gram sequences are [BANA, ANAN, NANA] and the unique 4-gram sequences are {BANA, ANAN, NANA};

5-gram sequences are [BANAN, ANANA] and the unique 5-gram sequences are {BANAN, ANANA}; and 6-gram sequence is [BANANA] and the unique 6-gram sequence is {BANANA}.

Denoting with S(A, n) the set of unique n-grams that data object A contains, the upper bound for the cardinality of the set can be determined as defined in Equation 1:

$$0 \leq |S(A,n)| \leq \min(L(A)-n+1, 2^{8 \cdot n}) \quad (1)$$

In cases where $L(A) \geq 2^{8n}$, the segment of the data object from the first byte to the byte of index $2^{8n}+n-1$ can be denoted as $A[1 \ldots 2^{8n}+n-1]$. The upper bound for the cardinality of the set of unique n-grams for this segment can be determined as defined in Equation 2:

$$1 \leq |S(A[1 \ldots 2^{8n}+n-1], n)| \leq 2^{8 \cdot n} \quad (2)$$

Generally, the closer $S(A[1 \ldots 2^{8n}], n)$ is to its upper limit, the higher the level of entropy contained in the data object A. Therefore, if the metric R( ) over the domain of data objects can be determined as defined in Equation 3:

$$R(A) = \sum_{x=0 \ldots L(A) div 2^{8n}} \frac{|S(A[x \cdot 2^{8n}, (x+1) \cdot 2^{8n}], n)|}{2^{8n}} \quad (3)$$

then the following bound expression can be determined as defined in Equation 4:

$$\forall A: R(A) \leq 1 \quad (4)$$

Knowing the value R(A) of a given data object would allow for the characterizing of the type of data contained in the data object. In general, for high entropy content such as compressed and/or encrypted data, R(A)>0.7, whereas, for low entropy content such as natural language text in unicode transformation format 8 (UTF-8) or program code in bytecode, R(A)<0.4. For example, when there are two data objects containing the text of the novel 'Les Trois Mousquetaires' by Alexandre Dumas in the uncompressed UTF-8 format and in the compressed gzip format, the total number of n-grams, cardinality, and uniqueness levels for each file version using three different n-gram sizes are provided in TABLE 1.

TABLE 1

| Format | File Size (KB) | Entropy | n | Number of n-grams | Unique n-grams | min (L-n + 1,28 n) | R |
|---|---|---|---|---|---|---|---|
| UTF-8 | 1,355 | 0.58 | 1 | 1,386,612 | 102 | 256 | 0.39844 |
| | | | 2 | 1,386,611 | 1,844 | 65,536 | 0.02814 |
| | | | 3 | 1,386,610 | 11,528 | 1,386,610 | 0.00831 |
| gzip | 520 | 0.998 | 1 | 531,783 | 256 | 256 | 1.00000 |
| | | | 2 | 531,782 | 65,514 | 65,536 | 0.99966 |
| | | | 3 | 531,781 | 523,024 | 531,781 | 0.98352 |

Identity-Based Deduplication with Data Fingerprints

There is a design pattern to implement data deduplication which relies on a fingerprint function (e.g. SHA-256) and the fingerprint-indexed storage (i.e. content-addressable storage). This design pattern can be illustrated through an example of how a computer version system (e.g. git system designed by Linus Torvalds) stores the data internally.

For example, there is provided the following three files containing holiday present wishes added to the computer version system (e.g. git). It should be noted that the SHA256 hashes are trimmed to the first two bytes in this example as defined in Table 2.

TABLE 2

| Filename | Content | SHA256 of the file's content |
|---|---|---|
| PEPPA.txt | DOLL, TRAIN, TRUCK | 0xc567 |
| GEORGE.txt | TRAIN, CAR, TRUCK | 0x190e |
| RICHARD.txt | TRAIN, CAR, TRUCK | 0x190e |

The computer version system will internally compare each of the file's content within the fingerprint-indexed data storage, which is a dictionary type component (e.g. a hash table), with the content's hash serving as the lookup key as shown in Table 3.

TABLE 3

| Key | Value |
|---|---|
| 0xc567 | DOLL, TRAIN, TRUCK |
| 0x190e | TRAIN, CAR, TRUCK |

The computer version system then keeps track of the links between filenames and their contents with the file-tree objects which can follow the following format as defined in Table 4:

TABLE 4

| PEPPA.txt | 0xc567 |
|---|---|
| GEORGE.txt | 0x190e |
| RICHARD.txt | 0x190e |

As illustrated above, storing files in this pattern can lead to the deduplication of files with identical content.

Content-Defined Chunking

As illustrated above, cases where two files are identical to each other can be efficiently identified by calculating the fingerprints of files. However, the fingerprint-based deduplication method illustrated above may not work for cases where the files are not identical but substantially similar to each other.

To resolve this, the two substantially similar files are split into smaller fixed-size pieces. These smaller fixed-size pieces can be referred to as chunks, each of which is, for example, 1 MiB in size. For example, whenever a computer version system receives a new file, it will split the received file into fixed-size chunks, and then store each chunk by its hash. If the computer version system receives two files that are slightly different (e.g. have differences only in one small area), most of the chunks generated out of the two files would be identical.

While eliminating the redundancy in these two files is desired, the elimination thereof may result in a fatal flaw. For example, defined below in Tables 5 and 6 there are provided fixed-size (e.g. 5 byte) chunks generated out of files containing holiday present wishes in the example previously presented above (e.g. PEPPA.txt, GEORGE.txt)

TABLE 5

"DOLL, TRAIN, TRUCK"

| Chunk # | Content | SHA256 |
|---|---|---|
| Chunk 1 | "DOLL," | 0x1573 |
| Chunk 2 | " TRAI" | 0xf8d3 |
| Chunk 3 | "N, TR" | 0xadcf |
| Chunk 4 | "UCK" | 0x53dc |

TABLE 6

"TRAIN, CAR, TRUCK"

| Chunk # | Content | SHA256 |
|---|---|---|
| Chunk 1 | "TRAIN" | 0x131f |
| Chunk 2 | ", CAR" | 0xac08 |
| Chunk 2 | ", TRU" | 0xf7a4 |
| Chunk 3 | "CK" | 0x8d55 |

As illustrated above, the positions of the identical parts within the two files are not aligned, and therefore the files end up being chunked differently and the fingerprint-based deduplication would not bring any benefits in this case.

The above issue can be resolved using a content-defined chunking (CDC) method. CDC includes examining all of the file's n-grams and placing a chunk border at a location where an n-gram satisfies an arbitrary criteria. This results in the file's chunking being dependent on the content of the file, and as such identical parts or substantially similar parts of different files can be chunked in similar ways. Given that such a chunking method is fundamentally probabilistic, overriding limits may be set on the chunk sizes thereby limiting undesired cases such as having either an extremely small chunk size or a large chunk size. A person skilled in the art would readily understand there are a number of different types of CDC.

A CDC algorithm is further illustrated below by way of example using the holiday present wish files previously presented above. Upon examining the holiday present wish files, a chunk border can be placed when a vowel 1-gram (i.e. "A", "E", "I", "O", "U" or "Y") is encountered, unless that chunk border would result in a chunk being too small (e.g. less than 2 bytes) or too big (e.g. more than 5 bytes). The results of such a chunking process can lead to the following chunks defined in Tables 7 and 8:

TABLE 7

"DOLL, TRAIN, TRUCK"

| Chunk # | Content | SHA256 |
|---|---|---|
| Chunk 1 | "DOLL," | 0x1573 |
| Chunk 2 | "TR" | 0xc2b1 |
| Chunk 3 | "AIN, " | 0x713d |
| Chunk 4 | "TR" | 0x22ca |
| Chunk 5 | "UCK" | 0x53dc |

TABLE 8

"TRAIN, CAR, TRUCK"

| Chunk # | Content | SHA256 |
|---|---|---|
| Chunk 1 | "TR" | 0x22ca |
| Chunk 2 | "AIN, " | 0x713d |
| Chunk 2 | "CAR, " | 0xf7a4 |
| Chunk 3 | "TR" | 0x22ca |
| Chunk 5 | "UCK" | 0x53dc |

As illustrated above, when the CDC is applied, contents in the similar regions across each file are chunked identically, regardless of their relative positions within the file.

J metric: Measuring File Similarity

In order to quantify the similarity between two data objects (e.g. data object A and data object B), a J metric is defined as the Jaccard similarity between the sets of n-grams contained in data object A and data object B and can be expressed as follows:

$$J(A, B) = \frac{|S(A, n) \cap S(B, n)|}{|S(A, n) \cup S(B, n)|}$$

This metric is commonly used in the domain of locally sensitive hashing (LSH).

An example of the application of the J metric to data object A and data object B is provided below:

$A = \text{BANANA}; B = \text{PANAMA}; n = 1$ $S(A, n) = \{B, A, N\} \rightarrow |S(A, n)| = 3$ $S(B, n) = \{P, A, N, M\} \rightarrow |S(B, n)| = 4$ $S(A, n) \cap S(B, n) = \{A, N\} \rightarrow |S(A, n) \cap S(B, n)| = 2$ $S(A, n) \cup S(B, n) = \{B, A, N, P, M\} \rightarrow |S(A, n) \cup S(B, n)| = 5$ $J(A, B) = \frac{2}{5} = 0.4$ The J metric value ranges from 0 to 1, where 1 is indicative if two identical sets and 0 is indicative of two disjointed sets.

Similarity-Based Deduplication and Sketches

The deduplication schemes illustrated above are typically looking for exactly matching regions across files. Using similarity-based deduplication, more general cases where two regions of two files are similar, while not identical, can be addressed.

As stated above, the domain of delta encoding arises where two highly similar data objects (e.g. two substantially similar software versions) and the differences between these two data objects is encoded, in order to deduplicate the data. As previously noted, RDC is targeting massive datasets where the application of classic delta compression algorithms is not practical.

Aronovich et al. in "The design of a similarity based deduplication system. In Proceedings of SYSTOR 2009: The Israeli Experimental Systems Conference, SYSTOR '09, New York, N.Y., USA, 2009. Association for Computing Machinery", hereinafter referred to as "The design of a similarity based deduplication system", attempted to merge the best of delta encoding and RDC techniques. A key idea of this deduplication system is that delta compression is applied to similar chunks, not to the whole target dataset. Whenever a chunk of the target file is found to be similar to the chunk of the seed file (i.e. the base chunk), that identified chunk can be efficiently replicated by the recipient by sending a reference to that base chunk and including the encoded differences of that chuck with respect to the new version of the file.

For example, schematically, the following two chunks are similar:
target file chunk 0x1376: Mary had a little lamb, little lamb, little lamb
seed file chunk 0x45f7: Mary had a little pony, little pony, little pony
And this similarity allows for the encoding of the differences associated with new target chunk as follows:
target file chunk 0x1376 with chunk 0x45f7 as a reference
delta: [0,18] lamb [22,9] lamb [22,9] lamb A challenging aspect of this technique is to efficiently identify similar chunks. Exploring every possible combination of the new and old chunks is obviously not a good way of performing this task, especially for large files, as the number of pairs to explore is proportional to the product of the number of new and old chunks.

One measure to efficiently identify similar chunks would be to use locally sensitive hashing (LSH). LSH has a concept of a sketch which is similar to hash function, wherein a function is used to map arbitrarily large data objects to fixed-size values (e.g. a short sequence of bytes that can be calculated). Converse to conventional fingerprint hash functions, an important property of a sketch resides in that the greater the similarity between two chunks, the more likely that their sketch values are exactly or substantially the same.

Similarity-based deduplication techniques can be performed through the following steps:
  Build a sketch index: This includes calculating the sketches and indexing the chunks of the seed file. The index is a dictionary data structure where the keys are the sketches and the values are the list of fingerprints of the matching chunks.
  For each of the target file chunks, search for their similar chunks: This includes calculating the sketch values of the target file chunk, and then discovering whether there already exists at least one seed file chunk with the same sketch that is likely to be similar. Variations may exist on how to handle cases where there are multiple similar chunks.
  Delta-encode the target file chunk: The delta-encoded target file chunk would be transmitted to the recipient if the delta representation is smaller than the alternatives (e.g. merely sending the chunk as is).

It is understood that there is no guarantee that the delta encoding of two chunks found based on the sketch index will lead to a better representation of the target chunk because LSH is a probabilistic technique and the definition of what is a similar chunk mean can be varied. For example, as LSH is a probabilistic technique, with respect to the choice of parameters, there is a trade-off between the computational cost for calculating and tracking the sketches and the cost for false positives.

In addition, as noted above the definition of what similar chunks means can be varied. The sketches are based on MinHash in order to approximate the J-metric between two chunks. A metric to define how useful delta compression would be can be dependent upon the specific method used for the evaluation of similarity of the chunks.

Probabilistic Estimation of |S(A, n)|

The computational cost of calculating |S(A, n)| (i.e. cardinality) in a direct way can increase dramatically depending on the number (n) of grams in a chunk. For example, with 4-grams, up to $2^{48}$=4 billion unique n-grams may need to be tracked for a potential worst case. If a direct access table is used to keep track of the n-grams, at least $2^{4\cdot 8}/8 \approx 512$ Mb of memory would be required to change a bit in a table corresponding to each n-gram's position.

There is a probabilistic estimation of the cardinality of sets, a direction pioneered by N. Flajolet and Martin P., may provide an improved approach. In probabilistic estimation, techniques of the domain of probabilistic algorithms may be applied to estimate the cardinality of S(A, n) of a data sample. This may be based on the approach reported in "Probabilistic counting algorithms for data base applications. Journal of Computer and System Sciences, 31(2):182-209, 1985", hereinafter referred to as "Probabilistic counting algorithms".

According to embodiments, a class of pseudo-random permutation (PRP) functions defined over the set of all possible n-grams can be used for the universal hashing step. Mapping n-grams in S(A, n) with such a PRP can provide the image set of n-grams of the same cardinality that can be assumed to be uniformly sampled from the set of all $2^8$ n possible n-grams.

The number of trailing binary zeroes a given n-gram x has can be defined as m=ffs(x), that is a binary operation defined as find first set (ffs). It should be noted m∈ [0 . . . n]. Upon the assumption of uniform sampling of an n-gram, the probability mass function of a given m value can be determined as defined in Equation 5:

$$P(m) = \begin{cases} 2^{-m}, & \text{when } m = 8n \\ 2^{-m-1}, & \text{otherwise} \end{cases} \quad (5)$$

A given data object A is characterized by finding bitmap (A) as is illustrated in Algorithm 1 below.

| Algorithm 1 |
| --- |
| FillBitmap: Fill the Bitmap in the Flajolet-Martin based method |
| 1: procedure FillBitmap(do, n) |
| 2:     Initialize Bitmap to an array of size 8n + 1 with 0 values |
| 3:     while !do.EOF do |
| 4:         gram ← do.read(n) |
| 5:         image ← Hash(gram) |
| 6:         m ← ffs(image) |
| 7:         Bitmap[m] ← 1 |
| 8:     return Bitmap |

If ffz(Bitmap) is defined as the index of the leftmost zero within the Bitmap, a random variable with the following properties is obtained as defined in Equation 6:

$$E(\mathit{ffz}(\text{Bitmap}(A))) = \log 2(\alpha|S(A,n)|) \text{ with standard deviation} \sigma \sim 1.12 \quad (6)$$

It is noted that, a is a constant 'correction factor' reported to converge to a specific value of 0.773 . . . in the limit of S(A, n). "Probabilistic counting algorithms" provides a framework to calculate the α(n) optimized for the specific case of the token size n. This provides a method of getting an estimate of |S(A, n)|) as defined in Equation 7:

$$|S(A,n)| = \alpha^{-1} 2^{E(\mathit{ffz}(\text{Bitmap}(A)))} \quad (7)$$

Applying the above estimating method to an example using a hash function that returns an 8-bit value:

$A$ = BANANA; $n$ = 1

Bitmap = [0, 0, 0, 0, 0, 0, 0, 0, 0]

hash($B$) – 0b10101100 → $m$ = 2

Bitmap = [0, 0, 1, 0, 0, 0, 0, 0, 0]

hash($A$) – 0b11000101 → $m$ = 0

Bitmap = [1, 0, 1, 0, 0, 0, 0, 0, 0]

hash($N$) – 0b11100011 → $m$ = 0

Bitmap = [1, 0, 1, 0, 0, 0, 0, 0, 0]

hash($A$) – 0b11000101 → $m$ = 0

Bitmap = [1, 0, 1, 0, 0, 0, 0, 0, 0]

hash($N$) – 0b11100011 → $m$ = 0

Bitmap = [1, 0, 1, 0, 0, 0, 0, 0, 0]

hash($A$) – 0b11000101 → $m$ = 0

-continued

Bitmap = [1, 0, 1, 0, 0, 0, 0, 0, 0]

$ffz(\text{Bitmap}) = 1$ $|S(A, n)| = \dfrac{2^1}{0.733} = 2.587 \approx 3$

For the |S(A, n)| estimation method, the following can be noted. HitOrder is the number of trailing zeroes in the Hash of a n-gram. The range of the HitOrder is from 0 to HashSize. A Hit is an event where a n-gram outputs a hash value for a specific HitOrder and a Pass is an event where an n-gram outputs a hash value with more trailing zeroes than the specific HitOrder or less if HitOrder #0.

Figure 3:
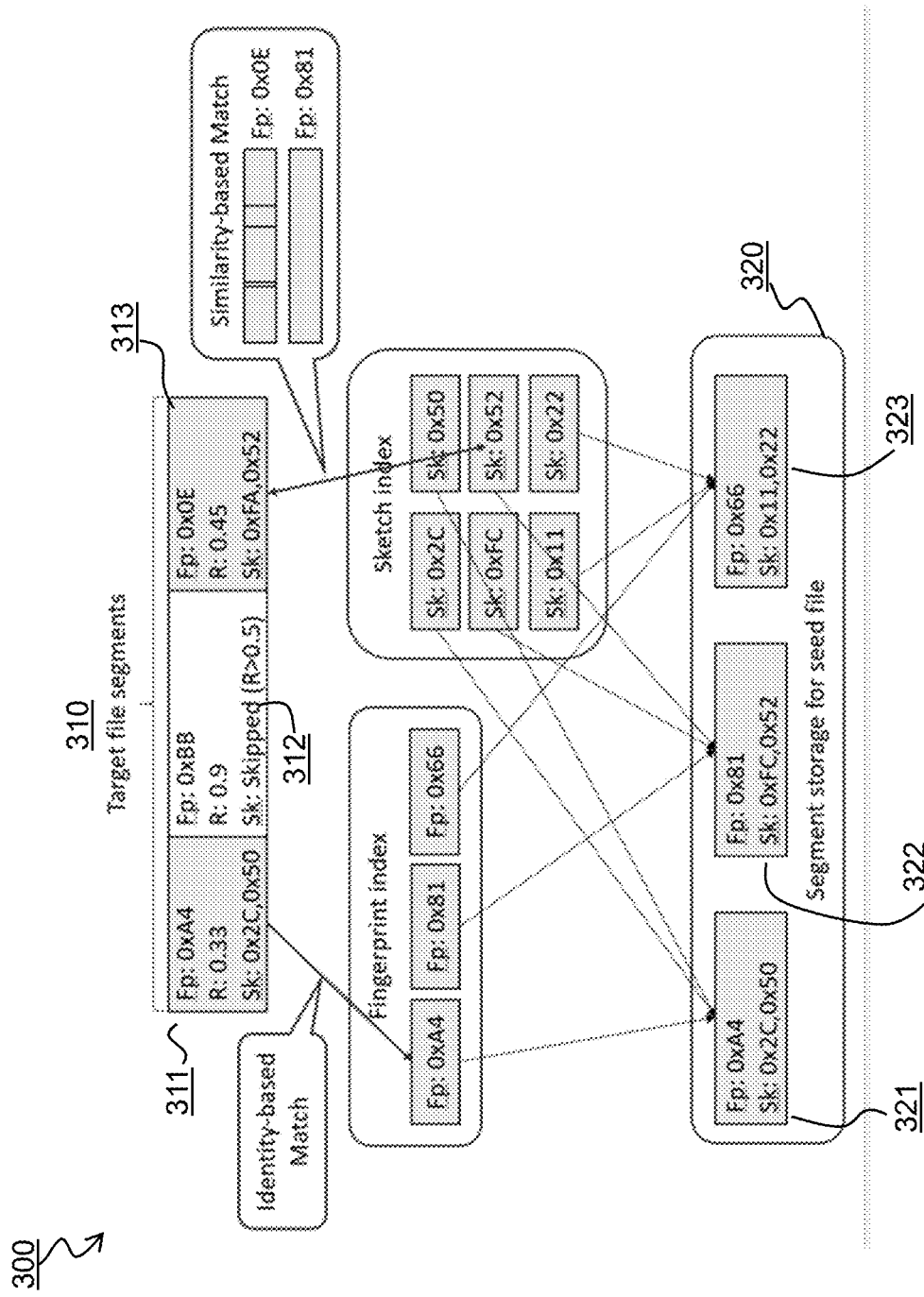
FIG. 3 illustrates an example of an RDC method using a combination of content defined chunking, identity-based deduplication and similarity-based deduplication.

Returning to the overall method of remote differential compression (RDC), FIG. 3 illustrates an example of how a RDC method works using a combination of content defined chunking, identity-based deduplication and similarity-based deduplication. Referring to FIG. 3, the target file 310 is split, using CDC, into three chunks 311, 312 and 313. For each of the three chunks 311, 312 and 313, fingerprint (Fp) and two types of the sketch (Sk) values are calculated.

For the first chunk 311 with Fp=0xA4, there is the exact same chunk of the seed file in the chunk storage 320. This can be identified by determining whether there is a matching fingerprint index among the chunks 321, 322 and 323 in the chunk storage 320. The matching fingerprint index indicates that the recipient already has the same chunk and therefore the sender does not have to send the whole (same) chunk 311 but only sends the fingerprint value as a reference.

For the second chunk 312 with Fp=0xBB and Sk=0xCE, 0x15, there is no identical or similar chunks identified in the seed file and therefore the sender sends the chunk 312 to the recipient as it is, namely in raw form.

For the third chunk 313 with Fp=0x0E and Sk=0xFA, 0x52 has no matching fingerprint index in the in the chunk storage 320. However, it has a delta compression candidate, that is the seed chunk 322 with Fp=0x81 and Sk=0xFC, 0x52, due to the matching sketch index 0x52. Therefore, the third chunk 313 can be encoded as a delta to the existing similar chunk 322 (Fp=0x81). If this delta turns out to be smaller than the raw form, the sender sends only the delta and the fingerprint of the base chunk used, to the recipient.

Segmentation vs Chunking

Both of the two families of deduplication methods presented above (similarity-based deduplication and identity-based deduplication) require splitting the target file into smaller parts called chunks. In deduplication, this can be referred to as data chunking. According to embodiments, there is provided a Jaccard RDC that includes both similarity-based deduplication and identity-based deduplication stages. There can be a need to specify how to split the target files into smaller parts as well.

In the Jaccard RDC method, the step of splitting the input file into smaller parts or chunks can be referred to as the input file segmentation step. The input file segmentation step takes raw input file bytes as input and determines how to split the input file into smaller "segments". Therefore, this input file segmentation serves the same purpose as (data) chunking in respect of similarity-based deduplication and identity-based deduplication. The details of the input file segmentation step are provided below.

The segmentation and chunking can be distinguished in terms of how the data file is split into segments or (data) chunks.

While the segmentation is similar to data clustering, a subtle difference between them is that the concept of the segmentation emphasizes items in the "object" are continuously connected in some manner.

Similarly, the segmentation technique used in various embodiments of the present disclosure splits a data object into a plurality of segments based on characteristics shared in the regions of a file. The regions that share characteristics can be grouped in the same segment. Further characteristics used for the segmentation technique will be provided further elsewhere herein.

By contrast, chunking splits the file into chunks in an arbitrarily manner, namely the regions of the file that would be placed in the same chunk will not be determined based on the characteristics of the data shared by the regions.

RDC and Data Deduplication

Embodiments of the present disclosure uses a data deduplication method and a remote differential compression (RDC) based on that data deduplication. According to embodiments, the data deduplication method can be implemented based on identity-based deduplication and similarity-based deduplication. This base data deduplication method can be further enhanced using data character-informed deduplication and minimal cross-segment similarity (MCSS). The enhanced data deduplication method has the same asymptotic computational and memory costs as the base deduplication method but can be distinguished from the base deduplication method in terms of data character-informed deduplication and MCSS.

The data character-informed deduplication method can provide a probabilistic estimate of R-metric for each chunk. As such, some insight can be obtained with respect to the character of the data of a given chunk. The obtained character can be used to determine the data deduplication mode applied to the given data chunk. In the most straightforward variant, the computational and memory overhead of the similarity-based deduplication method can be minimized by indexing and looking up the sketches for those with the obtained character of the data. The sketches may not need to be indexed or looked up for every chunk but may only for the ones with the known character(s) to maximize the benefit.

The data deduplication method according to the present disclosure chunks the target file with a probabilistic chunking technique which can minimize the cross-chunk similarity. Therefore, segments containing highly different kinds of data can be separated. This makes homogeneous chunks a better fit for deduplication while keeping the benefits of content-defined chunking.

Data Character-Informed Deduplication

Figure 4:
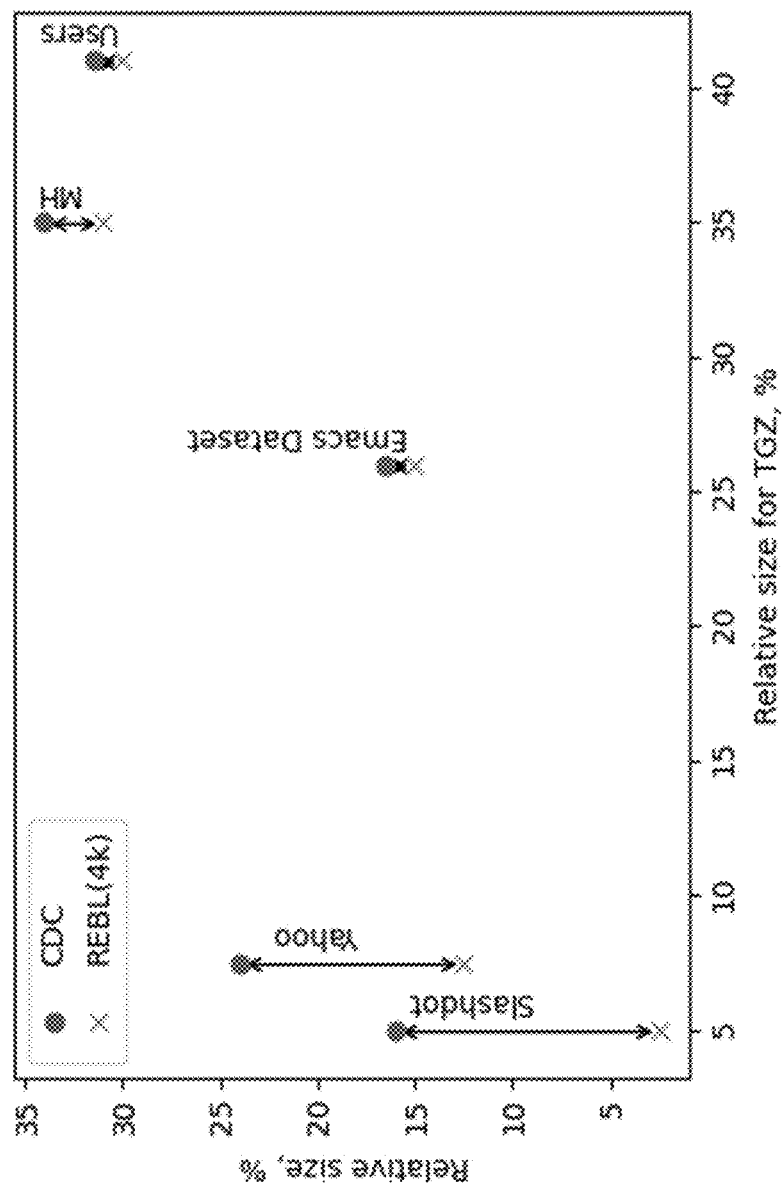
FIG. 4 illustrates a comparative analysis of data reduction gain performed with a number of datasets with various data types.

When data deduplication, which includes similarity-based deduplication, is applied to real datasets, data reduction improvement can be achieved with the following tendency. Generally, delta encoding brings substantial improvement (e.g. gains of 2.0~3.5×) when applied to datasets with low entropy data (e.g. source code versions, uncompressed text system logs, etc.). However, delta encoding brings a limited improvement when applied to datasets containing high entropy data (e.g. compressed or encrypted data, Microsoft Office™ files). The level of entropy may be measured using gzip compressibility. FIG. 4 illustrates a comparative analysis of data reduction gain performed with a number of datasets with various data types.

When two similar files are compressed individually and independently, they can be compressed using different (i.e. non-identical) compression encoding. As a result, the identical parts in those two files can be encoded in an unrecognizably different way. The following shows different compression results acquired when the matching substrings of two plain form strings are independently compressed (i.e. each is individually compressed) with a Huffman algorithm:

old version: ABCC new version: AABC
common substring: ABC
old version optimal huffman vlc: {"A": 00, "B": 01, "C": 1}
old version compressed: 0b000111
new version optimal huffman vlc: {"A":1, "B":00, "C": 01}
new version compressed: 0b110001

As illustrated above, when the compression codes applied for the individual tokens in the two files are different, the similarity between the two versions is undetectable.

Therefore, the similarity-based deduplication generally provides negligible gains over identity-based deduplication when the chunks have high entropy. Put another way, the memory and computational costs of the sketch index can be avoided by applying similarity-based deduplication only for files that contain data of known character thereby providing deduplication gains.

The deduplication scheme can therefore manifest the data character-informed deduplication mode. Each data chunk A can be characterized by an estimate of R(A). This characteristic of data contained in the chunk can often be used to determine whether similarity-based deduplication will be applied.

If a data chunk appears to have low entropy (e.g. R(A)<0.5), this data chunk can be subject to full similarity-based deduplication. The SuperFeature sketches for this data chunk are calculated and then the sketch chunk can be used to find similar chunks that can be delta-encoded against. On the other hand, if the data chunk has high entropy (e.g. R(A)>0.5), this data chunk may be skipped for similarity-based deduplication.

Determining whether to apply similarity-based deduplication based on the characteristic of the data at hand is an example of the data character-informed deduplication. Knowing the R of the data can also dynamically inform other parameters, such as the optimal average size of a data chunk when chunking.

Minimal Cross-Segment Similarity Segmentation

The minimal cross-segment similarity segmentation (MCSS) can be illustrated using an example of designing an RDC scheme for the distribution of Android™ apps (e.g. Android™ package (APK) files). In this case, the target file is an APK file and the seed file is a set of APK files previously generated. Provided that the target files are APK files, the chunking method can take into account the specifics of the APK file format. An APK file is an archive/container file with each component having its own role and containing the data of its own distinct type. For example, according to the APK format specification, lib/x86 contains the application's compiled code for x86 ISA, while lib/arm64-v8a contains the arm86 ISA code.

Figure 5:
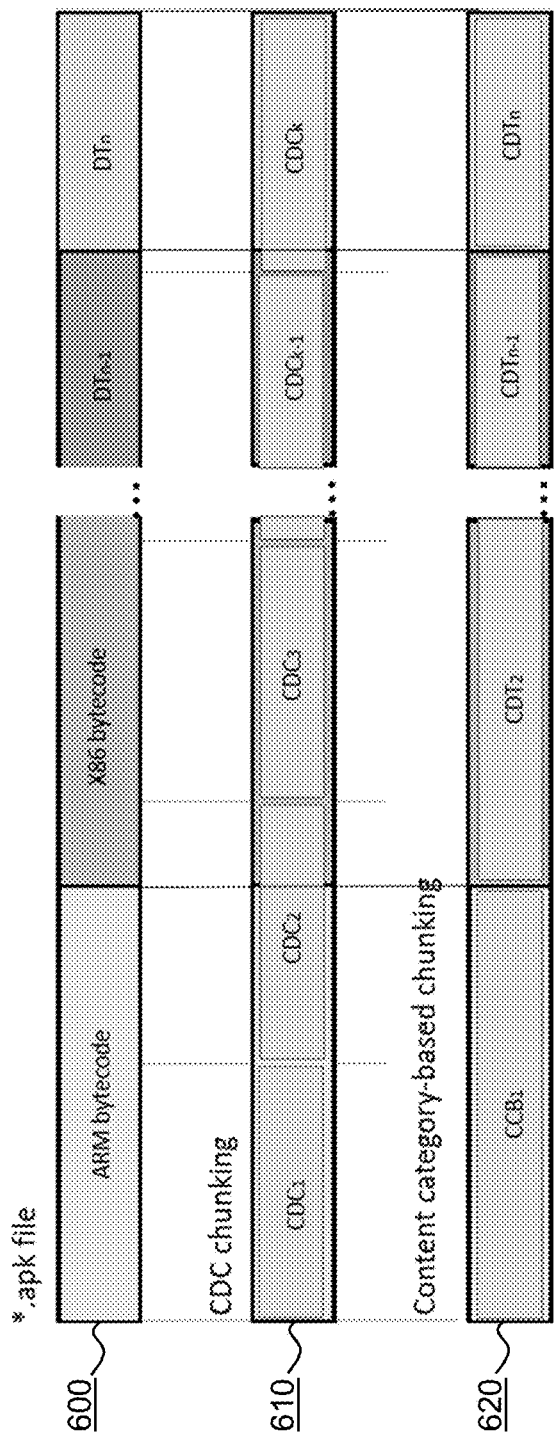
FIG. 5 illustrates a difference between content category-based chunking and content-defined chunking for an Android package (APK) file.

It can be desirable to perform chunking for an APK file such that the lib/x86 component is not split in the middle but fully contained in one data chunk. Such partitioning can be more suitable for both identity-based deduplication and similarity-based deduplication. The chunking based on this partitioning principle can be referred to as content category-based chunking, which is distinguished from content-defined chunking (CDC) or fixed-length chunking. FIG. 5 illustrates difference between content category-based chunking 620 and content-defined chunking (CDC) 610 for an APK file 600.

The content category-based chunking can be beneficial for data deduplication. For example, the separate target file chunks for the lib/x86 component can be paired up for delta encoding with one of the seed file chunks which is a component of the same data type, lib/x86. Provided that file chunks with the same component type share many characters or have a lot of commonalities, the delta encoding step can be made much more efficient using the content category-based chunking.

Figure 6:
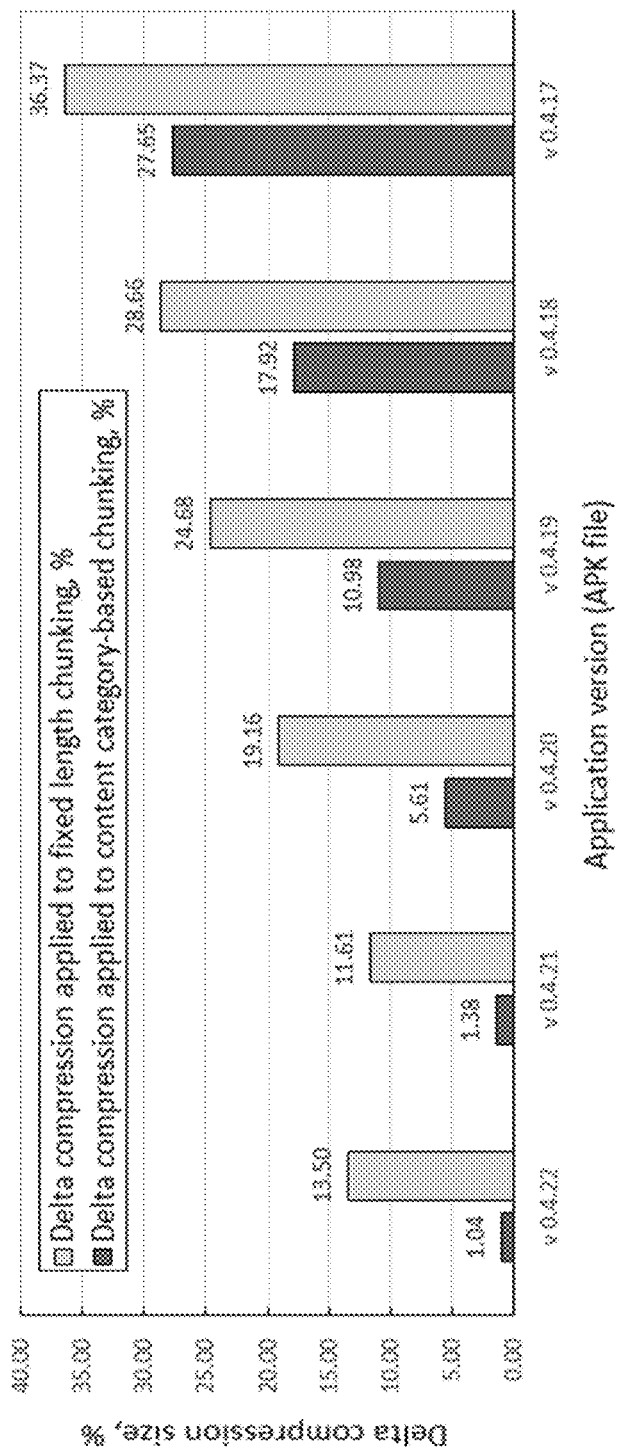
FIG. 6 illustrates a results relating to comparing the effect of delta compression applied to fixed length chunking and content category-based chunking.

FIG. 6 illustrates results of an example comparing the effect of the delta compression applied to fixed length chunking and content category-based chunking.

In this example, the unzipped APK files for two versions of the same Android™ application, the new version serving as a target file and the old version serving as a seed file, are used. The unzipped APK files are chunked using two chunking methods. One of the chunking methods is the content category-based chunking method which regards each distinct component of the APK file as a separate chunk. The other chunking method is the fixed-length chunking method that is known to a skilled person in the art. The number of chunks created in this example is same for both chunking methods.

For comparison of the two chunking methods, each target file chunk is delta-encoded with delta encoding (e.g. delta-encoding implemented based on Golang's standard library deflated with the base chunk added as a dictionary). The delta-encoding includes the process of finding the seed file chunk that yields the highest delta encoding compression.

Comparing the two chunking methods, there is significant improvement in terms of the delta compression size, as illustrated in FIG. 6. Therefore, consideration of the content categories of the segments in the data files can be beneficial for data deduplication.

Figure 7:
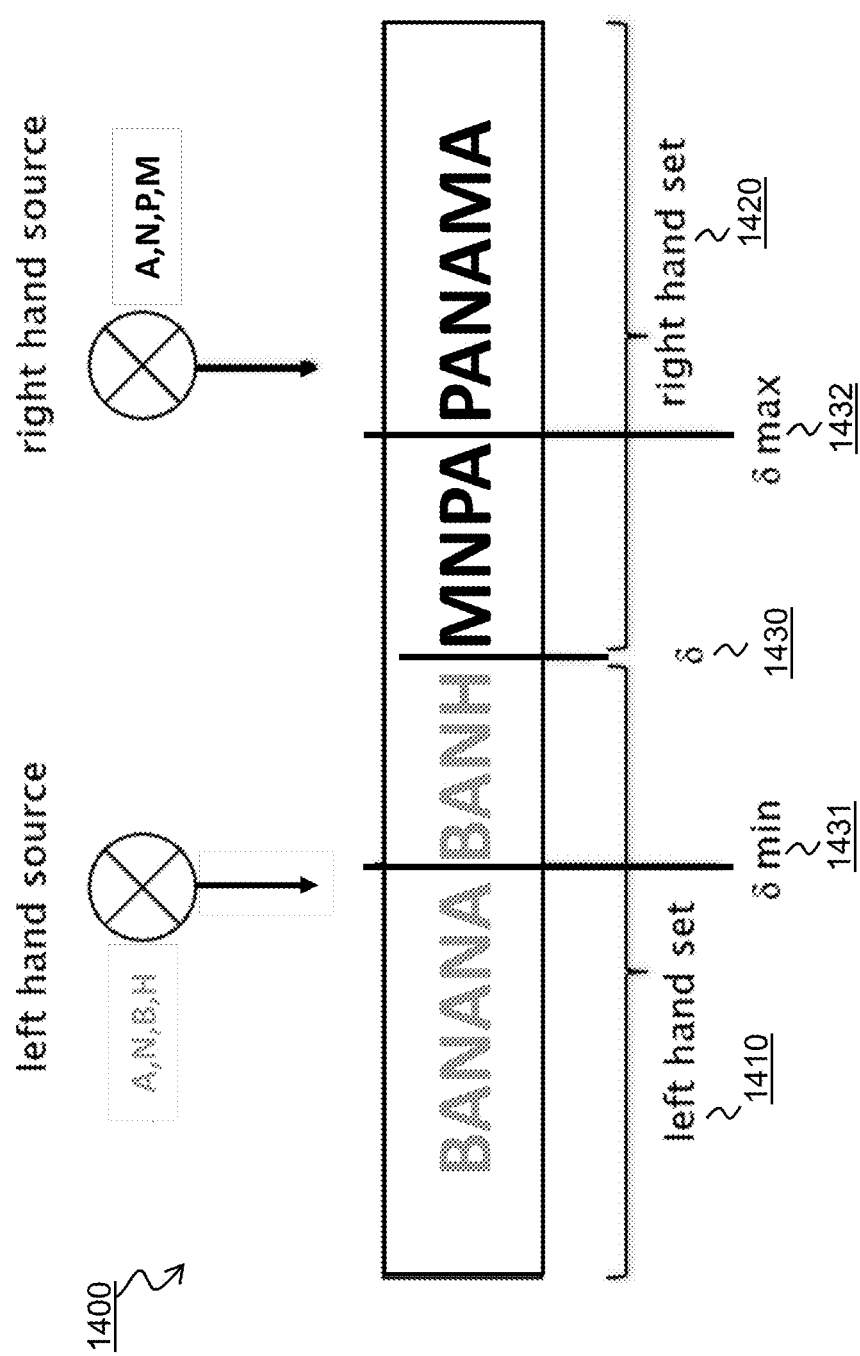
FIG. 7 illustrates formalization of chunking criteria for chunking by the principle of minimal cross-segment similarity (MCSS) and specifically to identifying formalization of the chunking criteria for a two segment uniform n-gram probability mass function (PMF) model, in accordance with embodiments of the present disclosure.

Based on the above, the effect of content category-based chunking in deduplication can be considered more generally. Chunking by the principle of MCSS, can rendering benefit from the effect of content category-based chunking for arbitrary data targets. FIG. 7 illustrates formalization of chunking criteria for chunking by the principle of minimal cross-segment similarity (MCSS) and in particular to identifying formalization of the chunking criteria for the two segment uniform n-gram PMF model, in accordance with embodiments of the present disclosure.

Referring to FIG. 7, the string A (i.e. 'BANANA-BANHMNPAPANAMA') is split into two. In order to split the string into two, the chunk border position $\delta$ needs to be determined. Given min_segment_size, a parameter for minimal chunk size, the constraint for the chunk border position $\delta$ (i.e. limits on the $\delta$ value) can be defined as $\delta_{min} \leq \delta \leq \delta_{max}$, where $\delta_{min}$=min_segment_size, $\delta_{max}$=L(A)−min_segment_size.

The chunking by the principle of MCSS under these constraints can be denoted as $\delta_{MCSS}$, wherein $\delta_{MCSS}$ needs to be chosen such that $\delta_{MCSS}$ produces the two chunks A[0 ... $\delta$] and A[$\delta$ ... L(A)] with the least possible J similarity metric as illustrated in Equation 8 below.

$$\delta_{MCSS} = \min\nolimits_{\delta_{min} \leq \delta \leq \delta_{max}} J(A[0 \ldots \delta], A[\delta \ldots L(A)]) \qquad (8)$$

The chunking by the principle of MCSS can be generalized for arbitrary chunking as follows. The target is chunked such that the resultant segments have the following property—any two subintervals $I_1$, $I_2$ of the MCSS segment C with size of min_segment_size have a similarity greater than the threshold J value, as is illustrated in Equation 9 below.

$$J(I_1, I_2) > J_{threshold} \qquad (9)$$

Therefore, based on the above, the MCSS segments produced by chunking by the principle of MCSS can be expected to probabilistically reproduce the benefits of content category-based chunking, and therefore may lead to stronger deduplication.

Figure 8:
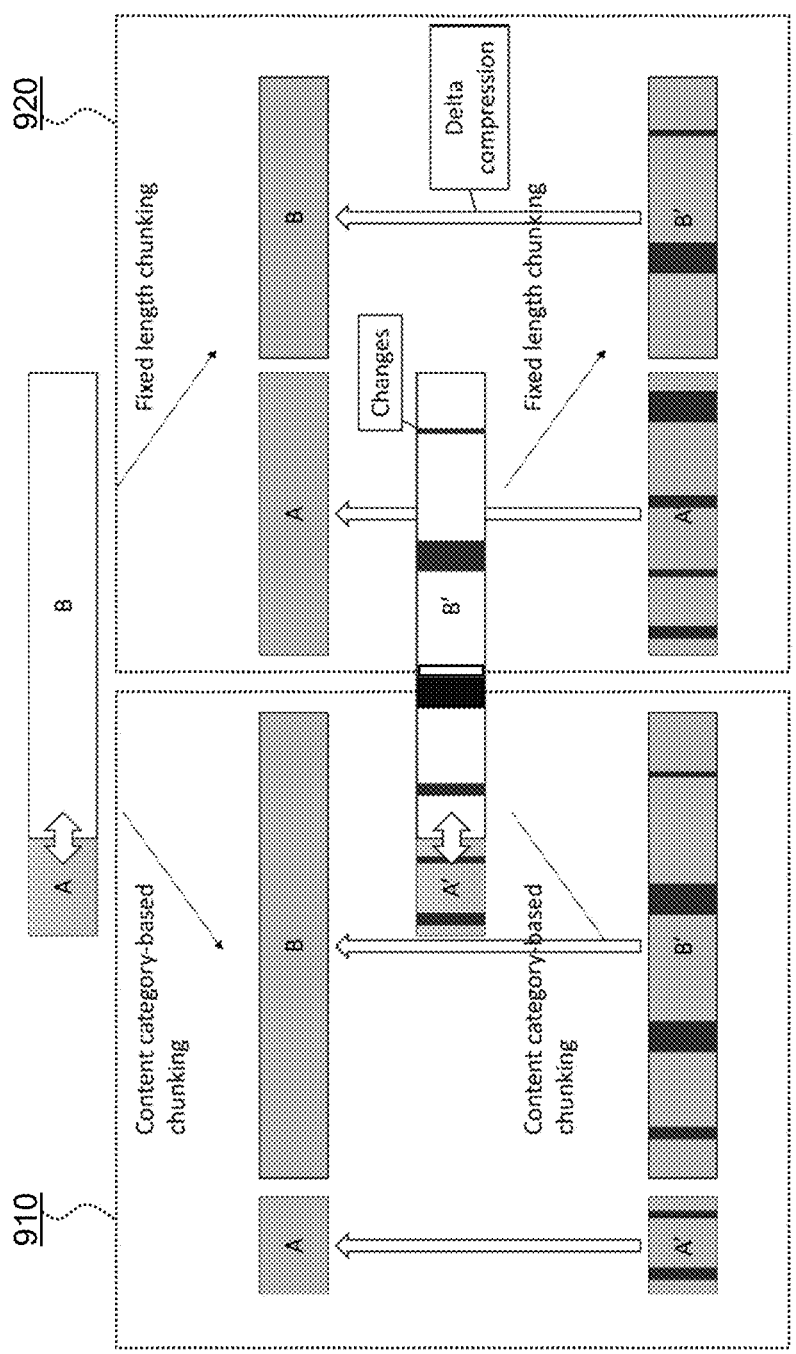
FIG. 8 illustrates steps for comparing the effects of two chunking methods, namely the content category-based chunking and the fixed length chunking.

FIG. 8 illustrates the steps of an example exploring the effects of two chunking methods, the content category-based chunking and the fixed length chunking. In the example illustrated in FIG. 8, an initial target file containing two segments A and B was generated. Specifically, the segment A was created by randomly sampling tokens from a set of 26 distinct n-grams, and segment B was sampled from a set of 100 distinct n-grams. The intersection between the sets of n-grams was empty. From the initially generated target file, another version of the same file was generated with modifications on each segment A' and B'.

The generated pair of files were divided into chunks by two methods, according to the content size (e.g. content category-based chunking 910) as illustrated in the left side of FIG. 8, and fixed length (e.g. fixed length chunking 920) as illustrated in the right side of FIG. 8. Then, the obtained chunks of the modified file were compressed using delta encoding with the initial target file as a reference. The example illustrated in FIG. 8 was repeated while changing the size difference between the file segments.

Figure 9:
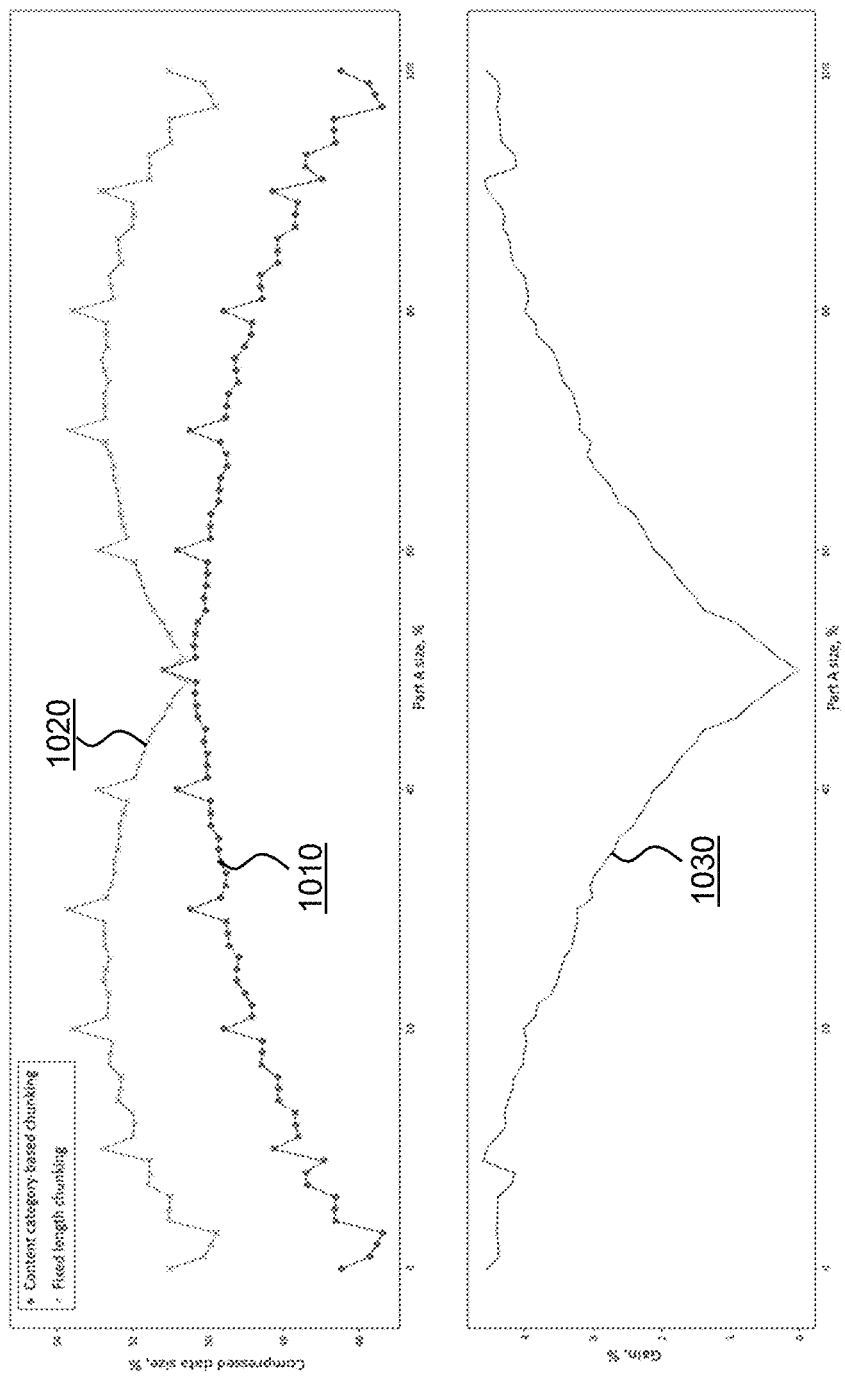
FIG. 9 illustrates a comparison of the two chunking methods defined FIG. 8.

FIG. 9 illustrates the results obtained from the example illustrated in FIG. 8.

The upper graphs 1010 and 1020 show the results for the two chunking techniques illustrated in FIG. 8, respectively (i.e. graph 1010 for the content category-based chunking 910 and graph 1010 for the fixed length chunking 920). It can be seen that both methods output the same result when the segment sizes are equal (i.e. 50%) as both chunking methods 910 and 920 produce the same output. In other cases (when the segment sizes are not equal), the compression gain is larger for instances where content-category based chunking 910 is performed when compared to instances where fixed-length chunking 920 is performed. The compression gain difference between both chunking techniques is plotted in the lower graph 1030.

According to embodiments, there is provided a method for remote differential compression (RDC) and data deduplication, which herein is called Jaccard RDC. According to embodiments, when the sender acquires a new target file, the following steps are performed:

Step 1: Jaccard segmentation of the input or target file;
Step 2: Identity-based segment deduplication;
Step 3: Similarity-based segment deduplication;
Step 4: Transport the target file in the deduplicated form to the recipient; and
Step 5: The recipient restores the original target file from the deduplicated form.

According to some embodiments, both the recipient and the sender have components including write-ahead log, seed file storage and sketch index. In the write-ahead log, each change to the file can be recorded as a transaction. The write-ahead log can be append-only therefore each transaction is only added at the end of the file, including failures and retries. The seed file storage can be the key-value structure where the key is a strong fingerprint. In various embodiments, the key can be a hash function such as SHA-256. The sketch index can be a key-value structure or a dictionary data structure where the keys are the sketches and the values are the list of fingerprints of the matching chunks.

According to embodiments, when it receives a new target file (i.e. input), the sender performs the Jaccard segmentation of the target file. The Jaccard segmentation of the target file includes partitioning the target file into the segments, and each segment can be characterized by the metrics including i) the position where the segment border starts within the target file, ii) the estimation of the segment's R-metric, iii) the secure fingerprint of the segment (e.g. SHA-256) and iv) the segment's sketches. The input file segmentation is disclosure in further technical detail below and elsewhere in the present disclosure, including the concept of the Jaccard table.

An objective of Jaccard segmentation is to generate a segmentation that is a probabilistic approximation of the MCSS segmentation as illustrated above. This can be achieved without generating high computational overhead thereby rendering the input file segmentation step practical even when applied to massive dataset.

According to embodiments, the output of the Jaccard segmentation is the segments which the target file is partitioned into. For example, each segment is given the following characterizations.

Fingerprint: e.g. for the segment [B, A, N, A, N, A], '0xd8' is obtained;
R-metric value of the segment: a floating point value that is $0<R\leq1$; e.g. R([B, A, N, A, N, A])=0.5
several sketch values for similarity-based deduplication When, conceptually, the target file looks like the following,
[B, A, N, A, N, A, 0xb4, 0x93, 0xd4, 0x83, 0x64, 0xaf]
the output of the input file segmentation is segments that the target file is split into, and the characteristic values for each segment can look like the following:

segment 0xd8: [B, A, N, A, N, A], R=0.5, sp1=0x26, sp2=0x18
segment 0x35: [0xb4,0x93,0xd4,0x83,0x64,0xaf], R=1.0, sp1=0xf1, sp2=0x0c According to embodiments, upon acquisition of the target file's segmentation (e.g. output of the input file segmentation step), the sender performs identity-based segmentation deduplication. In this step, the sender searches the secure fingerprints of the new segments (for example in the fingerprint-indexed storage) that contain the segments of the seed file. The segments of the seed file are the segments that are previously added.

According to embodiments, the sender outputs the identified and marked segments of the target file through the identity-based segmentation deduplication. To generate the identified and marked segments, the sender takes inputs of the target file's segmentation (e.g. Jaccard segmentation of the target file obtained from the input file segmentation step) and the recipient's fingerprint index. The identified and marked segments of the target file are identical to the segments of the seed file. In some embodiments, existing deduplication method(s) based on a secure fingerprint, for example the identity-based deduplication illustrated above in the present disclosure, can be used for this step.

According to embodiments, the sender performs a similarity-based segmentation deduplication. In this step, the sender identifies the target file segments that are similar (but not identical) to the seed file segments. Then, the sender encodes such segments as the delta update over a similar segment, and only changes between the two segments can be stored.

In the similarity-based segmentation deduplication, the sender takes inputs of the target file's segmentation (e.g. Jaccard segmentation of the target file obtained from the input file segmentation step) and the recipient's sketch index. When performing the similarity-based deduplication, the sender can output the delta-encoding segments of the target file. The delta-encoding segments of the target file would be identical to the segments of the seed file.

In some embodiments, the similarity-based segmentation deduplication can be implemented similar to the existing similarity-based segmentation deduplication method described above. Also, techniques similar to 'locally-sensitive hashing' and 'super-feature' may be used for this step.

In some embodiments, similarity-based segmentation can be enhanced using the data character-informed deduplication. Using the estimate of the R-metric value for each of the new data segments, the character of that data segment can be obtained. The obtained data character would enable searching the segments containing the data types that are known to work well. This can allow for the minimizing of the overhead (e.g. computational and memory overhead) of the similarity-based segment deduplication, as only the sketches of the most beneficial segments can be tracked.

According to embodiments, when the identity-based segmentation deduplication and the similarity-based segmentation deduplication are performed, the sender prepares the target file in the deduplicated form and transports it to the recipient. The target file in the deduplicated form is a list of the segments each of which is encoded in the way based on its type as illustrated above. To prepare the target file in the deduplicated form (i.e. output), the sender takes inputs of the target file's segmentation, the segments marked in the identity-based deduplication and the delta encoded segments from the similarity-based deduplication.

According to embodiments, there are provided multiple segmentation types, wherein each segmentation type has an associated "encoding" configuration. According to embodiments, the segmentation type can be classified into the categories defined as identical, similar and different. The first segmentation type occurs when segments of the target file are identical to the associated seed file segments, which are identified in the identity-based deduplication step. For this segmentation type, sending the recipient the fingerprints of such segments can be required. The second segmentation type occurs when segments of the target file are similar to the associated segments of the seed file. For this segmentation type, the segments can be delta-encoded segments with the reference to the associated seed file segment. These segments are acquired from the similarity-based deduplication step. For this segmentation type the fingerprint of the seed segment and the segment's delta would be transmitted to the recipient so that the recipient can restore this segment. The last segmentation type is related to the remaining segments identified during the deduplication process. For this segmentation type the target segment and the associated segment of the seed file are different and as such, the segment of the target file can be transmitted to the recipient in full or literal mode, namely without any compression due to the degree of difference between the target segment and the corresponding segment of the seed file.

According to embodiments, upon receipt of the target file in the deduplicated form, the recipient restores the original target file. The recipient can recover the original target file from its deduplicated form (i.e. the 'target file in the deduplicated form' is the input and the 'original target file' is the output). Therefore, the target file is replicated or synchronized at the recipient using a remote differential compression method.

According to embodiments, technical details of the method of input file segmentation presented above are provided below.

Jaccard Table

The detail of the probabilistic data structure Jaccard table is illustrated below. The core idea behind the Jaccard table can be illustrated using an analogy illustrated in FIG. 10.

According to embodiments, Jaccard table refers to a probabilistic data structure, wherein the Jaccard table of a data object is a data structure that only contains the information needed to detect the composition of the data object, or to identify whether or where one segment turns into another. For example a Jaccard table can define information indicative of the composition of a target file or transitions between segments of the target file.

Figure 10:
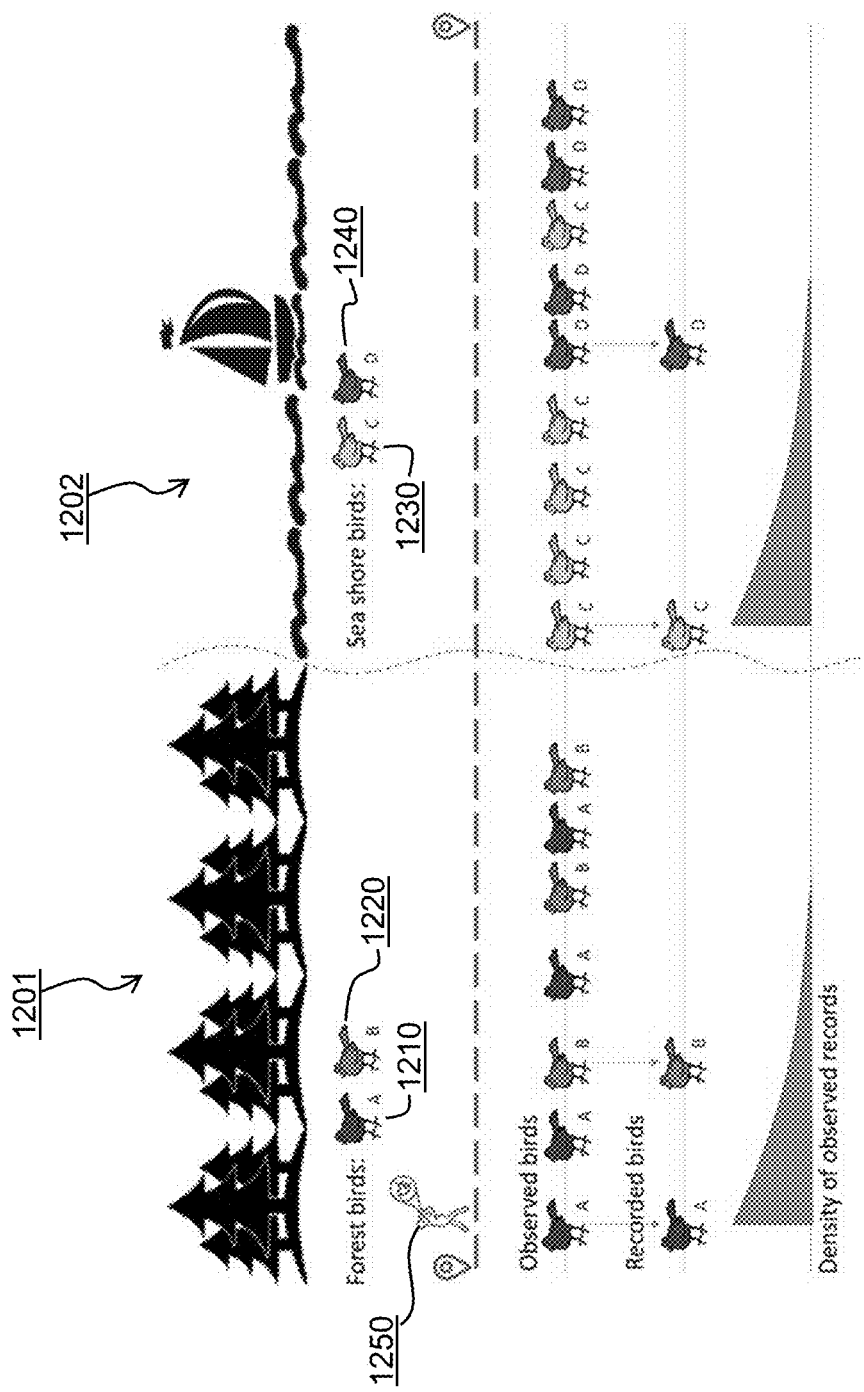
FIG. 10 illustrates an analogy of the core idea of a Jaccard table.

Referring to FIG. 10, there is a birdwatcher 1250 who makes a record while tracking a trail whenever the birdwatcher 1250 encounters a type of bird that the birdwatcher has not seen until that point. The birdwatcher 1250 records the specific location where the bird was spotted within the trail, but only when birdwatcher sees each bird type for the first time (i.e. the birdwatcher will ignore when they see the same type of birds later). The trail passes through two distinct regions, first the forest 1201 and then the seashore 1202, and there are the bird species 1210 and 1220 that live only in the forest 1201 and other bird species 1230 and 1240 that live only on the seashore 1202.

Based on the records made when the birdwatcher 1250 hikes the above trail, the following observation can be made. Starting from the forest 1201, most birds that the birdwatcher 1250 sees are first of its kind and therefore merit a record. However, as the birdwatcher continues to hike (towards the seashore 1220), the birdwatcher 1250 would face birds that she has recorded previously. Therefore, the density of the records (e.g. the number of records per kilometer in the trail) is expected to decrease steadily.

When the birdwatcher 1250 arrives at the seashore 1202, she would start seeing new types of birds (i.e. birds that she has never encountered in the forest 1201). Therefore, the density of the records is now expected to spike. Then, like the case of the forest birds 1210 and 1220, as the birdwatcher 1250 continues to hike, the birdwatcher would face birds that the birdwatcher has seen on the seashore 1202 previously, and therefore the density of the record would decrease.

Therefore, the distribution of where on the trail the birdwatcher 1250 made records contains information about the geography of the trail or where on the trail one biome turns into a different one. For the sake of this analogy, specific bird species or biomes are not of particular interest. Instead, focus is on the composition of the trail, for example where on the trail one biome is transitioned into another biome and characteristics of each biome, such as the size and relative uniqueness of the birds. Therefore, only the location of the record (e.g. where each record is made) is needed, not about the specific species seen by the birdwatcher 1250.

The above analogy describes the core idea behind the Jaccard table. The Jaccard table of a given data object A, denoted as JT(A), is a data structure which only contains the information needed to detect the composition of the data object or information about whether and where one segment turns into another. For that, occurrence of n-grams (equivalent to birds in the above analogy), which have not previously been observed in the linear traversal of the target data object, is spotted.

Cardinality of a from JT(A)

As stated above, the Flajolet-Martin probabilistic counting approach can be applied to estimate $|S(A, n)|$ of a given data object A with the memory overhead of only $\log 2^{8n} \sim \log n$. Specifically, Algorithm 1 presented above specifies iterating through a data object A's n-grams and obtaining the bitmap data structure. The Bitmap(A) of the given data object A allows us to estimate the |S(A, n)|.

Similarly, the Jaccard table (JT) of a given data object A (JT(A)) can be illustrated as an array obtained by iterating through the data object A's n-grams as is illustrated in Algorithm 2 below.

---
Algorithm 2 FillJaccardTable
---
1: procedure FillJaccardTable (do, n)
2:     Initialize JT to an array of size 8n + 1 with 0 values
3:     for gram, position ∈ do do
4:         image ← Hash(gram)
5:         m ← ffs(image)
6:         if JT [m] == 0 then
7:             JT [m] ← position
8:     return JT
---

For reference, the following outlines some of the language that is used in the instant application. 'HashSize' refers to a Jaccard RDC parameter indicative of the image size of the Hash. 'HitOrder' refers to the number of trailing zeroes in the Hash of an n-gram. The range of the HitOrder is from 0 to HashSize. 'Hit' refers to an event where an n-gram outputs a hash value for a specific HitOrder value. 'HitWindowPosition' refers to the position relative to the CascadingWindow where a Hit is observed.

While the Jaccard table is similar to a bitmap, they are distinguished in that, when a Hit (e.g. is encountered, instead of just flipping a bit as is done in the bitmap, the Jaccard table records the position where this Hit is encountered in the data object (i.e. HitWindowPosition). Thus, the result of Equation (6) above can be applied to come up with a method of estimating |S(A, n)| given JT(A), as outlined in Algorithm 3 below.

---
Algorithm 3 TableToCardinality: Get the cardinality of the set of n-grams for a given data segment based on its Jaccard Table
---
1: procedure TableToCardinality (table)
2:     Initialize count to zero
3:     for i ← 0...NumOfHashFunc-1 do
4:         for j ← 0... HashSize-1 do
5:             if table [i][j] == 0 then
6:                 break
7:             count ← count + 1
8:     average ← count/NumOfHashFunc
9:     return $1.2928 \cdot 2^{average}$
A = BANANA; n = 1
JT(A) = [0, 0, 0, 0, 0, 0, 0, 0, 0]
hash(B) = 0b101010000 → m = 3
JT = [0, 0, 0, 0, 0, 0, 0, 0, 0]
hash(A) = 0b11000101 → m = 0
JT(A) = [1, 0, 0, 0, 0, 0, 0, 0, 0]
hash(N) = 0b11100011 → m = 0
JT(A) = [1, 0, 0, 0, 0, 0, 0, 0, 0]
hash(A) = 0b11000101 → m = 0
JT(A) = [1, 0, 0, 0, 0, 0, 0, 0, 0]
hash(A) = 0b11100011 → m = 0
JT(A) = [1, 0, 0, 0, 0, 0, 0, 0, 0]
hash(A) = 0b11000101 → m = 0
JT(A) = [1, 0, 0, 0, 0, 0, 0, 0, 0]
ffz(JT(A)) = 1

$|S(A, n)| = \frac{2^1}{0.773} = 2.587 \approx 3$

Cardinality of the Union: |S(A, n) ∪ S(B, n)| from JT(A) and JT(B)
---

The method of estimating S(A, n) from JT(A) outlined in Algorithm 3 can be generalized to the method of estimating S(A, n) u S(B, n) from JT(A) and JT(B) as outlined in Algorithm 4 below.

---
Algorithm 4 TablesToUnionCardinality: takes two Jaccard Tables for two data objects and outputs the cardinality of the union of the sets of n-grams of these data objects
---
1: procedure TablesToUnionCardinality (table1, table2)
2:     Initialize count to zero
3:     for i ← 0...NumOfHashFunc-1 do
4:         for j ← 0... HashSize-1 do
5:             if table1 [i][j] == 0 and table2 [i][j] == 0 then
6:                 break
7:             count ← count + 1
8:     average ← count/NumOfHashFunc
9:     return $1.2928 \cdot 2^{average}$
data = BANANAPANAMA
A = BANANA; B=PANAMA; n = 1
JT(A) = [1, 0, 0, 0, 0, 0, 0, 0, 0]
JT(B) = [1, 0, 0, 4, 0, 0, 0, 0]
JT(A∪B) = [1, 0, 0, 0, 0, 0, 0, 0]
ffz(JT(A∪B)) = 2

$|S(A, n) \cup S(B, n)| = \frac{2^2}{0.773} = 5.1746 \approx 5$

Cardinality of the Intersection: |S(A, n) ∩ S(B, n)| from JT(A) and JT(B)
---

The method of estimating |S(A, n)∩S(B, n)| from JT(A) and JT(B) is not simply a modification (e.g. replacing 'and' with 'or' under the 'if' condition) of Algorithm 4. For example, in the case of an n-gram x that only occurs in the data object A and an element y that only occurs in the data object B, if they have the same ffs(x)=ffs(y), such simple modification would render erroneous estimation of |S(A, n)∩S(B, n)|. As such, a different way of estimating the intersection cardinality is desired. It is understood that the term 'ffs' or "find first set" refers to a term for a binary operation where a binary word is taken and the index or position of the least significant bit set is returned to binary one instead of zero.

Instead, the following relation can be used to estimate the intersection cardinality:

$$|S(A,n) \cap S(B,n)| = |S(A,n)| + |S(B,n)| - |S(A,n) \cup S(B,n)|$$

where estimates of S(A, n) and S(B, n) can be obtained using Algorithm 3 and |S(A, n) U S(B, n)| using Algorithm 4.

J(A, B) from JT(A) and JT(B)

As described above, the metric J(A, B) can be used to quantify the similarity between two data objects. This metric is calculated as the size of the intersection divided by the size of the union. Combining the methods of estimating S(A, n)∩S(B, n) and |S(A, n)∪S(B, n) using JT (A) and JT (B), the method of estimating J(A, B) can be acquired as outlined in Algorithm 5.

---
A = BANANA; B=PANAMA; n = 1
JT(A) = [1, 0, 0, 0, 0, 0, 0, 0, 0]

$|S(A, n)| = \frac{2^1}{0.773} = 2.587 \approx 3$

JT(B) = [1, 0, 0, 4, 0, 0, 0, 0]

$|S(B, n)| = \frac{2^2}{0.773} = 5.1746 \approx 5$

JT(A∪B) = [1, 0, 0, 0, 0, 0, 0, 0]
ffz(JT(A∪B)) = 2

$|S(A, n) \cup S(B, n)| = \frac{2^2}{0.773} = 5.1746 \approx 5$

|S(A, n) ∩ S(B, n)| = |S(A, n)| + |S(B, n)| - |S(A, n) ∪ S(B, n)| = 5 + 3 − 5 = 3

| Algorithm 5 CalcJ: Calculate J metric which tells how similar are the input tables |
| --- |
| 1: procedure CalcJ (table2)<br>2:     dem ← TablesToUnionCardinality (table1, table2)<br>3:     num ← TableToCardinality (table1) + TableToCardinality (table2)<br>4:     return $\frac{num}{dem} - 1$<br><br>data = BANANAPANAMA<br>A = BANANA; B=PANAMA; n = 1<br>\|S(A, n)\| = 3<br>\|S(B, n)\| = 3<br>\|S(A, n) ∪ S(B, n)\| = 5<br>\|S(A, n) ∩ S(B, n)\| = 3<br><br>$J(A, B) = \frac{8}{5} - 1 = \frac{3}{5} = 0.6$ |

Jaccard Table Directions: jt_bwd and jt_fwd

While the Bitmap(A) is identical to Bitmap(Reverse(A)), it is not the case for the Jaccard table. In fact, JT(A) can look very different from JT(Reverse(A)). This indicates that the Jaccard table does not equally treat the n-grams in the data object. For example, the very first n-gram is considered when the Jaccard table is empty and therefore is guaranteed to produce a Hit and its position to be reflected in the Jaccard table. By contrast, the very last n-gram is evaluated when the Jaccard table is almost fully filled. Chance is significantly higher that there is the last n-gram's ffs value was already filled in the Jaccard table.

One way to address this is the backward-directed Jaccard table of a data object A, or jt_bwd(A) as bwd(A)=JT (Reverse(A)). In this regard, the Jaccard table illustrated above can be referred to as forward-directed Jaccard table or jt_fwd. The data object A's n-grams needs to be traversed at least once in order to obtain jt_fwd(A) and jt_bwd(A) using the filling rule illustrated in Algorithm 6 below.

| Algorithm 6 Fill jt_bwd, jt_fwd: |
| --- |
| 1: procedure FillJaccardTable (do, n)<br>2:     Initialize jt bwd to an array of size 8n + 1 with ∅ values<br>3:     Initialize jt fwd to an array of size 8n + 1 with ∅ values<br>4:     for gram, position ∈ do do<br>5:         image ← Hash(gram)<br>6:         m ← ffs(image)<br>7:         jt_bwd[m] ← position<br>8:         if jt_fwd [m] == ∅ then<br>9:             jt_fwd ← position<br>10:    return jt_bwd, jt_fwd<br>do = BANANAPANAMA; n = 1<br>jt_fwd = [∅, ∅, ∅, ∅, ∅, ∅, ∅, ∅, ∅]<br>jt_bwd = [∅, ∅, ∅, ∅, ∅, ∅, ∅, ∅, ∅]<br>hash(B) = 0b10101000 → m = 3<br>jt_fwd = [∅, ∅, ∅, 0, ∅, ∅, ∅, ∅, ∅]<br>jt_bwd = [∅, ∅, ∅, 0, ∅, ∅, ∅, ∅, ∅]<br>hash(A) = 0b11000101 → m = 0<br>jt_fwd = [1, ∅, ∅, 0, ∅, ∅, ∅, ∅, ∅]<br>jt_bwd = [1, ∅, ∅, 0, ∅, ∅, ∅, ∅, ∅]<br>hash(N) = 0b11100011 → m = 0<br>jt_fwd = [1, ∅, ∅, 0, ∅, ∅, ∅, ∅, ∅]<br>jt_bwd = [2, ∅, ∅, 0, ∅, ∅, ∅, ∅, ∅]<br>hash(A) = 0b11000101 → m = 0<br>jt_fwd = [1, ∅, ∅, 0, ∅, ∅, ∅, ∅, ∅]<br>jt_bwd = [3, ∅, ∅, 0, ∅, ∅, ∅, ∅, ∅]<br>hash(N) = 0b11100011 → m = 0<br>jt_fwd = [1, ∅, ∅, 0, ∅, ∅, ∅, ∅, ∅]<br>jt_bwd = [4, ∅, ∅, 0, ∅, ∅, ∅, ∅, ∅]<br>hash(A) = 0b11000101 → m = 0<br>jt_fwd = [1, ∅, ∅, 0, ∅, ∅, ∅, ∅, ∅] |

| Algorithm 6 Fill jt_bwd, jt_fwd: |
| --- |
| jt_bwd = [5, ∅, ∅, 0, ∅, ∅, ∅, ∅, ∅]<br>hash(P) = 0b11011010 → m = 1<br>jt_fwd = [1, 6, ∅, 0, ∅, ∅, ∅, ∅, ∅]<br>jt_bwd = [5, 6, ∅, 0, ∅, ∅, ∅, ∅, ∅]<br>hash(A) = 0b11000101 → m = 0<br>jt_fwd = [1, 6, ∅, 0, ∅, ∅, ∅, ∅, ∅]<br>jt_bwd = [7, 6, ∅, 0, ∅, ∅, ∅, ∅, ∅]<br>hash(N) = 0b11100011 → m = 0<br>jt_fwd = [1, 6, ∅, 0, ∅, ∅, ∅, ∅, ∅]<br>jt_bwd = [8, 6, ∅, 0, ∅, ∅, ∅, ∅, ∅]<br>hash(A) = 0b11000101 → m = 0<br>jt_fwd = [1, 6, ∅, 0, ∅, ∅, ∅, ∅, ∅]<br>jt_bwd = [9, 6, ∅, 0, ∅, ∅, ∅, ∅, ∅]<br>hash(M) = 0b01111000 → m = 3<br>jt_fwd = [1, 6, ∅, 0, ∅, ∅, ∅, ∅, ∅]<br>jt_bwd = [9, 6, ∅, 10, ∅, ∅, ∅, ∅, ∅]<br>hash(A) = 0b11000101 → m = 0<br>jt_fwd = [1, 6, ∅, 0, ∅, ∅, ∅, ∅, ∅]<br>jt_bwd = [11, 6, ∅, 10, ∅, ∅, ∅, ∅, ∅] |

When jt_fwd(A) of the data object A is known, jt_fwd (A[0 ... x]) for an arbitrary position x, where 0<x<L(A) within this data object A, can be obtained using jt_fwd(A) simply by replacing the positions within jt_fwd(A) outside of the [0 ... x] range with ∅, as illustrated in Algorithm 7 below.

| Algorithm 7 GetFwdSubIntervalTable:<br>Takes a jt_fwd of a given data object as an input, and returns the Jaccard Table for a left-aligned subinterval of this data object |
| --- |
| 1: procedure GetFwdSubIntervalJT (JT, position)<br>2:     result ← JT<br>3:     for row ← 0...NumOfHashFunc-1 do<br>4:         for pos ← 0...HashSize-1 do<br>5:             if pos ≥ position then<br>6:                 result[row][pos] ← ∅<br>7:     return result |

Similarly, when jt_bwd(A) of the data object A is known, jt_bwd(A[x ... L]) for an arbitrary position x, where 0<x<L(A) within this data object A, can be obtained using jt_bwd(A) simply by replacing the positions within jt_bwd (A) outside of the [x ... L] range with ∅, as illustrated in Algorithm 8 below.

| Algorithm 8 GetBwdSubIntervalTable:<br>Takes a jt_bwd of a given data object as an input, and returns the Jaccard Table for a right-aligned subinterval of this data object |
| --- |
| 1: procedure GetBwdSubIntervalJT (JT, position)<br>2:     result ← JT<br>3:     for row ← 0...NumOfHashFunc-1 do<br>4:         for pos ← 0...HashSize-1 do<br>5:             if pos ≤ position then<br>6:                 result[row][pos] ← ∅<br>7:     return result<br>do = BANANAPANAMA; n = 1<br># let's get the fwd table for just the PANAMA part<br>jt_bwd = [11, 6, ∅, 10, ∅, ∅, ∅, ∅, ∅]<br>JT(B) = jt_bwd(do[−6:]) = [11, 6, ∅, 10, ∅, ∅, ∅, ∅, ∅] # filter out positions < 6<br># the result matches the previous JT calculated for PANAMA with the position offset of 6 |

Based on two consecutive Jaccard tables JT(A[0 ... x]) and JT (A[x ... L]), a full table (JT(A)) can be obtained simply by merging the non-empty cells of JT(A[x ... L]) into JT(A[0 ... x]) if JT(A[0 ... x]) is empty at such cell(s), as described in Algorithm 9 below.

```
Algorithm 9
GetFullTable: Takes two consecutive Jaccard Tables of a given data
  object, and returns the full Jaccard Table for the data object 1: procedure GetFullJT (table1, table2)
  2:     JT ← table1
  3:     for row ← 0...NumOfHashFunc-1 do
  4:         for pos ← 0...HashSize-1 do
  5:             if JT[row][pos] == 0 then
  6:                 JT[row][pos] ← table2[row][pos]
  7:     return JT
```

According to embodiments, the position values in the Jaccard table provide information about the statistical properties of the data object that the Jaccard table characterizes.

For efficient explanation about the uniform n-gram distribution, the followings are assumed. It is assumed that the target data object is a sample data object generated based on a uniform probability mass function (PMF) of n-grams. Here, the PMF is uniform in that the PMF is not changing from one region of the data object to another. It is further assumed every n-gram in the distribution is equally probable, and therefore the n-gram distribution is illustrated only in terms of the size of the set of n-grams. Provided that the size of n-grams is $|V|$, the probability of each n-gram in this n-gram set is $1/|V|$.

Figure 11A:
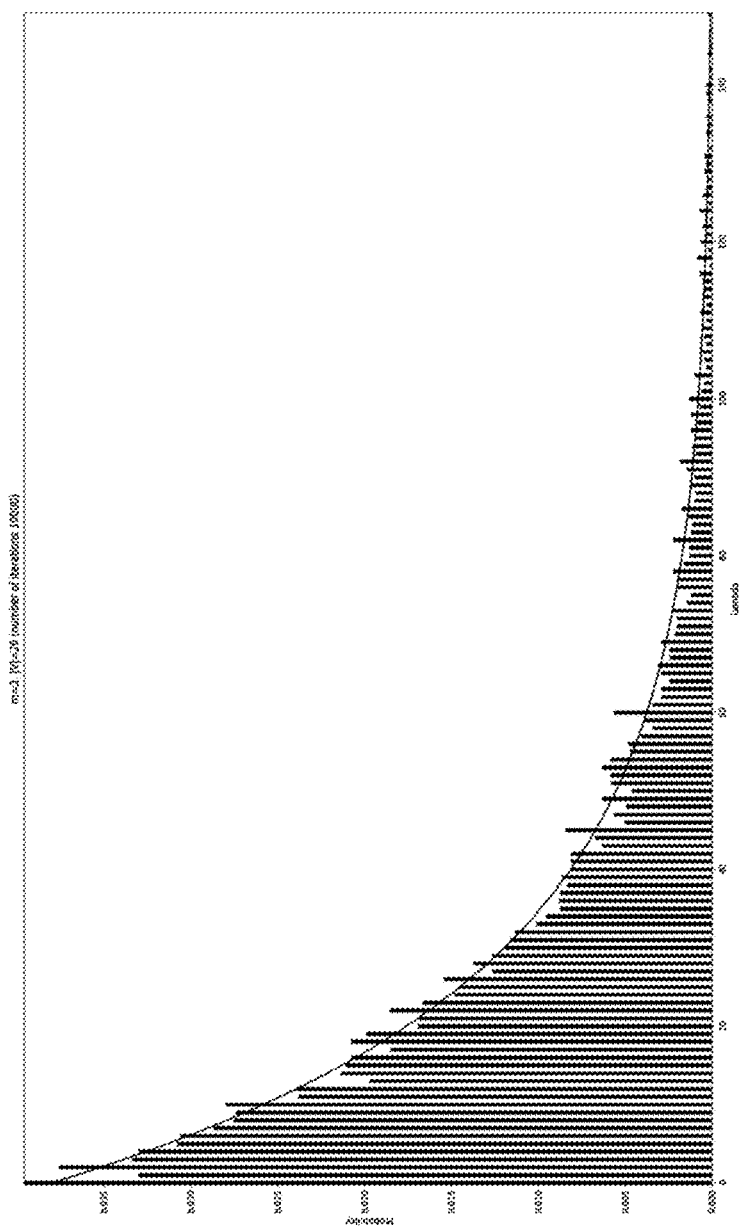
FIG. 11A illustrates results of a numerically generated uniform probability mass function (PMF) of lower case English alphabets with HitOrder m=3, in accordance with embodiments of the present disclosure.
Figure 11B:
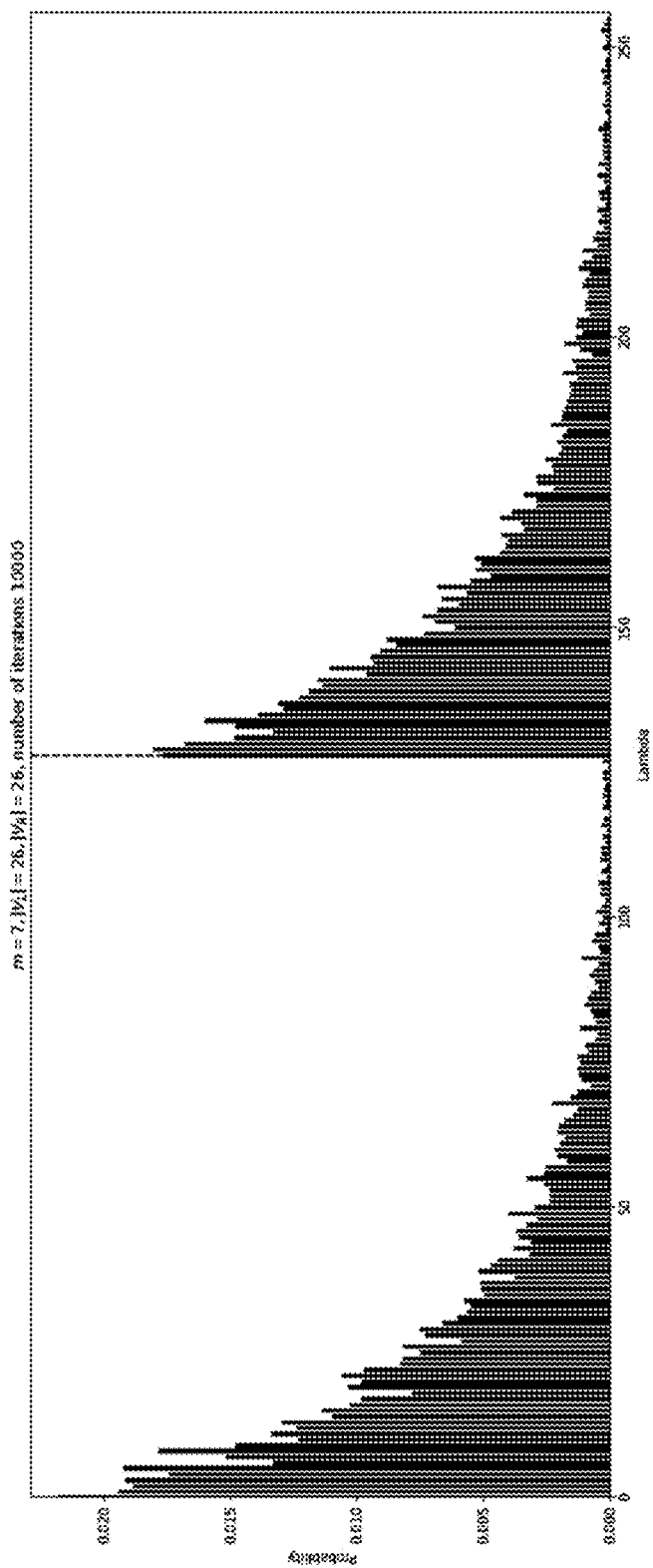
FIG. 11B illustrates results of a numerically generated uniform probability mass function (PMF) of lower case and upper case English alphabets with HitOrder m=7, in accordance with embodiments of the present disclosure.

With the n-gram set of the lower case English alphabets, where $|V|$ is 26, the PMF for A with HitOrder m=3 can be established by randomly generating data objects and filling in the Jaccard table 10,000 times. FIG. 11A illustrates results of a numerically generated uniform probability mass function (PMF) of lower case English alphabets with HitOrder m=3. FIG. 11B illustrates results of a numerically generated uniform probability mass function (PMF) of lower case and upper case English alphabets with HitOrder m=7.

The uniform PMF can be established through theoretical analysis. For that, $P_U$ (hit at $\lambda|m, |V|$) refers to the Hit of a given HitOrder m at the $\lambda$-th n-gram of some (infinite) data object with the n-grams from the uniform PMF where each of n-grams has the size of $|V|$ and the probability of $1/|V|$. Correspondingly, $P_U$ (pass at $\lambda|m, |V|$) refers to getting a pass (no hit) at the same position in the window.

For each given HitOrder m, only the first Hit is put in the position $\lambda$ when encountered. Put another way, getting a hit at $\lambda$ would represent not getting hits in other positions until this position. To reflect this, the following recursive relations can be expressed as provided in Equation 10 below:

$P_U$(hit at $\lambda$)=$P_U$(hit at $\lambda$|pass at $\lambda$–1)·$P_U$(pass at $\lambda$–1),$\lambda \geq 1$ $P_U$(pass at $\lambda$)=$P_U$(pass at $\lambda$|pass at $\lambda$–1)·$P_U$(pass at $\lambda$–1),$\lambda \geq 1$ (10)

The above recursive relations can be further established as provided in Equation 11 below:

$P_U$(hit at $\lambda$)=$P_U$(hit at 0)·$P_U$(hit at $\lambda$|pass at $\lambda$–1)·$\Pi_{k=1...\lambda-1} P_U$(pass at $k$|pass at $k$–1) (11)

Provided that the probability of a HitOrder p(m) for a given n-gram is $p=2^{-(m+1)}$, the distribution for the first n-gram ($\lambda$=0) can be defined as provided in Equations 12 and 13 below:

$$P_U(\text{hit at } \lambda)=\rho \qquad (12)$$

$$P_U(\text{pass at } \lambda)=1-\rho \qquad (13)$$

Determining the probability that the n-gram at the position $k \neq 0$ can yield a hit depends on whether the given n-gram has been encountered in any of the preceding $k-1$ positions. The n-gram that was "seen" before is guaranteed to result in a pass (e.g. an event where an n-gram outputs a hash value with more trailing zeroes than a specific HitOrder if HitOrder is zero, or less trailing zeroes than a specific HitOrder if HitOrder is not zero), and no further process is performed if a Hit is produced. Therefore, the Hit is indicative of that the k-th n-gram is encountered for the first time. The probability that a given n-gram is drawn for the first time out of k drawings from the set of $|V|$ items can be represented as provided in Equation 14 below.

$$\left(1-\frac{1}{|V|}\right)^{k-1} \qquad (14)$$

The conditional probabilities for the hit/pass at the position $k \neq 0$ can be defined as provided in Equations 15 and 16 below:

$$P_U(\text{hit at } k \mid \text{pass at } k-1) = q^{k-1}\rho, \text{ where } q = 1 - \frac{1}{|V|} \qquad (15)$$

$$P_U(\text{pass at } k-1 \mid \text{pass at } k) = 1 - q^{k-1}\rho, \text{ where } q = 1 - \frac{1}{|V|} \qquad (16)$$

Finally, the uniform PMF can be established by integrating Equations 12 and 15 into Equation 11 as provided in Equations 17 and 18 below:

$$P_U(\text{hit at } \lambda) = \rho q^{\lambda-1} \prod_{k=0...\lambda-2} \left(1 - \rho q^k\right) \qquad (17)$$

$$P_U(\text{pass at } \lambda) = \prod_{k=0...\lambda-1} \left(1 - \rho q^k\right) \text{ where} \qquad (18)$$

$$q = 1 - \frac{1}{|V|} \text{ and } \rho = 2^{-(m+1)}.$$

Detecting Segment Borders

When there is a Jaccard table of a data object including two segments each of which is based on distinct uniform n-gram PMF with low cross-segment similarity, the values observed from the Jaccard table are expected to spike in the region of the border between these two segments. This can be used for implementation of the chunking method for a data object with minimal cross-chunk similarity. Embodiments of the present disclosure provide a mathematical framework on how the position of the segment border can be inferred from a Jaccard table.

Referring back to FIG. 7, there is illustrated a formalization of the chunking criteria for the two segment uniform n-gram PMF model. Referring to FIG. 7, there is a data object, which is also referred to as cascading window 1400. The cascading window 1400 includes two segments, left-hand segment 1410 and right-hand segment 1420. Both segments 1410 and 1420 are generated based on their corresponding uniform n-gram PMF as illustrated above in the present disclosure. The left-hand segment 1410 has the n-gram set size of $|V_L|$ and the right-hand segment 1420 has the n-gram set size of $|V_R|$. There is a known intersection between $V_L$ and $V_R$, which can be represented as $w=V_L \cap V_R$. $\delta$ is indicative of the position of the border between the two segments 1410 and 1420. Specifically, $\delta$ 1430 is the index of the first n-gram that is generated based on the uniform PMF for the right-hand segment 1420. $\delta$ 1430 is located between $\delta_{min}$ 1431 and $\delta_{max}$ 1432.

Generating a dataset of files where the first 128 n-grams are randomly drawn from one fixed vocabulary (lower case English alphabets, that is the left side vocabulary is $|V_L|=26$) and the subsequent 128 n-grams are randomly drawn from another (upper case English alphabets (capitals) and the right side vocabulary is $|V_R|=26$), averaging the Jaccard table positions with HitOrder m=7 over 10,000 experiments provides the distribution of hits similar to the distribution plotted in FIG. 11B. Specifically, a gradual decrease would be observed for the rates of getting a hit as traversing the n-grams from left to right in the left-hand segment 1410. This is essentially similar to what can be observed in the uniform PMF case in FIG. 11B. Further, when the second segment (i.e. right-hand segment 1420) is encountered, the probability of getting a hit spikes initially. Then, as further processing towards right in the right-hand segment 1420, the gradual decrease of the hit rate emerges again as in the same uniform PMF style.

In the following, the hit and pass PMFs $P_2$(hit at $\lambda$) and $P_2$(pass at $\lambda$) will be explored with the following notation:

$$q_L = 1 - \frac{1}{|V_L|} \quad (19)$$

$$q_R = 1 - \frac{1}{|V_R|} \quad (20)$$

$$d = \frac{|w|}{|V_R|} \quad (21)$$

$$b = 1 - d(1 - q_L^\delta) \quad (22)$$

When $\lambda$ is smaller than the $\delta$ ($\lambda<\delta$), the probability distribution of getting a pass or hit at $\lambda$ is identical to the uniform n-gram PMF case, as is illustrated in Equation 18 above. On the other hand, for the n-grams in the range $\lambda\geq\delta$, it needs to be taken into account that the n-gram at lambda has the probability of $$d = \frac{|w|}{|V_R|}$$

to be a member of $V_L$, therefore the probability for the hit/pass at the position $\lambda$ can be illustrated as follows:

$P$(hit at $\lambda$|pass at $\lambda-1$)=$pq_L^{\lambda-\delta}(1-d(1-q_L^\delta))$ Based on the derivations of Equations 17 and 18, the probability distribution of hit at $\lambda\geq 6$ is defined as provided in Equation 23 below:

$$P(\text{hit at } \lambda) = bpq_R^{\lambda-\delta} \prod_{k=0...\delta-1} \{1 - pq_L^k\} \prod_{j=0...\lambda-\delta-1} \{1 - pbq_R^j\} \quad (23)$$

Finally, the complete probability distribution of a Hit at position $\lambda$ is provided in Equation 24 below:

$$P(\text{hit at } \lambda) = \begin{cases} bpq_L^{\lambda-1} \prod_{k=0...\lambda-2} \{1 - pq_L^k\} & \text{for } \lambda < \delta \\ bpq_R^{\lambda-\delta} \prod_{k=0...\lambda-1} \{1 - pq_L^k\} \prod_{j=0...\lambda-\delta-1} \{1 - pbq_R^j\} & \text{for } \lambda \geq \delta \end{cases} \quad (24)$$

It may be noted that, in some embodiments, $\delta$ should not be determined too close to the beginning of the target data object, in order that the true border inference be feasible.

Cascading Window

According to embodiments, the Jaccard table is an instrument and can be designed for the iterative procedure in data deduplication. In various embodiments, cascading window, which is a sliding window serving as a buffer of fixed size (i.e. CascadingWindowSize), can be used to perform iterative procedures throughout or within a given target file.

In each iteration of the iterative loop, the CascadingWindowSize n-grams would be taken from the target file as follows:
  target file[0 . . . CascadingWindowSize] of n-grams for the first iteration;
  target file[CascadingWindowSize . . . 2CascadingWindowSize] for the second iteration; . . . until the end of the target file is reached In each iteration, the Jaccard table is filled in both directions: jt_bwd and jt_fwd as outlined in Algorithm 2 presented above.

Figure 12:
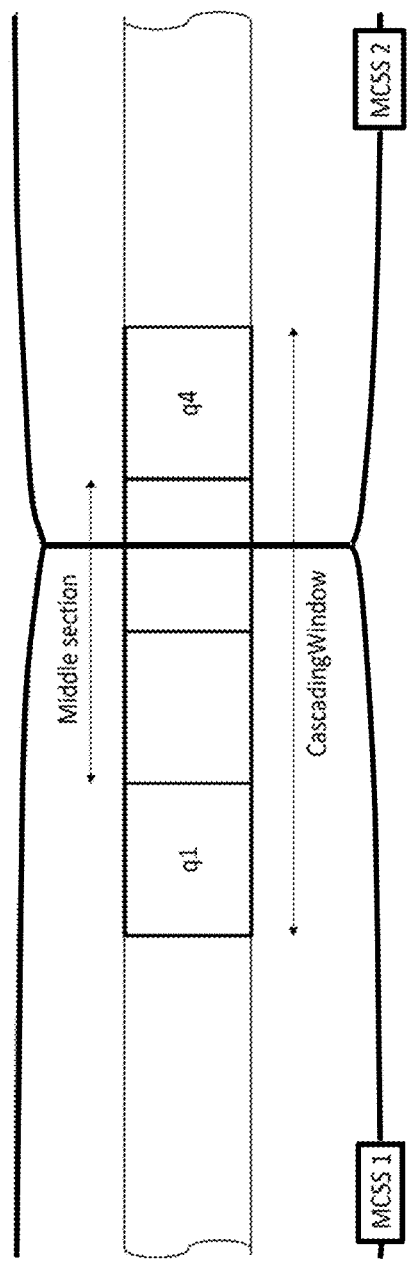
FIG. 12 illustrates a border between two MCSS segments contained in a middle section of a cascading window, in accordance with embodiments of the present disclosure.

CascadingWindow can be detected where the window partially contains two MCSS segments with their border situated somewhere in the middle part of the CascadingWindow as is illustrated in FIG. 12. Detecting the CascadingWindow can be done by using jt_fwd(CascadingWindow) and jt_bwd(CascadingWindow) and properties of the data object (e.g. statistical properties of the data object that the Jaccard table characterizes). For that, the CascadingWindow is split into 4 pieces of equal size (CascadingWindowSize/4) and it is assumed that the segment border is either in the second or third quarter of the size (e.g. as illustrated in FIG. 12). Then, CascadingWindow can be detected as follows.
  1. The Jaccard table for the first quarter of the CascadingWindow by applying the subintervalling to jt_fwd.
  2. Similarly, the Jaccard table for the last quarter of the window is obtained by subintervalling to jt_bwd.
  3. The metric of similarity, J, between the first and the last quarters of the CascadingWindow is estimated.

The above can be also outlined in pseudocode as provided in Algorithm 10 below:

---

Algorithm 10 CalcjfromIntervals: Calculate J metric which tells how similar is the leftmost quarter of the cascading window to its rightmost quarter 1: procedure CalcjfromIntervals (fwd1, bwd, window)
2:    q1 ← GetFwdSubIntervalJT(fwd1, CascadingWindowSize//4)
3:    q4 ← GetBwdIntervalJT(bwd, 3 * CascadingWindowSize//4)
4:    dem ← TablesToUnionCardinality(q1, q4)
5:    num ← TableToCardinality(q1) + TableToCardinality(q4)
6:    return $\frac{num}{dem} - 1$

---

In a case where the resultant J (i.e. metric of similarity) is sufficiently low, for example lower than a predetermined threshold value (e.g. SimilarityThreshold), it can be assumed that the middle section of a given CascadingWindow contains the segment border. Then, the method for determining the location of the segment border can be designed using the values of jt_fwd and jt_bwd.

However, the above method cannot be used for all cases, for example, when the segment border is located close to either end of the CascadingWindow. The above method may be used when the location of the segment border can be ensured such that the segment border is located in the middle section of the CascadingWindow.

Figure 13:
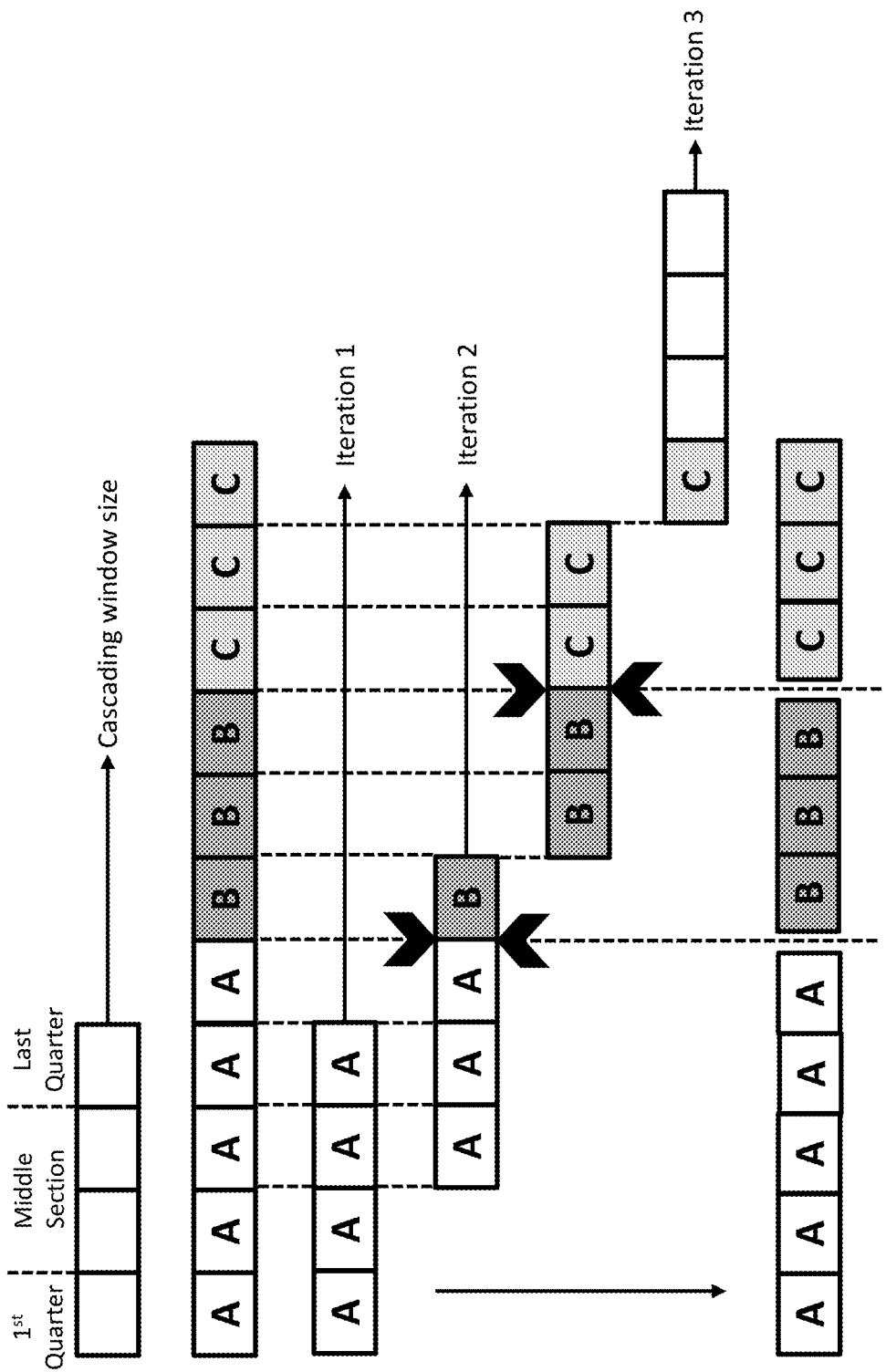
FIG. 13 illustrates an example of a cascading window with a shifted interval range, in accordance with embodiments of the present disclosure.

In various embodiments, in order address the above issue, the interval range of the CascadingWindow is shifted thereby making the CascadingWindow partially overlap. In some embodiments, the window interval range may be shifted by half of the CascadingWindowSize (i.e. CascadingWindowSize/2), not by full CascadingWindowSize. An example of a CascadingWindow with shifted interval range is illustrated in FIG. 13.

This makes every n-gram of the target file be part of not one but two CascadingWindow iterations. In one of these two iterations, the n-gram will be in the middle section of the CascadingWindow. This means the positions of the true segment borders can be detected using the steps presented above and the position of the segment border in the middle section of the CascadingWindow can be inferred.

Algorithm 11 AnalyzeWindow: Takes the CascadingWindow of a given data object as an input, and returns the JaccardTriplet for a left-aligned subinterval of this data object

```
1: procedure AnalyzeWindow (window)
2:   for n-gram, position window do
3:     for i ← 0...NumOfHashFunc-1 do
4:       h ← Hash (n-gram, i)
5:       m ← CountTrailingZeroes(h)
6:       bwd[i, m] ← position
7:       if position < CascadingWindowSize//2 then
8:         if fwd1[i, m] == 0 then
9:           fwd1[i, m] ← position
10:      else
11:        if fwd2[i, m] == 0 then
12:          fwd2[i, m] ← position
13:  return fwd1, fwd2, bwd
```

Algorithm 12 AnalyzeHalfWindow: is a variant of AnalyzeWindow where we only parse the second half of the CascadingWindow

```
1: procedure AnalyzeHalfWindow (windowHalf, bwd)
2:   bwd ← GetBwdSubIntervalJT(bwd, CascadingWindowSize//2)
3:   for n-gram, position ∈ windowHalf do
4:     for i ← 0...NumOfHashFunc-1 do
5:       h ← Hash(n-gram, i)
6:       m ← CountTrailingZeroes(h)
7:       bwd[i, m] ← position
8:       if fwd2[i, m] == 0 then
9:         fwd2[i, m] ← position
10: return fwd2, bwd
```

The partially overlapping CascadingWindows can solve the problem of the non-aligned segment borders, while it requires two iterates for each n-gram as the Jaccard table is filled for two CascadingWindows. This issue can be resolved as follows.

To avoid unnecessary iteration, in various embodiments, jt_bwd for a CascadingWindow can be reused for the next partially overlapping window. For that, subintervalling is applied to acquire jt_bwd for the second half of the original CascadingWindow. The second half of the window is iterated and jt_bwd is completely filled and therefore each n-gram is traversed only once.

It should be noted that the same approach is not applicable for jt_fwd, as subintervalling to obtain the Jaccard table for the second half is not applicable for jt_fwd. According to embodiments, this issue relating to jt_fwd can be addressed by having two forward-directed Jaccard tables, one for the first half of the window (jt_fwd1) and another one for the second half (jt_fwd2). Reusing the forward-directed Jaccard table in the next CascadingWindow is straightforward—as moving to the next window, the old jt_fwd1 is tossed out and jt_fwd2 is taken as the new jt_fwd1, and instead, only the second part of the new window needs to be traversed to obtain the new jt_fwd2.

In light of the above, each CascadingWindow can be characterized by the following Jaccard tables:

bwd is a backward-directed Jaccard table for the whole CascadingWindow;

fwd1 is a forward-directed Jaccard table for the first half of the CascadingWindow; and fwd2 is a forward-directed Jaccard table for the second half of the CascadingWindow.

The above collection of Jaccard tables is referred to as a Jaccard Triplet.

InferBorder

As presented above, according to embodiments, the cascading pattern of traversing the target file will lead to iteration(s) where the border between the MCSS segments is positioned in the middle section of a CascadingWindow as illustrated in FIG. 12. Also, the possibility that the border segment is positioned in the middle section of the CascadingWindow can be detected as illustrated in Algorithm 10 presented above. Under such eventuality, there is a true segment border position $\delta_{MSCC}$, which is located somewhere in the middle section of said CascadingWindow.

Further, according to embodiments, the probabilistic evaluation of $\delta_{MSCC}$ can be made based on the JaccardTriplet of the CascadingWindow. This method is referred to as InferBorder. It is noted that the Bayes prediction approach can be used for the InferBorder method. It is also noted the two-segment uniform n-gram PMF model analysis presented above can be applied to more general situations.

For each given position value $\delta$ within the middle range of the CascadingWindow, $P(\delta)$ refers to the probability that the position $\delta$ is the true segment border position $\delta_{MSCC}$.

Provided that $P(\delta|\lambda, m)$ refers to the probability that the true border between the two segments is at $\delta$ posterior to the observation of a given forward-directed Jaccard table Hit at $\lambda$ of HitOrder m, the following can be established:

$$P(\delta \mid \lambda, m) = \frac{P(\lambda, m \mid \delta) P(\delta)}{P(\lambda, m)}$$

Assuming a uniform prior $P(\lambda, m) = \rho$ and $P(\delta)$ (all values for $\delta$ in the candidate range are equally probable), this can be generalized to a set $\lambda_i$, $m_j$ of observed Hits, where i and j represent the range of the indices in the document and range of possible orders, respectively, as provided in Equation 24 below:

$$P(\delta \mid \lambda) \sim \prod_{m_j} P(\lambda_i \mid \delta) \qquad (24)$$

Computation of $P(\lambda|\delta, h^*, m)$ using the above Equation 24 is computationally expensive, as the probability at any position $\lambda$ depends on the information collected from previous $\lambda-1$. In order to relax these constraints and make the implementation easier, the following log probability of Equation 24 can be considered:

$w(\lambda) \equiv \log P(\text{hit at } \lambda)$

According to embodiments, when $\lambda < \delta$, the following expression for $w(\lambda)$ is established as provided in Equation 25 below.

$$w(\lambda) = \log(\rho) + (\lambda - 1) \cdot \log(q_L) + \sum_{k=0...\lambda-2} \log(1 - \rho q_L^k) \qquad (25)$$

Using the series expansion $\log(1-x) = -\Sigma_{j=1\ldots\infty} 1/jx^j$, Equation 25 can be rewritten as a series over $\rho$ as provided in Equation 26 below.

$$w(\lambda) = \log(\rho) + (\lambda - 1) \cdot \log(q_L) + \sum_{k=1\ldots\infty} \frac{1}{k} \rho^k \frac{1 - q_L^{(\lambda-1)k}}{1 - q_L^k} \quad (26)$$

Similarly, when $\lambda \geq \delta$, the following expression for $w(\lambda)$ as a series over $\rho$ can be established as provided in Equation 27 below.

$$w(\lambda) = \log(\rho b) + (\lambda - \delta) \cdot \log(q_R) + \sum_{k=1\ldots\infty} \frac{1}{k} \rho^k \frac{1 - q_L^{(\delta-1)k}}{1 - q_L^k} - \sum_{k=1\ldots\infty} \frac{1}{k} (\rho b)^k \frac{1 - \rho q_R^{(\lambda-\delta)k}}{1 - \rho q_R^k} \quad (27)$$

It is noted that the values of $\rho = 2^{-(m+1)}$ tend to be close to 0, or at least, $\rho \leq \frac{1}{2}$. Therefore, all terms can be discarded with the exception of the lowest-order terms of the series. In some embodiments, the log probability may be calculated until k=2, only keeping the linear and quadratic terms.

Based on the above, the indices in the middle half of the CascadingWindow that observed a Hit are taken and their weights are calculated using Equations 26 and 27. The index with the highest weight is selected for drawing the optimal border.

---

Algorithm 13 CalcWeight: used within InferBorder

---

1:  procedure CalcWeight (x, pos, m, $|S_{q1}|$, $|S_{q4}|$, |w|)

2:  $q \leftarrow 1 - \frac{1}{s_{q1}}$

3:  if q ≤ 0.00001 then
4:      q ← 0.00001

5:  $\rho \leftarrow 1 - \frac{1}{2m + 1}$

6:  if x < pos then

7:  $val \leftarrow \ln(\rho) + \ln(q) \cdot x - \rho \cdot \frac{1 - q^x}{1 - q} - 0.5 \cdot \rho^2 \cdot \frac{1 - q^{2 \cdot x}}{1 - q^2}$ 8:  return val 9:  $val1 \leftarrow -\rho \cdot \frac{1 - q^{pos}}{1 - q} - 0.5 \cdot \rho^2 \cdot \frac{1 - q^{2 \cdot pos}}{1 - q^2}$ 10:  $p \leftarrow 1 - \frac{1}{|S_{q4}|}$ 11:  y ← x − pos 12:  $d \leftarrow \frac{|w|}{|S_{q4}|}$ 13:  b ← 1 − d × (1 − $|S_{q4}|^{pos}$)

14:  $val2 \leftarrow \ln[\rho \times b] + \ln(p) \cdot y - (\rho \times b) \cdot \frac{1 - p^y}{1 - p} - 0.5 \cdot (\rho \times b)^2 \cdot \frac{1 - p^{2 \cdot y}}{1 - p^2}$ 15:  return val1 + val2

---

The above CalcWeight method (i.e. Algorithm 13) is the last step required to infer a border from the Jaccard Triplet of the CascadingWindow. The InferBorder method works in the following manner. From the Jaccard Triplet, the cardinality of the intersection between the first quarter and last quarter is calculated and stored in the variable w. Then, based on the assumption that the border is within the middle section of the CascadingWindow, all HitWindowPositions belonging to the middle section of the window are stored in the candidates map. This map stores the border candidates' positions and weights, where the weights are initialized to zero. Then, the weight for each candidate (C) is calculated as the sum of the probabilities (CalcWeight) of all candidates under the assumption that C is the border. Finally, the optimal border will be identified as the candidate with the lowest weight. Further illustration of the InferBorder method is provided below in Algorithm 14 below.

--- do = BANANAPANAMA; n = 1; A = BANANA; B = PANAMA
fwd1 = JT(A) = [1, 0, 0, 0, 0, 0, 0, 0, 0]
fwd2 = JT(B) = [1, 0, 0, 4, 0, 0, 0, 0]
bwd = jt_bwd = [11, 6, 0, 10, 0, 0, 0, 0, 0]
q1 = JT(A[0:3]) = [1, 0, 0, 0, 0, 0, 0, 0, 0]
q4=[11, 0, 0, 10, 0, 0, 0, 0, 0]

$|S_{q1}| = \frac{2^1}{0.773} = 2.587 \approx 3$ $|S_{q4}| = \frac{2^1}{0.773} = 2.587 \approx 3$ JT(q1∪q4) = [1, 0, 0, 0, 0, 0, 0, 0, 0]

$|S_{q1} \cup S_{q4}| = |S_{q4}| = \frac{2^1}{0.773} = 2.587 \approx 3$

|w|=3 + 3 − 3 = 3
jt_fwd = fwd1 ∪ fwd2 = [1, 6, 0, 0, 0, 0, 0, 0, 0]
fwdFlips = [(1,6)] # m=1, pos=6
bwdFlips = [(1,6)] # m=1, bwdPos=6
candidates = [(6,0)] # pos=6, weight=0
in this case, there is only candidate so the calculation is very straightforward
weight = 0
C = 6

-continued

```
bwdC = len(do) − C = 6
weight = weight + CalcWeight(C,pos,1,3,3,3) = 0 + 4.5 = 4.5
weight = weight + CalcWeight(bwdC,bwdPos,1,3,3,3) = 4.5 + 4.5 = 9
# since there was only one candidate, it has the lowest weight
optimalBorder = C = 6# position C perfectly divides the do into A and B
Algorithm 14 InferBorder: Given the JaccardTriplet of a given CascadingWindow, outputs the
best guess for the position of the border between the two segments in the CascadingWindow 1: procedure InferBorder(fwd1, fwd2, bwd, window)
 2:     Initialize fwdFlips to empty array
 3:     Initialize bwdFlips to empty array
 4:     Initialize candidates to empty map
 5:     Initialize optimalBorder to CascadingWindowSize//2
 6:     q1 ← GetFwdIntervalJT(fwd1, CascadingWindowSize//2)
 7:     q4 ← GetBwdIntervalJT(bwd, 3*CascadingWindowSize//2)
 8:     |S_q1| ← TableToCardinality(q1)
 9:     |S_q4| ← TableToCardinality(q4)
10:     |w| ← |S_q1| + |S_q4| − TableToUnionCardinality(q1, q4)
11:     fwdFlips ← ∀ (m, pos) ∈ GetFullTable(fwd1, fwd2) and ∉ q1
12:     bwdFlips ← ∀(m, pos) ∈ bwd and ∉ q4
13:     candidates ← ∀(pos, 0) ∈ (fwdFlips or bwdFlips)
14:     for C ∈ candidates do
15:         weight ← 0.0
16:         bwdC ← CascadingWindowSize − C
17:         for m, pos ∈ fwdFlips do
18:             weight ← weight + CalcWeight(C, pos, m, |S_q1|, |S_q4|, |w|)
19:         for m, pos ∈ bwdFlips do
20:             bwdPos ← CascadingWindowSize − pos
21:             weight ← weight + CalcWeight(bwdC, bwdPos, m|S_q4|, |S_q1|, |w|)
22:         candidates[C] ← weight
23:     lowestW ← ∞
24:     for pos, w ∈ candidates do
25:         if w < lowestW then
26:             lowestW ← w
27:             optimalBorder ← pos
28:     return optimalBorder
R-Metric
```

According to embodiments, the ratio R of the number of unique n-grams estimated and the maximum possible number of n-grams in a file segment can provide the uniqueness of its n-grams. Thus, if $\{w_1, w_2, \ldots, w_k\}$ windows were processed before drawing a border for a file segment and they have $\{R_1, R_2, \ldots, R_k\}$ estimations, the average $$\overline{R} = \frac{\Sigma_i R_i}{k}$$

provides an estimation of the overall average n-gram uniqueness of the file segment. The procedure for estimating the entropy of the file segment (uniqueness of n-grams in the file segment) is provided in Algorithm 15 below.

```
Algorithm 15 Estimating Entropy with R

1: procedure WindowEntropy (window: wi)
 2:     #n_grams : the number of unique n-grams in the window
 3:     #max_n_grams: the maximum possible number of n-grams
        in this window
 4:
 5:     #n grams ← CalculateCardinality(window.JaccardTable)
 6:     #max_n_ grams ← min {window.size − n + 1, 2^{8n}}

7:     R_i = n_grams / max_n_grams

8:     return R_i
 9: procedure FileSegmentEntropyfsegment: s)
10:     {w_1, w_2, ..., w_k} ← CascadingWindow in s such that
        w_1.head ≥ s.start and w_k.tail ≤ s.end
11:     {R_1, R_2, ..., R_k} ← {0, 0, ..., 0}
12:     for i in range (k) do
13:         R_i ← WindowEntropy(wi)

14:     R̄ = Σ_i R_i / k

15:     return R̄
```

Jaccard Deduplication Process

According to embodiments, the RDC can be performed using compression methods such as content defined chunking, identity-based deduplication, similarity-based deduplication and any combination thereof.

According to embodiments, the method of remote differential compression (RDC) and data deduplication includes traversing the target file where the CascadingWindow, which is characterized by its Jaccard Triplet, is used at each iterative procedure throughout the target file. Cascading-Window can be detected based on Algorithm 10 presented above for cases where the window partially contains two MCSS segments with their border situated somewhere in the middle part of the CascadingWindow as is illustrated in FIG. 12. The specific position of the segment border between the two MCSS segments can be inferred using a probabilistic guessing InferBorder method presented above, thereby yielding the chunking based on Minimal Cross-Segment Similarity (MCSS).

According to embodiments, a probabilistic estimate of R of the resultant chunks is acquired to implement the data character-informed deduplication mode that is set out to achieve.

Figure 14:
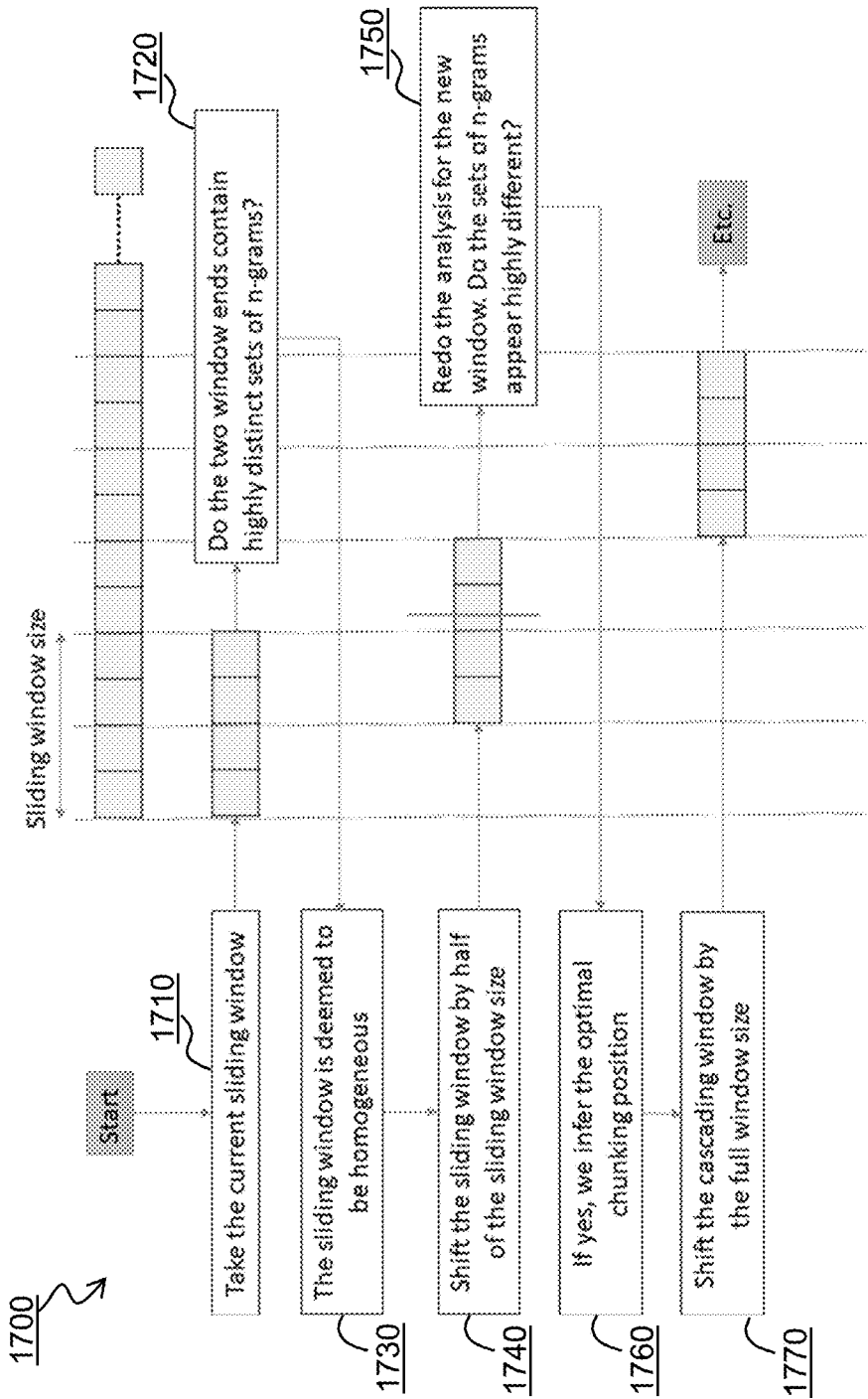
FIG. 14 illustrates, in a flow diagram, an overall workflow of the Jaccard deduplication process, in accordance with embodiments of the present disclosure.

FIG. 14 illustrates, in a flow diagram, an overall workflow of the Jaccard deduplication process, in accordance with embodiments of the present disclosure. The deduplication process 1700 starts with taking the current sliding window, at step 1710. At step 1720, it will be determined whether the two ends of the current sliding window contain highly distinct sets of n-grams. If they are not highly distinct, at step 1730, the sliding window is deemed to be homogeneous.

Then, at step 1740, the interval range of the sliding window is shifted by half of the sliding window size (e.g. CascadingWindowSize/2) thereby making the sliding window partially overlap. At step 1750, the analysis is performed again for the new sliding window. In other words, it will be determined whether the two ends of the new sliding window contain highly distinct sets of n-grams (whether the sets of n-grams appear highly different). If the new sliding window contains highly distinct sets of n-grams after the shift, then the optimal chunking position is inferred at step 1760. At step 1770, the sliding window (CascadingWindow) is shifted by the full sliding window size (e.g. CascadingWindowSize).

The overall workflow of the algorithm is outlined JaccardTraverse as provided in Algorithm 16 below. The complete procedure of traversing an incoming data object (abbreviated to do) and outputting the sequence of chunk border positions chunkB and R estimates chunkR is provided in Algorithm 16.

---

Algorithm 16 JaccardTraverse: Given a data object, outputs its chunking as well as an estimate of the R-metric for each of the resultant chunks 1: procedure JaccardTraverse (do)
2:      Initialize size to zero
3:      Initialize sumR to zero
4:      Initialize chunkB to empty map
5:      Initialize chunkR to empty array
6:      window ← do.read(CascadingWindowSize)
7:      fwd1, fwd2, bwd ← AnalyzeWindow(window)
8:      while !do.EOF do
9:          j ← CalcJ(fwd1, bwd, window)
10:         if j > SimilarityThreshold then
11:             size ← size + CascadingWindowSize
12:             sumR ← sumR + TableToCardinality(fwd1) + TableToCardinality(fwd2)
13:             fwd1 ← fwd2
14:             windowHalf ← do.read(CascadingWindowSize//2)
15:             fwd2, bwd ← AnalyzeHalfWindow(windowHalf, bwd)
16:             continue
17:         border ← InferBorder(fwd1, fwd2, bwd, window)
18:         table1 ← GetFwdSubIntervalTable(fwd1, border)
19:         table2 GetBwdSubIntervalTable(arg max (0, border − CascadingWindowSize//2)
20:         sumR ← sumR + TableToCardinality(table1) + TableToCardinality(table2)
21:         chunkB ← do.position − CascadingWindowSize + border
22:         chunkR ← sumR/(size + border)
23:         size ← 0         # Reset counter for chunk size
24:         sumR ← 0         # Reset counter for chunk R
25:         window ← do.read(CascadingWindowSize)
26:         fwd1, fwd2, bwd ← AnalyzeWindow(window)
27:     return chunkB, chunkR

---

A quantitative analysis of the method for segmentation is illustrated with the working example as follows. FIG. 15 illustrates the extracted cascading window used in the following working example. Referring to FIG. 15, the size of the extracted cascading window 1800 is 8 bytes (i.e. CascadingWindowSize=8 bytes; length=8). The desired n-gram size of the extracted cascading window 1800 is 1 byte (i.e. NGramSize=1 byte). There are 3 Hash functions used (i.e. NumOfHashFunctions=3) and the hash value size for the selected hash function is 32 bits (HashSize=32 bits). The threshold used to determine whether a data object is homogeneous or not is 0.5 (i.e. SimilarityThreshold=0.5). It should be noted that this example only contains a single cascading window and the cascading window traversal is not provided here.

The quantitative analysis starts with analyzing the segment from left to right and filling a forward-directed Jaccard table for the first half of the CascadingWindow (i.e. fwd1) and a backward-directed Jaccard table for the whole CascadingWindow (i.e. bwd).

Figure 16A:
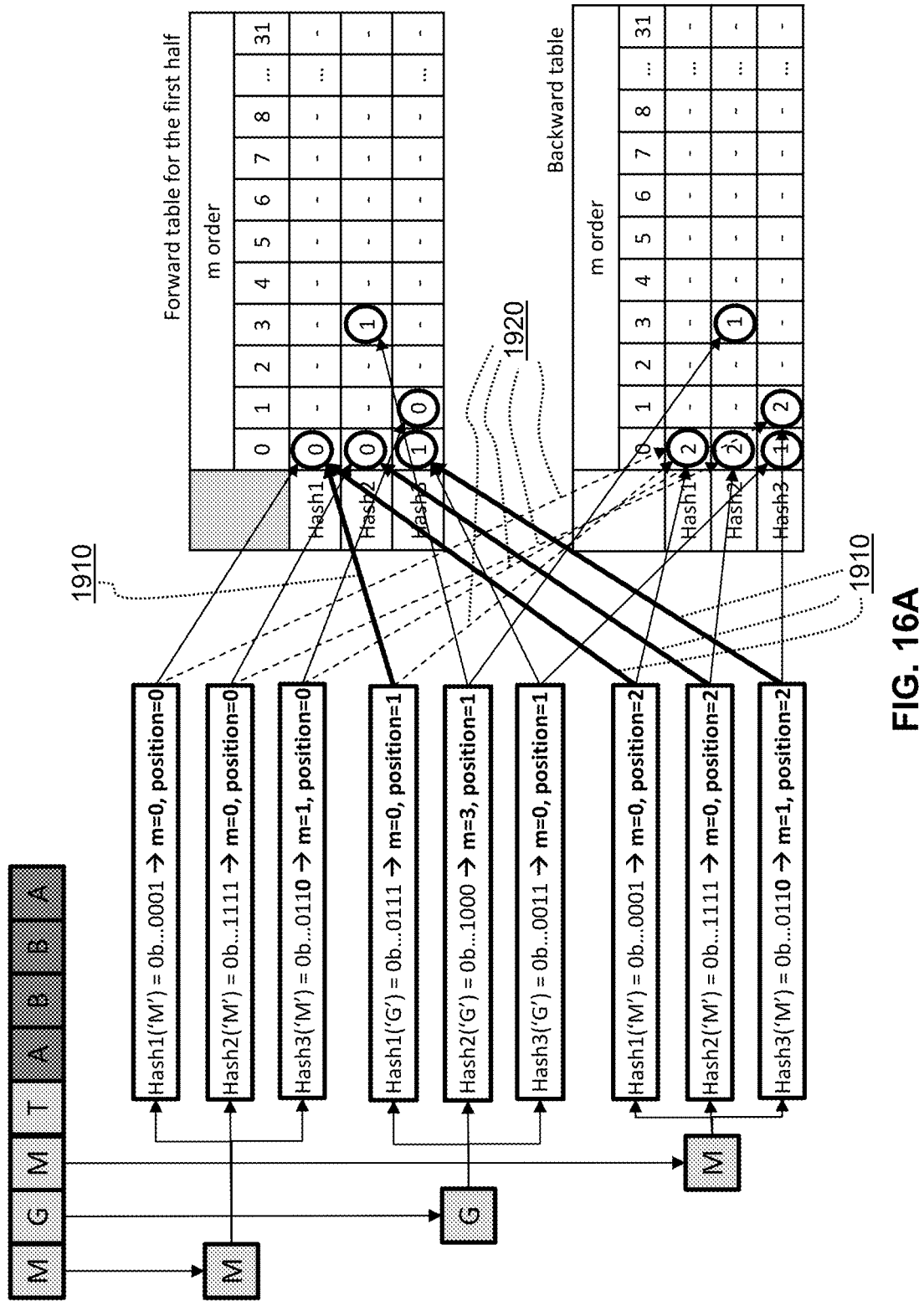
FIG. 16A illustrates the process of collecting Hit positions for the first half of the cascading window, in accordance with embodiments of the present disclosure.
Figure 16B:
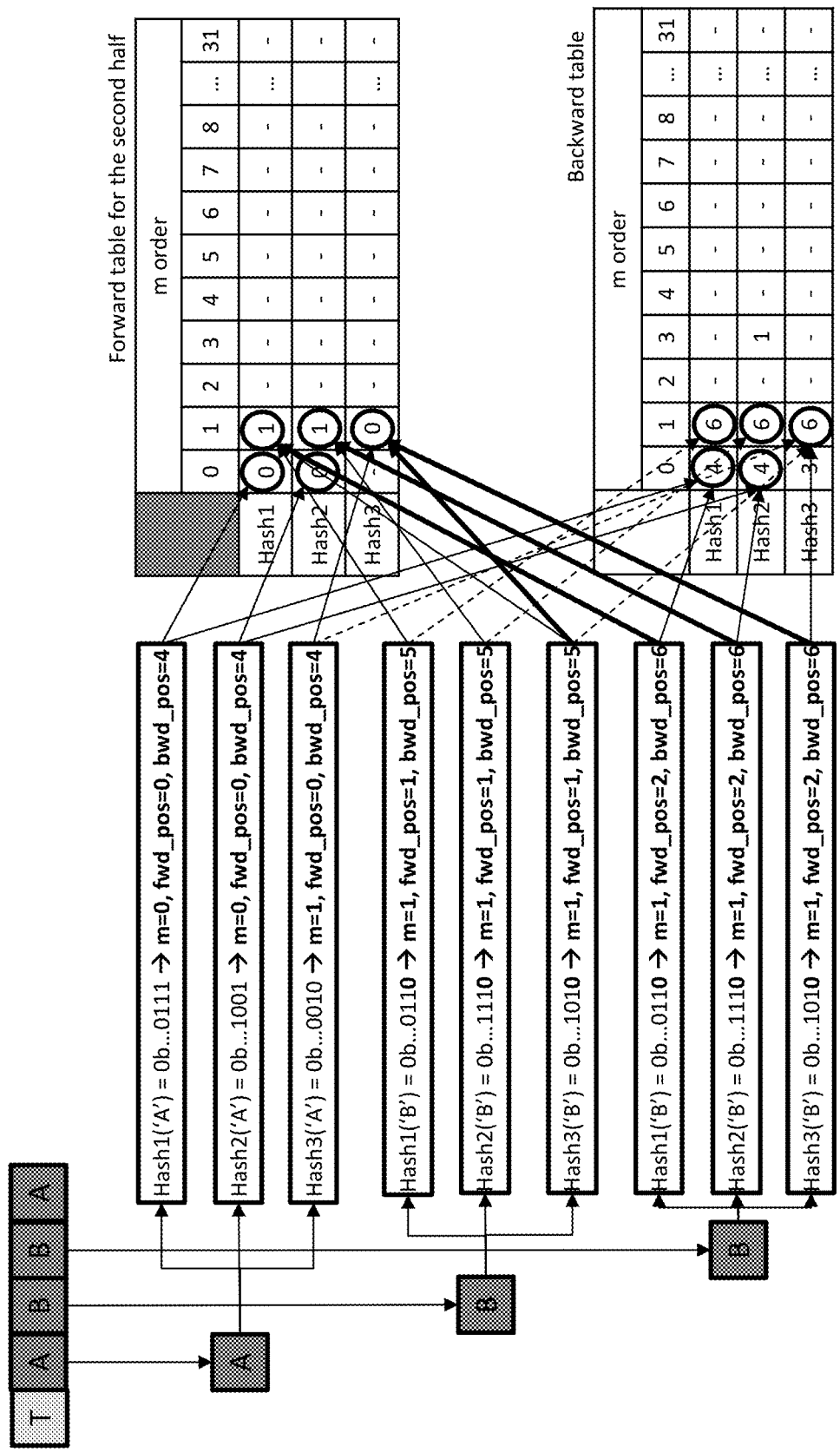
FIG. 16B illustrates the process of collecting Hit positions for the second half of the cascading window, in accordance with embodiments of the present disclosure.

FIG. 16A illustrates collecting Hit positions for the first half of the cascading window, in accordance with embodiments of the present disclosure. Referring to FIGS. 16A and 16B, the bold arrows 1910 display collision events where an n-gram yielded the same HitOrder as a previous n-gram for the forward Jaccard table. Conversely, the dashed arrows 1920 show events where a position in the backward Jaccard table was overwritten by a later n-gram. Continuing this, it can be inferred how a forward-directed Jaccard table for the second half of the CascadingWindow (i.e. fwd2) is filled and bwd is completed for the second half of the cascading window, as illustrated in FIG. 16B. FIG. 16B illustrates collecting Hit positions for the second half of the cascading window, in accordance with embodiments of the present disclosure. The process for the second half is essentially similar to the process for the first half. The only difference is that, for the second half of the cascading window, the positions stored in the fwd2 are presented relative to $$\frac{CascadingWindowSize}{2},$$

while the absolute positions are stored for the bwd table. Referring to FIG. 16B, it should be noted that 'fwd_pos' is indicative of position for the forward table and 'bwd_pos' is indicative of position for the backward table.

FIG. 17A illustrates the values in each Jaccard table after analyzing the first half of the CascadingWindow and FIG. 17B illustrates the values in each Jaccard table after analyzing the second half of the CascadingWindow, in accordance with embodiments of the present disclosure. FIG. 18 illustrates the final values in the full forward-directed Jaccard table after fully analyzing the CascadingWindow, in accordance with embodiments of the present disclosure. Referring to said figures, the values in each Jaccard table are all the information required to analyze the segment using the methods introduced elsewhere herein. Referring to FIG. 18, the full forward Jaccard table illustrated. FIG. 18 is extracted from the fwd1 and fwd2 presented in FIGS. 17A and 17B. This table inherently contains the same information as the fwd1 and fwd2, but uses absolute positions for the second half values, which is obtained by adding $$\frac{CascadingWindowSize}{2}.$$

Figure 19:
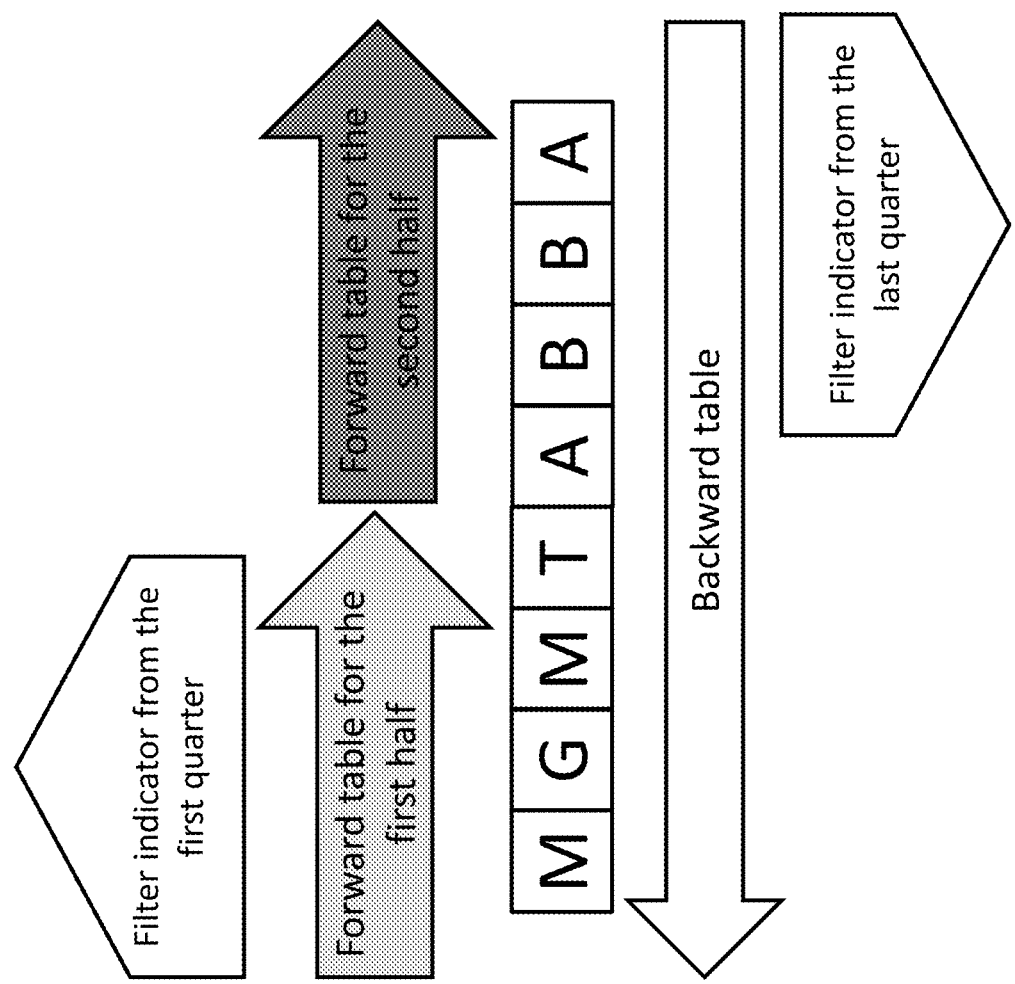
FIG. 19 illustrates a process of determining evidence of two heterogeneous segments in the analyzed tokens using two forward-directed Jaccard tables and one backward-directed Jaccard table, in accordance with embodiments of the present disclosure.

The next step is to determine, from the filled Jaccard triplet, whether there is evidence of two heterogeneous segments in the analyzed tokens. FIG. 19 illustrates the process of determining whether there is evidence of two heterogeneous segments in the analyzed tokens using two forward-directed Jaccard tables and one backward-directed Jaccard table, in accordance with embodiments of the present disclosure. As stated above, the J metric can be calculated using the Jaccard triplet. In order to separate the information for J estimation from the border inference, the only the tokens from the first and last quarter of the CascadingWindow are used. The Calc-J algorithm outlined in Algorithm 5 can be updated thereby using the subintervaling property of the Jaccard tables.

For the first quarter, the procedure GetFwdSubIntervalTable outlined in Algorithm 7 is applied to the forward-directed Jaccard table for the first half of the CascadingWindow (fwd1), and the output is passed to TableToCardinality function outlined in Algorithm 3. FIG. 20A illustrates the calculation of the first quarter cardinality for the forward-directed table for the first half of the CascadingWindow, in accordance with embodiments of the present disclosure.

For the last quarter, the backward-directed Jaccard table is filtered using GetBwdSubIntervalTable outlined in Algorithm 8 and passed as an input to TableToCardinalty outlined in Algorithm 3. FIG. 20B illustrates the calculation of the last quarter cardinality for the backward-directed table for the CascadingWindow, in accordance with embodiments of the present disclosure.

After the first and last quarters' cardinalities are individually calculated, the cardinality of the union of the first and last quarters are determined. The cardinality of the union of both quarters using the TablesToUnionCardinality outlined in Algorithm 4. FIG. 21 illustrates an example of calculation of the union cardinality, in accordance with embodiments of the present disclosure. Referring to FIG. 21, the calculated union cardinality is 5 and therefore the cardinality of the set of shared n-grams is estimated as 3+3−5=1.

Upon estimating the union cardinality and the cardinality of the set of shared n-grams, J metric or Jaccard similarity is estimated as $$\frac{1}{5} = 0.2,$$

in accordance with Algorithm 5. In this case, the calculated Jaccard similarity is less than the SimilarityThreshold (0.5) presented in FIG. 15, the optimal chunking position is continued to be inferred.

The optimal segment border position is acquired based on the InferBorder method outlined in Algorithm 14. First, based on the assumption that the segment border will be within the middle section of the CascadingWindow, the forward and backward tables will be filtered out in order to find the border candidates. FIG. 22 illustrates the filtering procedure for the forward and backward tables, in accordance with embodiments of the present disclosure.

Figure 23:
FIG. 23 illustrates probability weights calculated for two optimal border candidates, in accordance with embodiments of the present disclosure.

Finally, the probability weight or indicator weight for each border candidate are calculated using the CalcWeight method outlined in Algorithm 13 and select the candidate with the lowest weight. FIG. 23 illustrates probability weights calculated for two optimal border candidates, in accordance with embodiments of the present disclosure. As illustrated in FIG. 23 the optimal border is identified at position 5, resulting in the optimal boarder located at 2500.

Figure 24:
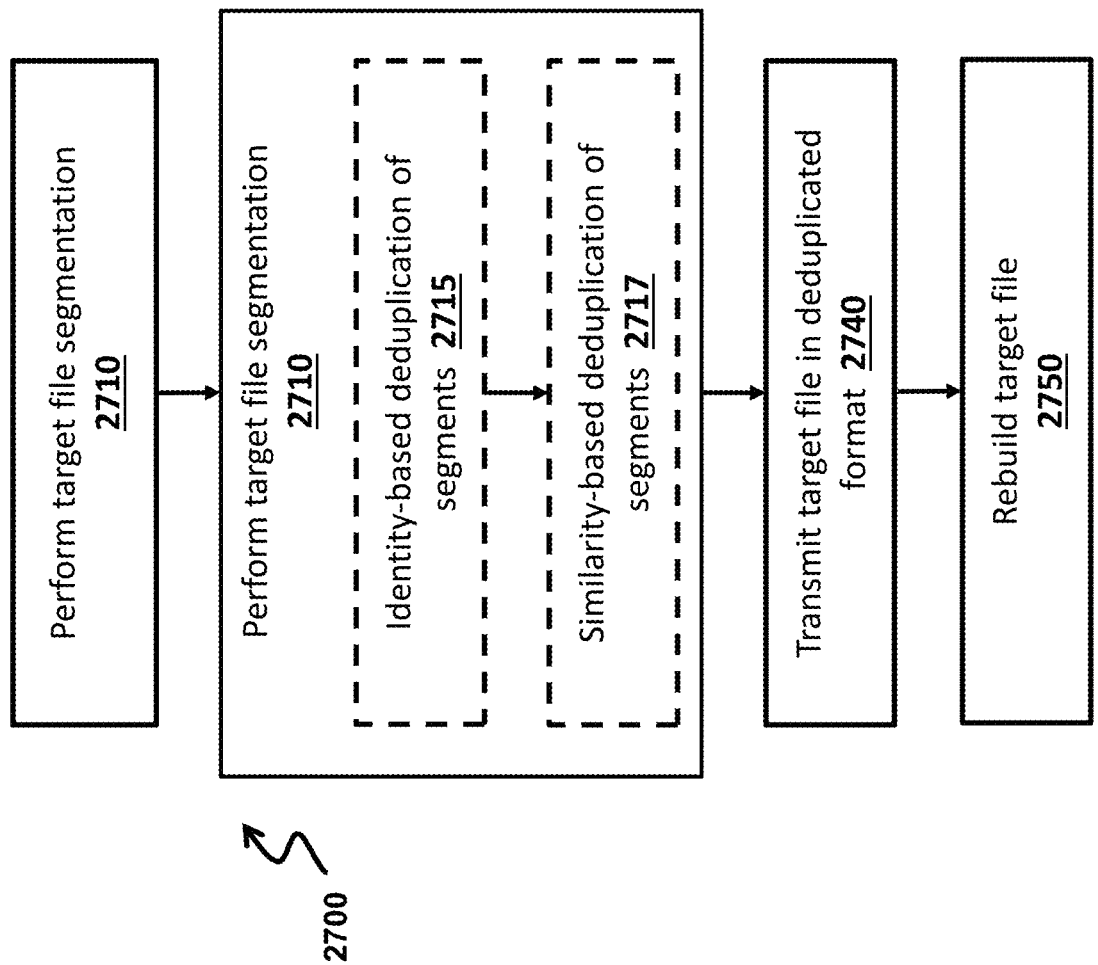
FIG. 24 illustrates a method for replicating a target file between a sending device and a recipient device, in accordance with embodiments of the present disclosure.

FIG. 24 illustrates a method for replicating a target file between a sending device and a recipient device, in accordance with embodiments of the present disclosure. The method includes performing 2710, by a sending device, Jaccard segmentation of the target file thereby partitioning the target file into a plurality of segments, upon performing Jaccard segmentation each segment is characterized by one or more of: a segment border position indicating a segment border between the segment and an adjacent segment, an estimated R-metric value indicative of a uniqueness of the segment, a secure fingerprint identifying the segment and one or more sketches indicative of one or more hash functions associated with the segment. The method further includes deduplicating 2720, by the sending device, each of the segments of the target file based on a comparison with a corresponding segment of a seed file associated with the target file. The method further includes transmitting 2740, by the sending device to the recipient device, the deduplicated segments of the target file, each deduplicated segment encoded based on a respective segmentation type determined during deduplication of the segments of the target file. The method further includes rebuilding 2750, by the recipient device, a replicated target file using the deduplicated segments of the target file and the seed file associated with the target file.

In some embodiments, deduplicating each of the segments includes determining 2715 whether one or more of the segments of the target file is identical to the corresponding segment of the seed file. In some embodiments, deduplicating each of the segments includes determining 2717 whether one or more of the segments of the target file is based on a similarity to the corresponding segment of the seed file. In some embodiments, the similarity between each segment of the target file and the corresponding segment of the seed file is determined based at least in part on the estimated R-metric value.

In some embodiments, partitioning the target file is an iterative process based on a cascading window having a size, wherein the cascading window is shifted by half of the size of the cascading window for each iteration, the cascading window defining a fixed size buffer associated with the target file during the iterative process. In some embodiments, the iterative process includes determining one or more Jaccard tables, each Jaccard table being a data structure containing information indicative of a composition of the target file or transitions between segments of the target file and determining the segment border position using the one or more Jaccard tables.

In some embodiments, determining the one or more Jaccard tables includes determining a Jaccard triplet of the cascading window, the Jaccard triplet including a backward-directed Jaccard table for the cascading window, a forward-directed Jaccard table for a first half of the cascading window and a forward-directed Jaccard table for a second half of the cascading window.

In some embodiments, determining the segment border position includes splitting the cascading window into four equal sized quarters, determining a forward subinterval Jaccard table for the first quarter of the cascading window and determining a backward subinterval Jaccard table for the last quarter of the cascading window. Determining the segment border position further includes evaluating a similarity between the first quarter of the cascading window and the last quarter of the cascading window based on the forward subinterval Jaccard table and the backward subinterval Jaccard table and determining whether the segment border is within the second quarter of the cascading window or the third quarter of the cascading window, the determining based on the similarity between the first quarter of the cascading window and the last quarter of the cascading window.

In some embodiments, determining the segment border position includes selecting an optimal border from plural segment border candidates, wherein determining the segment border position is based on probability weights. In some embodiments, the optimal border is located between two segments with minimal cross-segment similarity (MCSS) in the cascading window.

Examples of implementations or uses of the method according to embodiments of the present disclosure are presented below.

Continuous File Synchronization

According to embodiments, the method of the present disclosure can be implemented as an application and can be applied to instances in order to enable companies to share files with other employees in offices located around the world.

Employees in the office upload new files or new versions of existing files (e.g. files uploaded earlier) to the application over the local area network. The applications of the company then communicate with each other over the internet, and replicate the files uploaded to one application to all other applications. This functionality may be referred to as enterprise file sharing, and can also be made available in proprietary solutions like Dropbox Enterprise™ or Google Drive™ within Google Workspace Enterprise™

It is generally beneficial for a company to require that everything is recorded and nothing is ever permanently removed. In other words, every file version and every file change is recorded and kept for posterity so that it can be audited and reviewed later. This can protect the company from, for example, a disgruntled employee who decides to sabotage his employer by deleting the company data. This can also support legal compliance of the company, as a company is often required by law to keep a track record of everything that happens in the company. Moreover, storing all file versions and changes also can assure fault tolerance (whether hardware or software), backup recovery, collecting operational data for subsequent analysis and so on.

According to this embodiment of the present disclosure, the files are stored immutably in order to implement the methods described above. When changes are made to the file, the data of the old version is not overwritten, but the new data (e.g. newly added portion) in the new version of the file is added to the old data. In that sense, handling a new version of the old file would be indistinguishable from adding a new file (i.e. whole file).

According to the embodiments, the above can be achieved by relying on a log-structured storage engine pattern. This structured storage can dictate that the embodiment includes components including append-only transaction log, fingerprint block storage and similarity feature index. In the append-only transaction log, every change to the file is recorded. Every change to the file includes uploading a new file, changing an existing file or removing a file. The append-only transaction log records all changes in the form of a transaction, a format specifying the character of the file change. The fingerprint block storage is the key-value structure where the key is a strong fingerprint. In various embodiments of the present disclosure, the key is a hash function such as SHA-256. A similarity feature index is a key-value structure where the keys are the sketches and the values are the list of fingerprints of the similar chunks.

The following illustrates an example of the append-only transaction log.
TRANSACTION 1: SET FILE "/PEPPA.txt" TO "DOLL, TRAIN, TRUCK"
TRANSACTION 2: SET FILE "/wishes/GEORGE.txt" TO "TRAIN, CAR, TRUCK"
TRANSACTION 3: SET FILE "/wishes/RICHARD.txt" TO "TRAIN, CAR, TRUCK"
TRANSACTION 4: SET FILE "/PEPPA.txt" TO "DOLL, TRAIN, TRUCK, BOAT"
TRANSACTION 5: REMOVE FILE "/wishes/RICHARD.txt"

As illustrated above, every change to all files (on any device) is simply added to this log in its entirety. The transactions are ordered in a timely manner, therefore when several transactions are accessing the same file, the latest transaction can be considered as the basis for the current state of the file. For example, referring to the above append-only transaction log, transaction 1 creates the file "/PEPPA.txt" and sets up its content to "DOLL, TRAIN, TRUCK". Then, transaction 4 records changes to this file which sets the content of the file to "DOLL, TRAIN, TRUCK, BOAT". The content set in transaction 4 should be regarded as the basis for the current state of the file "/PEPPA.txt". Similarly, in the case where the file "/wishes/GEORGE.txt", is first created and set to "TRAIN, CAR, TRUCK" in transaction 2, but then later removed in the transaction 5. The removed state is the current state of this file.

Therefore, every device that has this append-only log can scan the log from top to bottom and obtain the current state of the shared filesystem. For the above example, by reading the log from top to bottom, the current state of the file system can be restored as illustrated in TABLE 9 below.

TABLE 9

| Filepath | Content |
| --- | --- |
| /PEPPA.txt | DOLL, TRAIN, TRUCK, BOAT |
| /wishes/GEORGE.txt | TRAIN, CAR, TRUCK |

The network of devices of this embodiment can be configured to maintain the identical version of this append-only log and, correspondingly, the same state of the shared filesystem. Whenever a device accepts a new transaction, it appends the record of this transaction to the end of its append-only log and the devices work together to replicate the updated version of the log to every other device in the network.

In order to make this replication process more effective, the Jaccard RDC can be used while processing steps described above (e.g. input file segmentation, identity-based segment deduplication, similarity-based segment deduplication). In the context of the current embodiment, the seed file is the original version of append-only log possessed by every device and the target file is the new transaction to replicate. Also, the senders can be all devices that already have the copy of the new transaction, and the recipients can be the devices that did not get the new transaction yet.

As soon as the transaction is replicated to all devices, the devices append the new transaction to the seed file (i.e. the original append-only log) and the system is ready for processing and replicating the next transaction.

In accordance with embodiments, the new transaction (i.e. the target file) is split into MCSS segments, and this transaction segmentation for the devices' internal storage is reused within the append-only log. Then, the segments themselves are stored within the fingerprint block storage, which is a dictionary (key-value) type structure, where the value is the Jaccard RDC segment and the key is its fingerprint. An example of the data within fingerprint block storage is illustrated in Tables 10 and 11 below.

TABLE 10

| Fingerprint | Block |
| --- | --- |
| 0x116f | [TRAIN] |
| 0x2b29 | [CAR] |
| 0x2461 | [TRUCK] |
| 0x44c3 | [DOLL] |
| 0x25cd | [BOAT] |
| 0x6ed1 | [: SET] |
| 0x7919 | [.txt" TO "] |

TABLE 11

| Fingerprint | Block |
| --- | --- |
| 0x7e56 | [REMOVE] |
| 0x3b9c | [ FILE "/] |
| 0x8dad | [TRANSACTION] |
| 0xfdc9 | [PEPPA] |
| 0x8f0e | [wishes/] |

Therefore, the append-only log can be stored more efficiently, as a sequence of fingerprints of blocks including:
0x8dad, 0x6ed1, 0x3b9c, 0xfdc9, 0x7919, 0x44c3, 0x116f, 0x2461 . . .

Content Delivery Network

Figure 25:
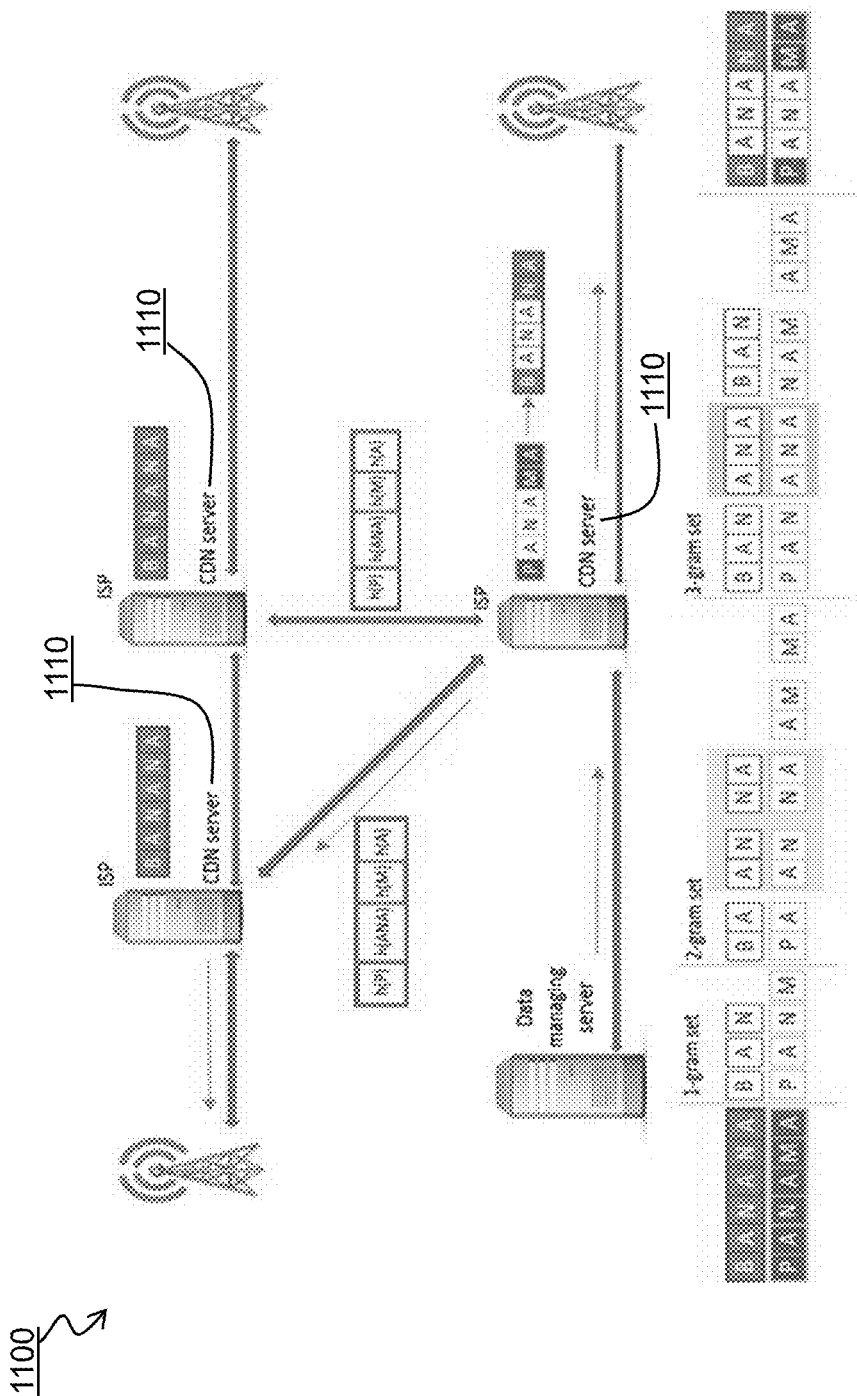
FIG. 25 illustrates a set of geographically distributed servers in a content delivery network (CDN) of a communication service provider, in accordance with embodiments of the present disclosure.

According to an embodiment, the method of the present disclosure can be used with respect to a set of geographically distributed servers in a content delivery network (CDN) of a communication service provider. This embodiment can be described with reference content delivery network illustrated in FIG. 25.

In the content delivery network 1100, content publishers publish their content by sending and updating the named data objects to all the CDN servers 1110. The functionality of the CDN 1100 is that whenever the content publishers need to deliver their content to end consumers, the data is provided by the server that is geographically close to those end consumers, thereby providing a better quality of services.

Within this embodiment, the consumer may be trying to access a given data object from an Internet browser. One of the components used in this embodiment is the JavaScript™ code running within the browser. As end consumers usually access a series of data objects, not a single data object, whenever an end consumer is trying to access a data object, which contains redundant material to the data objects that the consumer previously fetched or cached, the segmentation method according to embodiments, for example, Jaccard RDC, can be applied or utilized. In this context, the seed file, while different for each customer, includes all data objects that were previously fetched by a specific customer and cached for that customer. The target file can be the data object that the specific customer is trying to fetch from the CDN server. The sender is one of the CDN servers which provides content to the customer, and the recipient is the customer who tries to get the content from an Internet browser. One distinctive feature of this embodiment, which is not included in other types of embodiments, is that the seed file that the recipient has and that can be used for deduplication varies for each customer.

The present disclosure provides a method of segmenting (partitioning into distinct segments) and characterization of large continuous data objects with low computational overhead, at least lower than computational overheads of the known alternatives. The segmentation method used in various embodiments can be used not only for efficient replication of data but also for other segmentation tasks and change of the segmentation criteria.

In some embodiments, the segmentation method is used for semantic data segmentation, as segmenting a large data object efficiently can be an important first step in many big data applications. The method of the present disclosure can be used when an audio stream is segmented by time periods containing highly distinct sounds. A segmentation method that can effectively separate music, speech and background noise in a sound stream can be useful, for example in a speech comprehension system.

In some embodiments, the segmentation method is used for digital image segmentation. In image processing, there are many challenges encountered when segmenting digital images or video streams. The method of the present disclosure can be used for digital image segmentation tasks, for example image recognition machine learning tasks, video codec encoding and other image processing tasks.

Figure 26:
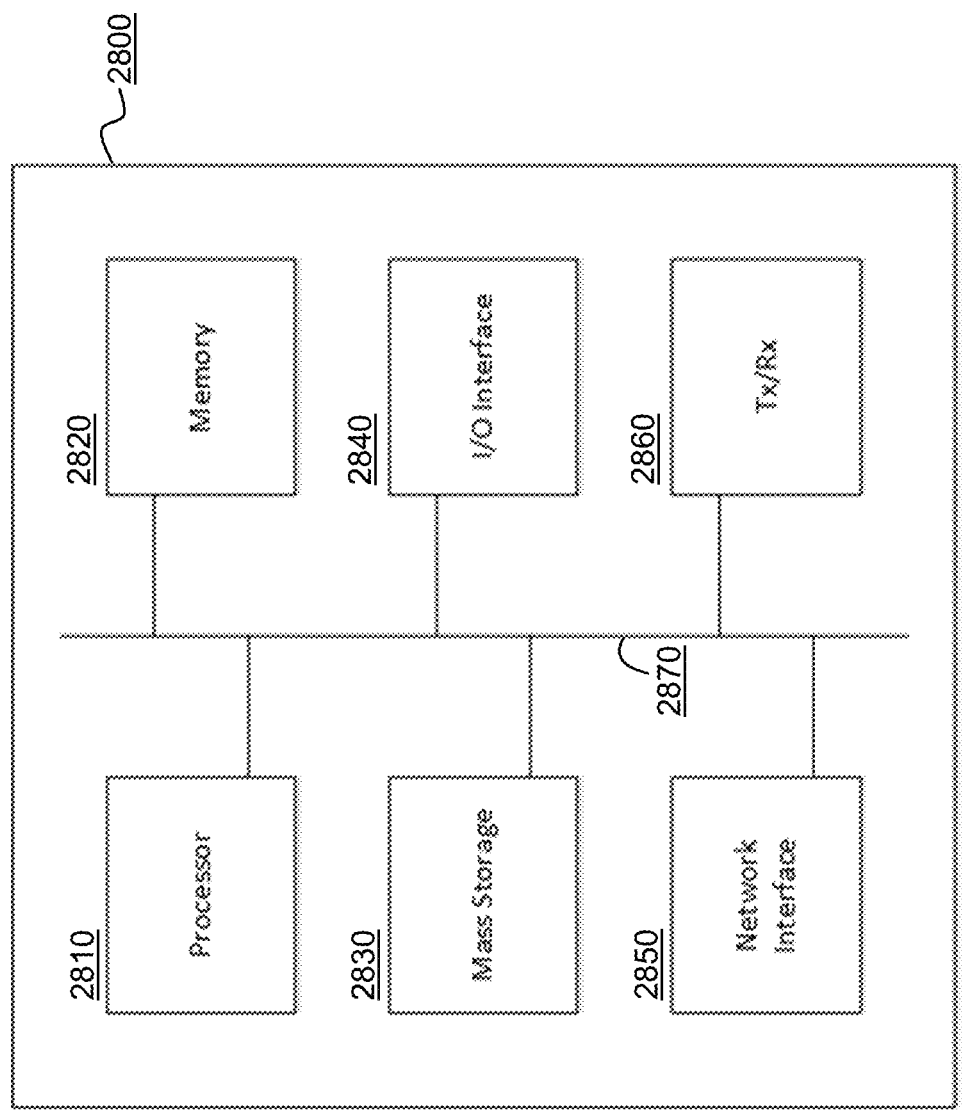
FIG. 26 illustrates, in a schematic diagram, an electronic device in accordance with embodiments of the present invention.

FIG. 26 is a schematic diagram of an electronic device 2800 that may perform any or all of operations of the above methods and features explicitly or implicitly described herein, according to different embodiments of the present disclosure. For example, a dedicated hardware capable of executing instructions for operation of the above methods and features may be configured as electronic device 2800. The electronic device 2800 may be a device forming part of a coordinator, a platform controller, a physical machine or server, a physical storage server or data storage devices.

As shown, the device 2800 includes a processor 2810, memory 2820, non-transitory mass storage 2830, I/O interface 2840, network interface 2850, and a transceiver 2860, all of which are communicatively coupled via bi-directional bus 2870. According to certain embodiments, any or all of the depicted elements may be utilized, or only a subset of the elements. Further, the device 2800 may contain multiple instances of certain elements, such as multiple processors, memories, or transceivers. Also, elements of the hardware device may be directly coupled to other elements without the bi-directional bus.

The memory 2820 may include any type of non-transitory memory such as static random access memory (SRAM), dynamic random access memory (DRAM), synchronous DRAM (SDRAM), read-only memory (ROM), any combination of such, or the like. The mass storage element 2830 may include any type of non-transitory storage device, such as a solid state drive, hard disk drive, a magnetic disk drive, an optical disk drive, USB drive, or any computer program product configured to store data and machine executable program code. According to certain embodiments, the memory 2820 or mass storage 2830 may have recorded thereon statements and instructions executable by the processor 2810 for performing any of the aforementioned method steps described above.

It will be appreciated that, although specific embodiments of the technology have been described herein for purposes of illustration, various modifications may be made without departing from the scope of the technology. The specification and drawings are, accordingly, to be regarded simply as an illustration of the invention as defined by the appended claims, and are contemplated to cover any and all modifications, variations, combinations or equivalents that fall within the scope of the present invention. In particular, it is within the scope of the technology to provide a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device.

Acts associated with the method described herein can be implemented as coded instructions in plural computer program products. For example, a first portion of the method may be performed using one computing device, and a second portion of the method may be performed using another computing device, server, or the like. In this case, each computer program product is a computer-readable medium upon which software code is recorded to execute appropriate portions of the method when a computer program product is loaded into memory and executed on the microprocessor of a computing device.

Further, each step of the method may be executed on any computing device, such as a personal computer, server, PDA, or the like and pursuant to one or more, or a part of one or more, program elements, modules or objects generated from any programming language, such as C++, Java, or the like. In addition, each step, or a file or object or the like implementing each said step, may be executed by special purpose hardware or a circuit module designed for that purpose.

It is obvious that the foregoing embodiments of the invention are examples and can be varied in many ways. Such present or future variations are not to be regarded as a departure from the spirit and scope of the invention, and all such modifications as would be obvious to one skilled in the art are intended to be included within the scope of the following claims.

We claim:

1. A method for replicating a target file between a sending device and a recipient device, the method comprising:
    performing, by a sending device, Jaccard segmentation of the target file thereby partitioning the target file into a plurality of segments, upon performing Jaccard segmentation each segment is characterized by one or more of: a segment border position indicating a segment border between the segment and an adjacent segment, an estimated R-metric value indicative of a uniqueness of the segment, a secure fingerprint identifying the segment and one or more sketches indicative of one or more hash functions associated with the segment;
    deduplicating, by the sending device, each of the segments of the target file based on a comparison with a corresponding segment of a seed file associated with the target file;
    transmitting, by the sending device to the recipient device, the deduplicated segments of the target file, each deduplicated segment encoded based on a respective segmentation type determined during deduplication of the segments of the target file; and
    rebuilding, by the recipient device, a replicated target file using the deduplicated segments of the target file and the seed file associated with the target file.

2. The method of claim 1, wherein deduplicating each of the segments includes determining whether one or more of the segments of the target file is identical to the corresponding segment of the seed file.

3. The method of claim 1, wherein deduplicating each of the segments includes determining whether one or more of the segments of the target file is based on a similarity to the corresponding segment of the seed file.

4. The method of claim 3, wherein the similarity between a segment of the target file and a corresponding segment of the seed file is determined based at least in part on the estimated R-metric value.

5. The method of claim 1, wherein Jaccard segmentation of the target file is an iterative process based on a cascading window having a size, wherein the cascading window is shifted by half of the size of the cascading window for each iteration, the cascading window defining a fixed size buffer associated with the target file during the iterative process.

6. The method of claim 5, wherein the iterative process includes:
    determining one or more Jaccard tables, each Jaccard table being a data structure containing information indicative of a composition of the target file or transitions between segments of the target file; and
    determining the segment border position using the one or more Jaccard tables.

7. The method of claim 6, wherein determining the one or more Jaccard tables includes determining a Jaccard triplet of the cascading window, the Jaccard triplet including a backward-directed Jaccard table for the cascading window, a forward-directed Jaccard table for a first half of the cascading window and a forward-directed Jaccard table for a second half of the cascading window.

8. The method of claim 6, wherein determining the segment border position includes:
    splitting the cascading window into four equal sized quarters;
    determining a forward subinterval Jaccard table for the first quarter of the cascading window;
    determining a backward subinterval Jaccard table for the last quarter of the cascading window;
    evaluating a similarity between the first quarter of the cascading window and the last quarter of the cascading window based on the forward subinterval Jaccard table and the backward subinterval Jaccard table; and
    determining whether the segment border is within the second quarter of the cascading window or the third quarter of the cascading window, the determining based on the similarity between the first quarter of the cascading window and the last quarter of the cascading window.

9. The method of claim 6, wherein determining the segment border position includes selecting an optimal border from plural segment border candidates, wherein determining the segment border position is based on probability weights.

10. The method of claim 9, the optimal border is located between two segments with minimal cross-segment similarity (MCSS) in the cascading window.

11. A sending device supporting target file replication with a recipient device, the sending device comprising:
    a network interface for receiving data from and transmitting data to devices connected to a network;
    a processor; and
    machine readable memory storing machine executable instructions which when executed by the processor configure the sending device to:

perform Jaccard segmentation of the target file thereby partitioning the target file into a plurality of segments, upon performing Jaccard segmentation each segment is characterized by one or more of: a segment border position indicating a segment border between the segment and an adjacent segment, an estimated R-metric value indicative of a uniqueness of the segment, a secure fingerprint identifying the segment and one or more sketches indicative of one or more hash functions associated with the segment;

deduplicate each of the segments of the target file based on a comparison with a corresponding segment of a seed file associated with the target file; and transmit to the recipient device, the deduplicated segments of the target file, each deduplicated segment encoded based on a respective segmentation type determined during deduplication of the segments of the target file.

12. The sending device of claim 11, wherein deduplicating each of the segments includes determining whether one or more of the segments of the target file is identical to the corresponding segment of the seed file.

13. The sending device of claim 11, wherein deduplicating each of the segments includes determining whether one or more of the segments of the target file is based on a similarity to the corresponding segment of the seed file.

14. The sending device of claim 13, wherein the similarity between a segment of the target file and a corresponding segment of the seed file is determined based at least in part on the estimated R-metric value.

15. The sending device of claim 11, wherein Jaccard segmentation of the target file is an iterative process based on a cascading window having a size, wherein the cascading window is shifted by half of the size of the cascading window for each iteration, the cascading window defining a fixed size buffer associated with the target file during the iterative process.

16. The sending device of claim 15, wherein during the iterative process the machine executable instructions when executed by the processor further configure the sending device to:

determine one or more Jaccard tables, each Jaccard table being a data structure containing information indicative of a composition of the target file or transitions between segments of the target file; and determine the segment border position using the one or more Jaccard tables.

17. The sending device of claim 16, wherein determining the one or more Jaccard tables includes determining a Jaccard triplet of the cascading window, the Jaccard triplet including a backward-directed Jaccard table for the cascading window, a forward-directed Jaccard table for a first half of the cascading window and a forward-directed Jaccard table for a second half of the cascading window.

18. The sending device of claim 16, wherein during determining the segment border position, the machine executable instructions when executed by the processor further configure the sending device to:

split the cascading window into four equal sized quarters;

determine a forward subinterval Jaccard table for the first quarter of the cascading window;

determine a backward subinterval Jaccard table for the last quarter of the cascading window;

evaluate a similarity between the first quarter of the cascading window and the last quarter of the cascading window based on the forward subinterval Jaccard table and the backward subinterval Jaccard table; and determine whether the segment border is within the second quarter of the cascading window or the third quarter of the cascading window, the determining based on the similarity between the first quarter of the cascading window and the last quarter of the cascading window.

19. The sending device of claim 16, wherein determining the segment border position includes selecting an optimal border from plural segment border candidates, wherein determining the segment border position is based on probability weights.

20. The sending device of claim 19, the optimal border is located between two segments with minimal cross-segment similarity (MCSS) in the cascading window.

21. A recipient device supporting target file replication with a sending device, the recipient device comprising:

a network interface for receiving data from and transmitting data to devices connected to a network;

a processor; and machine readable memory storing machine executable instructions which when executed by the processor configure the recipient device to:

receive, from the sending device, a plurality of deduplicated segments of a target file, each deduplicated segment encoded based on a respective segmentation type identified during deduplication of the segments of the target file, each segment characterized by one or more of: a segment border position indicating a segment border between the segment and an adjacent segment, an estimated R-metric value indicative of a uniqueness of the segment, a secure fingerprint identifying the segment, and one or more sketches indicative of one or more hash functions associated with the segment; and rebuild a replicated target file using the deduplicated segments of the target file and the seed file associated with the target file.

* * * * *